United States Patent [19]

Takahashi et al.

[11] Patent Number: 5,000,550
[45] Date of Patent: Mar. 19, 1991

[54] WIDE-ANGLE TYPE ZOOM LENS HAVING INNER-FOCUS LENS

[75] Inventors: Sadatoshi Takahashi, Tokyo; Koutaro Yano; Hiroshi Endo, both of Kanagawa, all of Japan

[73] Assignee: Canon Kabushiki Kaisha, Tokyo, Japan

[21] Appl. No.: 471,081

[22] Filed: Jan. 26, 1990

[30] Foreign Application Priority Data

Jan. 30, 1989 [JP] Japan .................................. 1-22289
May 11, 1989 [JP] Japan ................................. 1-119603

[51] Int. Cl.$^5$ ...................... G02B 15/177; G02B 13/18
[52] U.S. Cl. .................................... 350/426; 350/427; 350/432
[58] Field of Search ............................... 350/432–435, 350/423, 427, 426, 428

[56] References Cited

U.S. PATENT DOCUMENTS

| | | | |
|---|---|---|---|
| 4,527,867 | 7/1985 | Fujioka et al. | 350/427 |
| 4,653,873 | 3/1987 | Kawamura | 350/426 X |
| 4,752,121 | 6/1988 | Kitagishi | 350/427 |
| 4,848,883 | 7/1989 | Maruyama | 350/427 |

Primary Examiner—Scott J. Sugarman
Attorney, Agent, or Firm—Fitzpatrick, Cella, Harper & Scinto

[57] ABSTRACT

A zoom lens includes a first lens group having a negative refractive power and having an object-side sub-group stationary during focusing and an image-side sub-group arranged to move for focusing purposes, and a second lens group having a positive refractive power and arranged on the image side of the first lens group, wherein the first lens group and the second lens group move axially at the same time and in differential relation for zooming purposes.

9 Claims, 56 Drawing Sheets

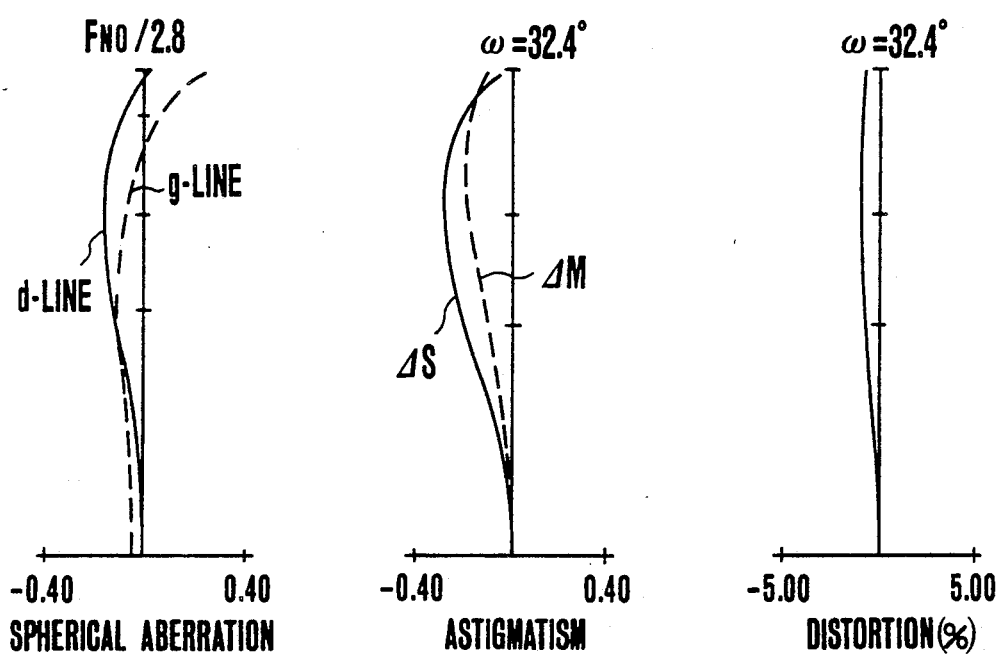

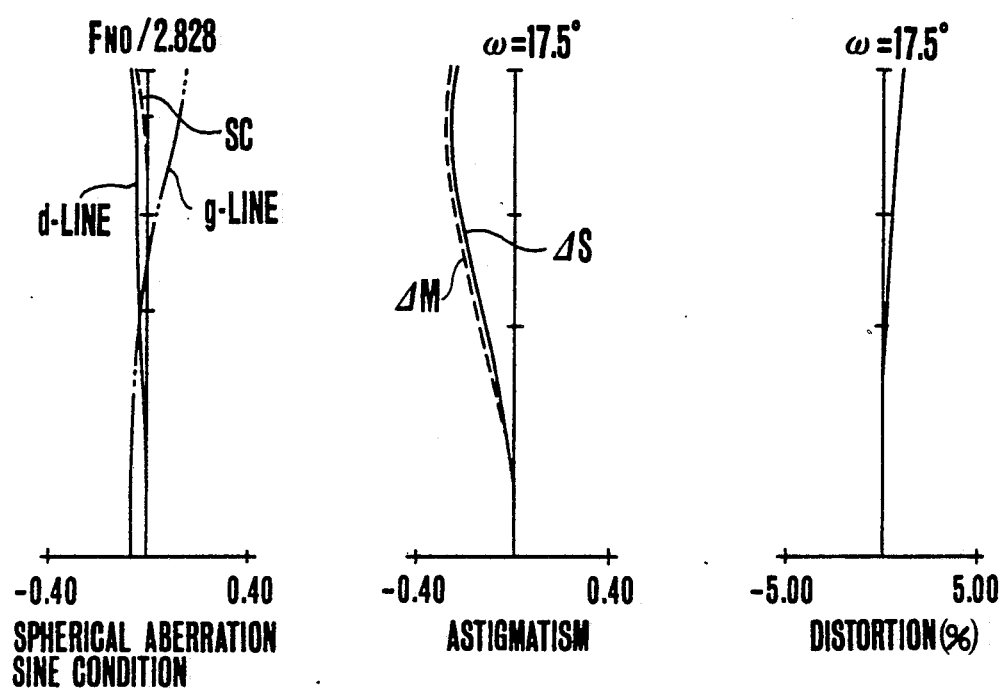

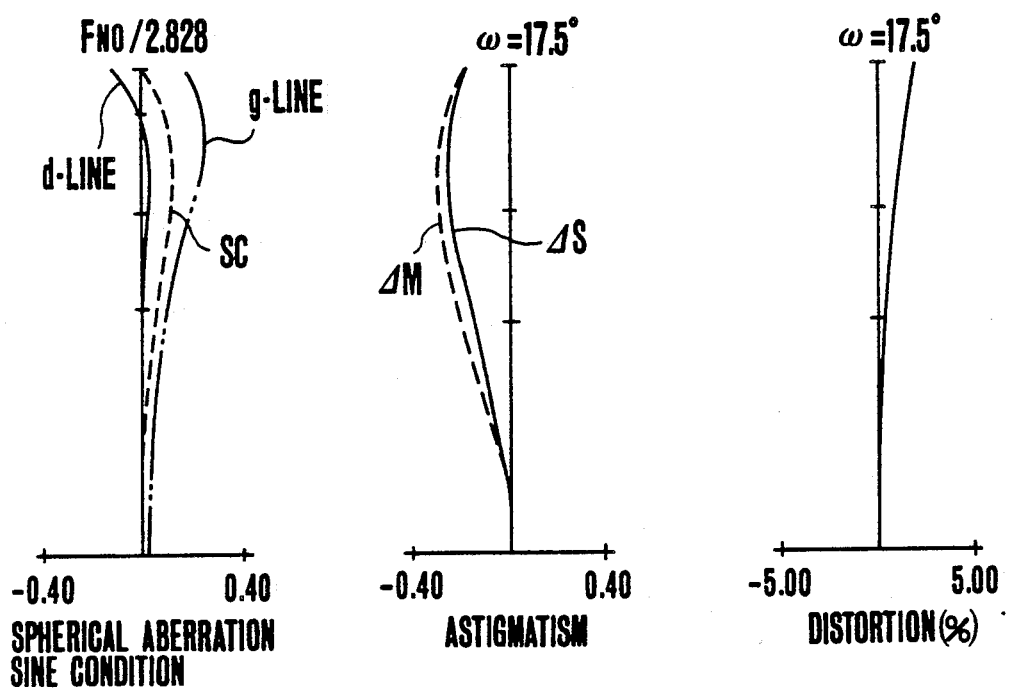

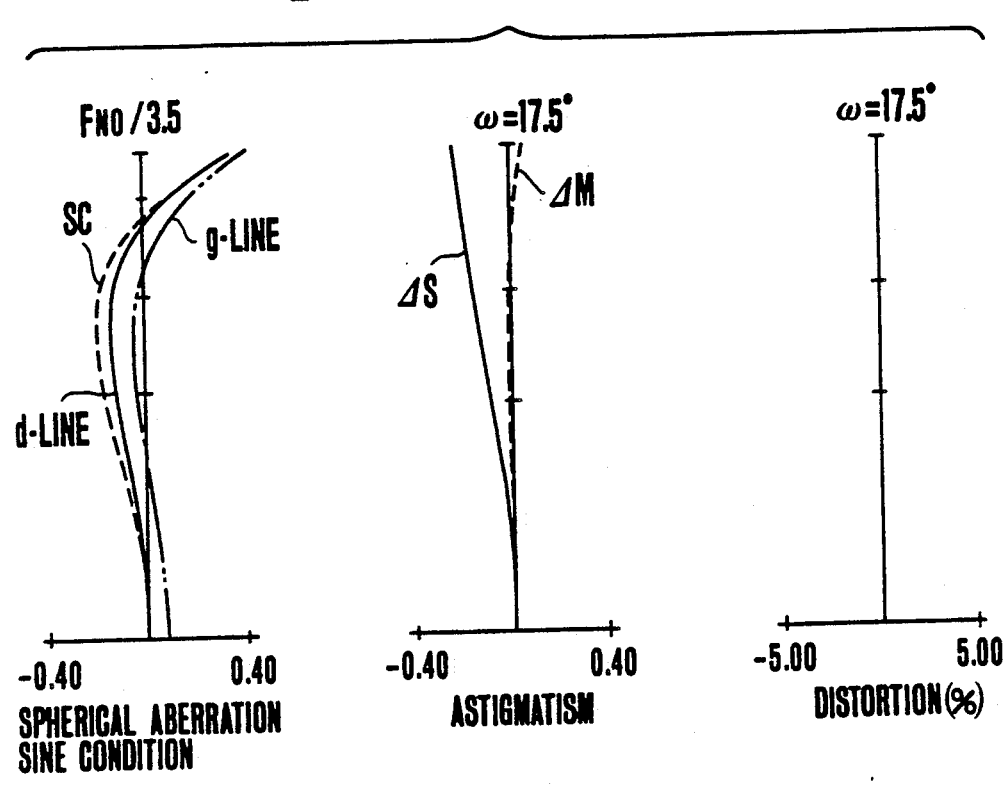

WIDE-ANGLE TYPE ZOOM LENS HAVING INNER-FOCUS LENS

BACKGROUND OF THE INVENTION

1. Field of the Invention

This invention relates to a focusing method for wide-angle type zoom lenses suited to 35 mm film format cameras and has a wide range of application as it can be used even in wide-angle zoom lenses for video cameras or electronic still cameras.

2. Description of the Related Art

For the ordinary single-lens reflex camera, the wide-angle zoom lens whose angle of view is 63° or more (f=35mm or less), in many cases, has its frontmost lens group made negative in refractive power, or it employs the zoom lens of the so-called "negative lead" type. In this negative lead type zoom lens, it is usual to use its first lens group for focusing purposes. With this kind of the type of zoom lens, when the angle of view is increased up to about 84° (f=24 mm or less), a drawback arises that the range of variation of field curvature with focusing increased particularly on the wide-angle side. Also, setting aside the increase of the maximum angle of view, an increase of the relative aperture leads to a drawback that the range of variation of spherical aberration with focusing increases particularly on the telephoto side.

To eliminate the drawback arising from the increase of the maximum angle of view, the first lens group may be divided into two parts which are moved at different speeds from each other so that the curvature of field for an object at a short distance is corrected, as disclosed in Japanese Laid-Open Pat. application No. Sho 52-32342.

In this example, by making nearly afocal the rays of light emerging from the front part of the first lens group, it is made possible to correct the curvature of field on the wide-angle side while simultaneously suppressing the variation of spherical aberration on the telephoto side.

Though, on the optical performance, it corrects aberrations very well, this method, because, from the point of view of the driving of the focusing lens, the first lens group of large diameter has to be moved and, moreover, the speeds of the two parts of that lens group have to be differentiated from each other, gets problems that the complexity of the operating mechanism increases and a large torque is required, and that it sometimes happens that the balance in management becomes bad.

For even another range of 34.3°-63.4° in the angle of view, as the so-called standard zoom lens in terms of the 35 mm single-lens reflex camera there are known 2-group zoom lenses of which the first lens group counting from front is divergent and performs compensation for the shift of the image surface due to zooming, and the second lens group is convergent and performs variation of the image magnification. Further, to the end of increasing either or both of the zoom ratio and the aperture ratio, it is known to divide the second lens group into two or three parts over which the effect of variation of the image magnification is distributed, thus providing a 3-group zoom lens or 4-group zoom lens.

Recently, the proportion of AF (auto-focus) single-lens reflex cameras is increasing. In view of this trend, to speed up focusing by achieving reduction of the weight of the focusing lens is sought as a need of the times.

Another needs, say, wider wide-angle and increased relative aperture, too, are very strong. For a lens satisfying such requirements, if the first lens group is used for focusing purposes, its diameter has to be increased, which in turn makes it heavier, thus giving a large obstacle to the faster focusing by the AF mechanism.

In the meantime, calling for the reduction of the weight of the focusing lens, an example of making movable part of a multi-movable-group zoom lens is also put into practice.

However, the present state of application of this idea is limited to the range of less than 75° in the angle of view and an F-number of 4 or more, that is, relatively dark zoom lenses, since it is not very suited to high relative aperture wide-angle zoom lenses.

Meanwhile, in U.S. Pat. No. 3,682,534 (Japanese Pat. Publication No. Sho 48-6813), the first lens group is divided into two negative lens members, and focusing is performed by the rear member. Japanese Pat. Publication No. Sho 61-53696 (U.S. Pat. No. 4,752,121), too, discloses focusing by part of the first lens group. However, because such a configuration has the movable lens groups for zooming preceded by the lens group for focusing which is stationary during zooming, a difficult problem arises that the total length of the entire lens system is elongated. This increase of the size of the lens makes such a focusing method not adaptable to, in particular, wide-angle lenses for AF.

Another wide-angle zoom lens is disclosed in Japanese Laid-Open Pat. application No. Sho 57-190917, comprising, from the object side, a front group of negative refractive power and a rear group of positive refractive power, thus constituting a 2-group zoom lens. Its practical example has about 3.5 in F-number. A further increase of the relative aperture results in the tendency of making it difficult to afford a hold for the back focal distance. Attempts have been made to increase the range of such a zoom lens by dividing the aforesaid second lens group into three parts of plus-minus-plus arrangement, or by employing the four-group form, as disclosed in Japanese Laid-Open Pat. application No. Sho 55-14403, U.S. Pat. No. 4,759,617 and Japanese Laid-Open Pat. application Nos. Sho 57-11315 and Sho 63-241511. These show examples of application to relatively wide-angle zoom lenses of $2\omega=75.4°$ at the maximum angle of view. With such a configuration left not to change, for a wide-angle large relative aperture zoom lens, there is some possibility of failure of affording a hold for the back focal distance. As an example of application to a wider-angle zoom lens, there is a product: 24-40 mm/2.8 sold from Tokiner Optics Co. Ltd. Even this zoom lens has as low a maximum angle of view as $2\omega=84°$. These have to introduce the 4-group zoom type for the purpose of increasing the relative aperture of the zoom lens.

SUMMARY OF THE INVENTION

An object of the invention is to provide a possibility of quick focusing by the driving power for such a low load as to be required for focusing of, for example, the AF single-lens reflex camera, not to complicate the lens barrel structure, and to realize focusing with good stability of aberration correction while preventing the size of the lens from increasing.

The zoom lens configuration of the invention is that a first lens group of negative refractive power is moved at the same time when a second lens group of positive refractive power and, if any, those that follow, is or are moved to effect zooming, wherein the first lens group is divided into at least two sub-groups (A, B), these sub-groups both are made negative in refractive power, and, when focusing, the sub-group (A) of the object side is made to remain stationary, and the sub-group (B) of the image side is made to move along an optical axis. The sub-groups can, in some cases, be comprised of only one lens element.

As a preferable rule when doing the lens design, letting the focal length of the front sub-group (A) be denoted by $f_A$ and the focal length of the rear sub-group (B) by $f_B$, it is good to satisfy $0.3 < |f_A/f_B| < 11$.

Or, letting the focal length of the first lens group be denoted by $F_1$, it is good to satisfy $1 < f_B/F_1 < 4$.

The above-described idea of making the first lens group to move is employed in order to construct the entirety of the zoom lens in compact form. Particularly in a case where the lens system is constructed with two lens groups, in order that the zoom lens configuration is established, the first lens group and the second lens group must be moved in differential relation.

In another case where three or more lens groups are in use, or in embodiments to be described later where the use of four lens groups is shown, if the first lens group is made stationary during zooming, the paraxial arrangement (the relation of the total zooming movements) comes to work, causing the size of the first lens group or the last lens group to increase objectionably.

As has been described above, to allow a compact first lens group to be constructed, it is necessary to make the first lens group to move when zooming.

In such a zoom lens, the negative first lens group is made constructed with at least two negative sub-groups, or, from front to rear, a sub-group A and a sub-group B. When focusing, the sub-group B is made to move. This focusing method not only has the mere focusing function but also gets to have an effect equivalent to the floating. Suppose the zoom lens has super wide-angles of from, for example, $2\omega = 87°$ (at $f = 20$ mm) to $2\omega = 63°$ (at $f = 35$ mm), then the use of the simple focusing method by moving the first lens group forward leads to the over-correction of the image surface in shorter object distances. To compensate this, according to the prior art, the floating mechanism is introduced.

By using the features of the invention, it is made possible to produce a similar effect of correcting aberrations to that by the floating when focusing.

In application to the standard zoom lens whose range is from the angle of view $2\omega = 63°$ to $2\omega = 35°$ ($f = 70$ mm) and whose F-number is in the class of 2.8, the use of the conventional focusing method by the first lens group will result in over-correction of spherical aberration in short object distances. By taking the feature of the invention, on the other hand, an equivalent correcting effect to the floating is produced.

Such a focusing as described above is realized by moving the sub-group B to the object side as focusing is effected from infinity to shorter object distances.

BRIEF DESCRIPTION OF THE DRAWINGS

FIGS. 2(a), 2(b) and 2(c), FIGS. 3(a), 3(b) and 3(c), FIGS. 5(a), 5(b) and 5(c), FIGS. 6(a), 6(b) and 6(c), FIGS. 8(a), 8(b) and 8(c), FIGS. 9(a), 9(b) and 9(c), FIGS. 11(a), 11(b) and 11(c), FIGS. 12(a), 12(b) and 12(c), FIGS. 14(a), 14(b) and 14(c), FIGS. 15(a), 15(b) and 15(c), FIGS. 17(a), 17(b) and 17(c), FIGS. 18(a), 18(b) and 18(c), FIGS. 20(a), 20(b) and 20(c), FIGS. 21(a), 21(b) and 21(c), FIGS. 23(a), 23(b) and 23(c), FIGS. 24(a), 24(b) and 24(c), FIGS. 26(a), 26(b) and 26(c), FIGS. 27(a), 27(b) and 27(c), FIGS. 29(a), 29(b) and 29(c), and FIGS. 30(a), 30(b) and 30(c) are graphic representations of the aberrations of the numerical examples 1 to 10 of zoom lenses respectively.

DETAILED DESCRIPTION OF THE PREFERRED EMBODIMENTS

Figure 1:
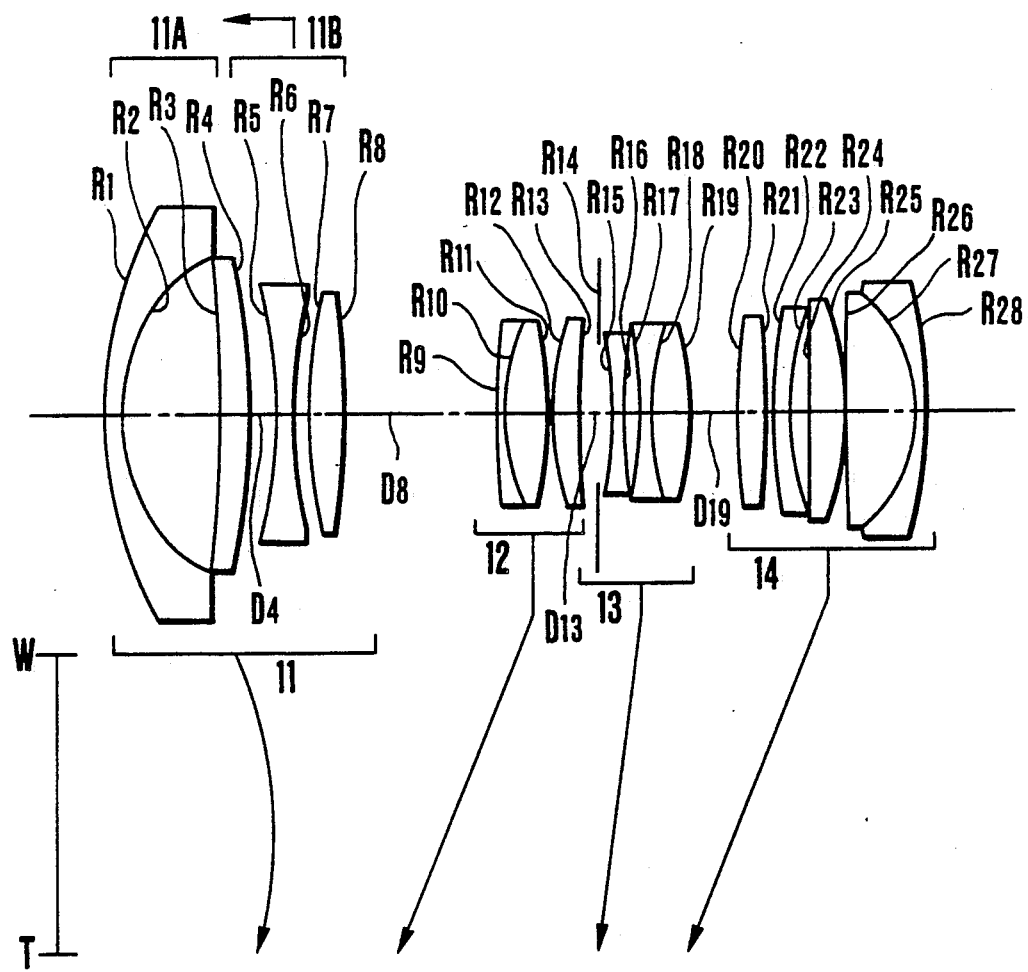
FIG. 1, FIG. 4, FIG. 7, FIG. 10, FIG. 13, FIG. 16, FIG. 19, FIG. 22, FIG. 25 and FIG. 28 are longitudinal section views of numerical examples 1 to 10 of zoom lenses respectively.
Figure 2A:
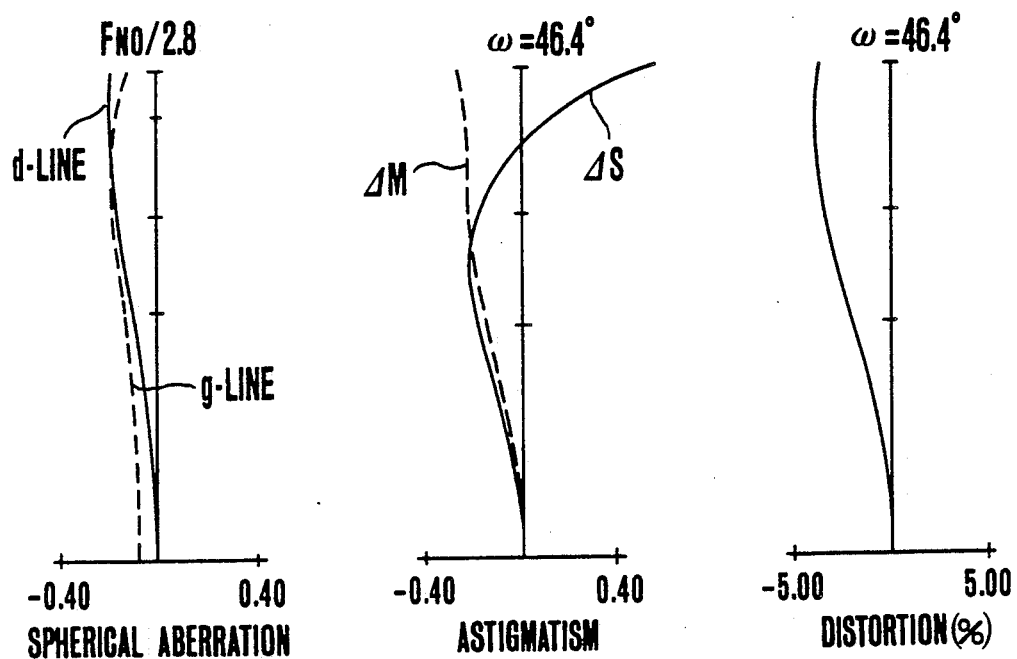
Figure 2B:
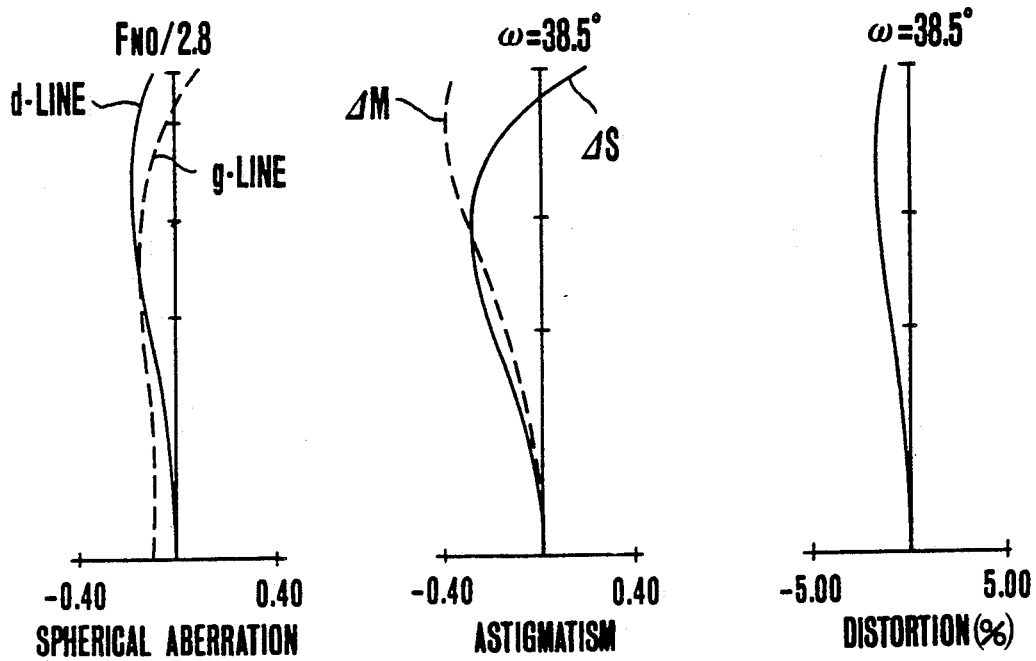
Figure 2C:
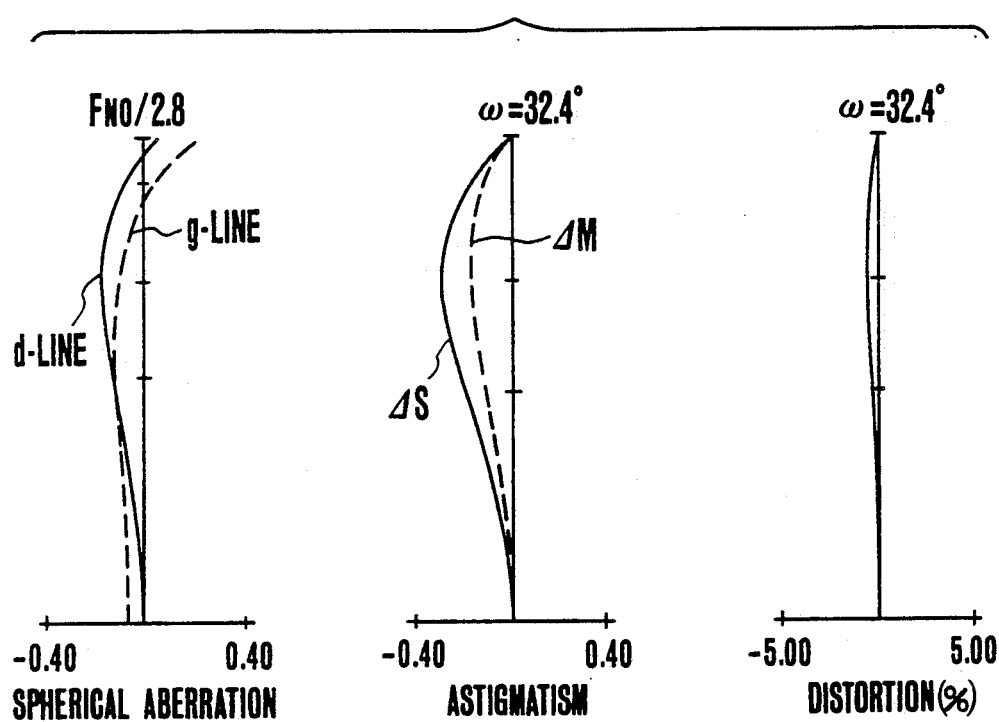
Figure 3A:
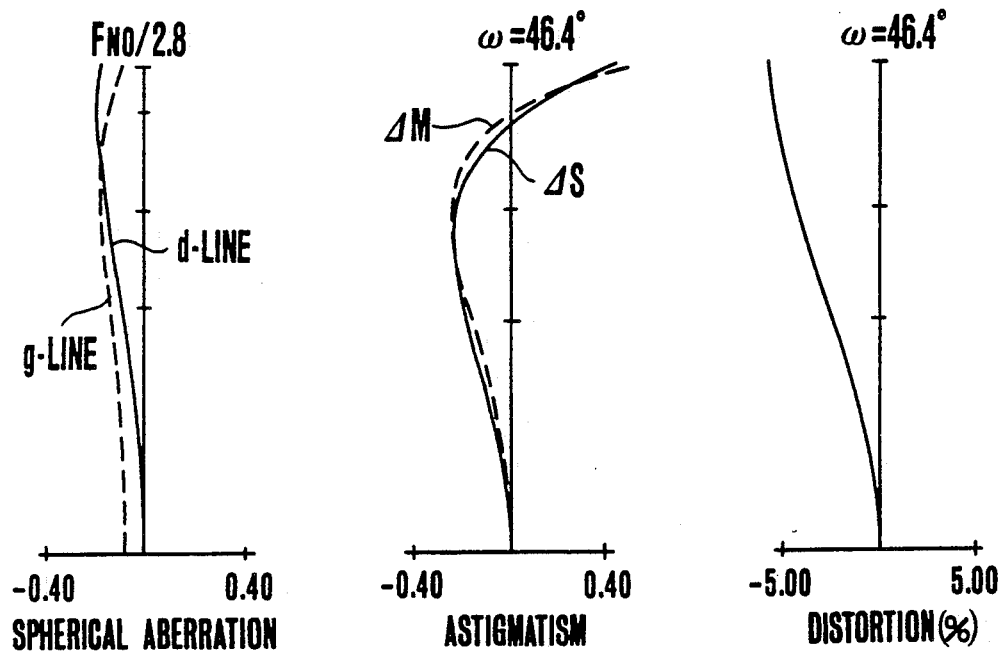
Figure 3B:
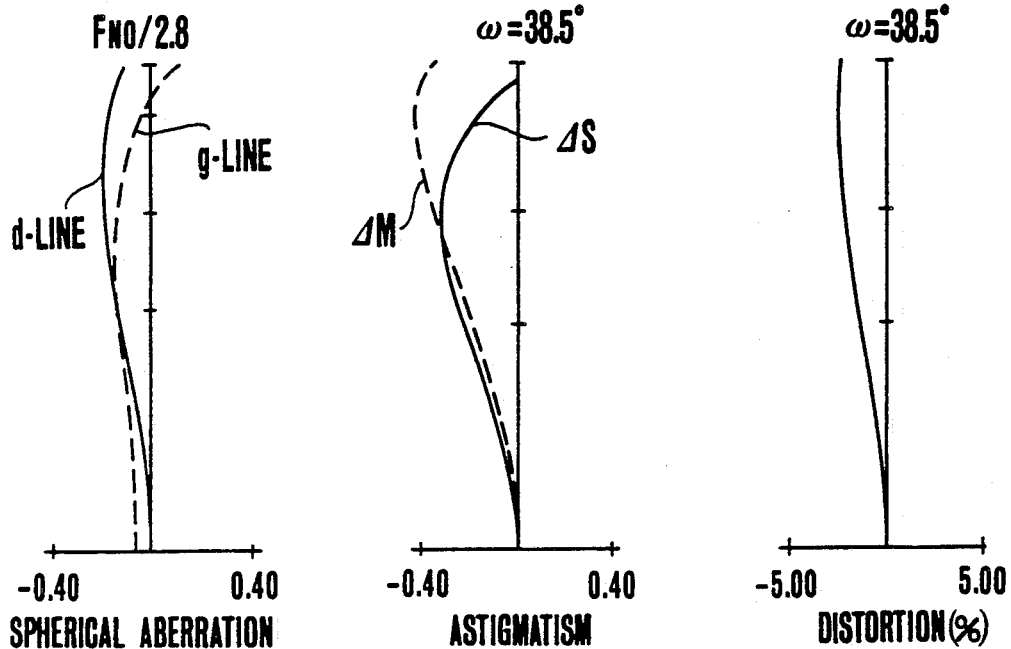
Figure 3C:
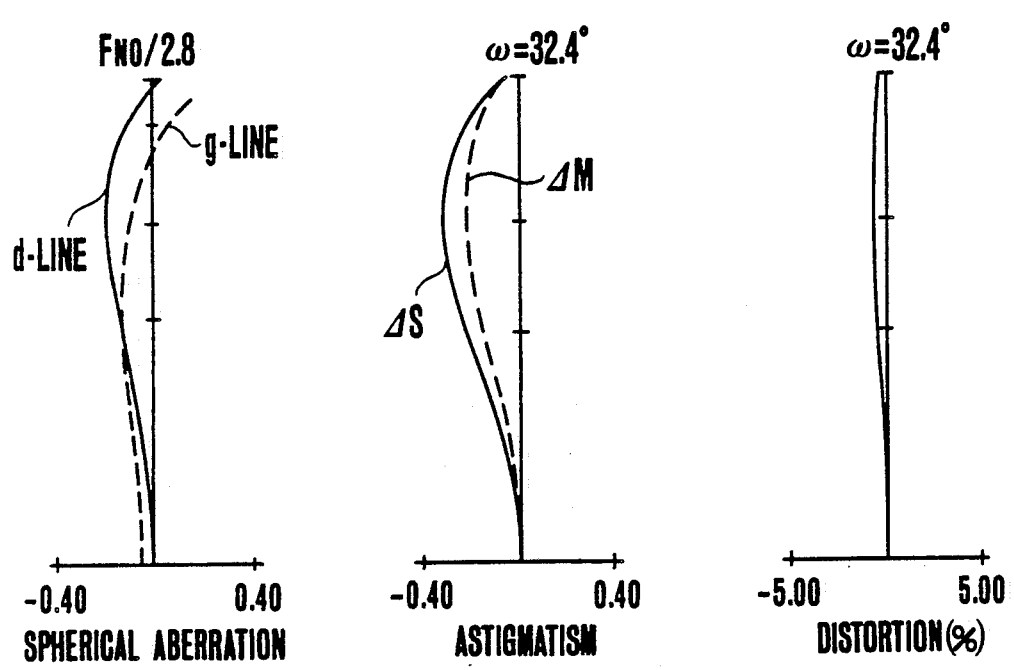

The invention is described in connection with illustrated embodiments thereof by the drawings. In the drawings, 2-group and 4-group zoom lenses are depicted, comprising a first lens group 11 of negative power, a second lens group 12 of positive power, a third lens group of negative power and a fourth lens group 14 of positive power. The first lens group lies at the frontmost side.

Below each lens group, a locus of zooming motion from the wide-angle end (W) to the telephoto end (T) is depicted.

Also, reference numeral 11A denotes a sub-group of negative refractive power which remains stationary during focusing, and reference numeral 11B denotes a sub-group of negative refractive power which is movable for focusing purposes. The sub-groups of the first lens group of such construction are desired to satisfy the following condition:

$$0.3 < |f_A/f_B| < 11 \qquad (1)$$

where $f_A$ and $f_B$ are the focal lengths of the front and rear sub-groups respectively. From the point of view of a further improvement of various aberrations, however, it is also preferable to alter the upper limit of the inequalities (1) to "3" when the lens is constructed. It should be noted that this optical relationship is expressed in respect to the paraxial arrangement of the sub-groups.

When the lower limit of the inequalities (1) is exceeded, as it implies that the focal length $f_B$ of the rear sub-group becomes large, its refractive power share in the first lens group gets smaller. Then, the total focusing movement of the rear sub-group increases so that the air separation between the front sub-group and the rear sub-group (the space for focusing movement) increases. To admit of the oblique rays of light, therefore, the tendency of extremely increasing the diameters of the front and rear sub-groups becomes conspicuous. Another tendency of increasing the closest object distance becomes large in relation to the total focusing movement and the lens diameter.

Such decrease of the refractive power share of the rear sub-group also causes the equivalent effect to the floating to decrease. Hence, the variation of aberrations with focusing cannot be corrected well.

Also, when the upper limit is exceeded, as it implies that the focal length of the rear sub-group becomes small, the refractive power share of the rear sub-group in the first lens group gets stronger. The total focusing movement decreases, which has a merit in advancing the compactness, but aberrational problems also arise. That is, because the refractive power distribution is unduly largely shifted to the rear sub-group, under-correction of distortion in the wide-angle positions gets worse. The variation of aberrations with focusing due to the maldistribution of power tends to intensify. Such an excess concentration of power on the rear sub-group results in the necessity of increasing the complexity of structure of the sub-group B. Hence, the size of the lens system tends to increase objectionably.

Or again, it is desirable to satisfy the following condition (2). The focal length of the first lens group is denoted by $F_1$, and $f_B$ likewise as above represents the focal length of the rear sub-group.

$$1 < f_B/F_1 < 4 \qquad (2)$$

As has already described, by dividing the first lens group into the front sub-group of negative power and the rear sub-group of negative power and by using only the rear sub-group in focusing, the weight of the focusing lens is far lighter than when the whole first lens group is used in focusing. Hence, the stress of the focusing control mechanism and other problems described before can be solved. For example, focusing may be done by one of the second lens group and those that follow which has a relatively small outer diameter and whose weight is also light. In this case, despite the constant object distance, as the zooming position differs, the amount of movement of the focusing lens comes to differ. Therefore, a cam mechanism for focusing becomes necessary to use, causing an increase of the complexity of structure of the operating mechanism.

Another advantage arising from the division of the first lens group into the two sub-groups is that for the same object, the required amount of focusing movement gets smaller than when focusing is performed by the entirety of the first lens group, provided that the focal length of the focusing lens group is the same. In other words, the use of such an arrangement makes it possible to weaken the refractive power of the focusing lens group in the condition that the total focusing movement remains the same. This produces an advantage of narrowing the range of variation of aberrations with focusing.

The above-described inequalities (2) are a condition for appropriately determining the proportion of the refractive power of the focusing lens group in the first lens group. When the lower limit of the inequalities (2) is exceeded, the variation of aberrations wit focusing increases, which becomes difficult to correct. On this account, from the standpoint of improving the performance, it may be considered that the lower limit is altered to "2". For the purpose of narrowing the range of this variation of aberrations, the refractive power of the focusing lens group may be made weaker. But, when the upper limit of the inequalities (2) is exceeded, the total movement becomes too large. This causes the total length of the lens to get elongated and the outer diameter of the front sub-group also to increase largely.

Further, the rear sub-group is constructed with, from front to rear, a negative lens component and a positive lens component. With this, when the radius of curvature, r, of the rear surface of the negative lens component and the radius of curvature, r', of the front surface of the positive lens component satisfy the condition: $r > 0$, $r' > 0$, a high performance zoom lens is obtained.

If $r < 0$, $r' < 0$ are taken in the zoom lens of so wide a maximum angle of view as for the invention to aim at, it results that though some aberrations are canceled at these two surfaces, the distortion each surface produces tends to increase largely. Therefore, the aberration varies to large extent over the zooming range and the focusing range. Hence, its correction is liable to become difficult to perform. If an alternative arrangement of the positive lens component and the negative lens component in this order from front is in use, it is unavoidable that the other curvatures than the radii r and r' get larger. Therefore, large aberrations have to produce.

Within the features described above, if the number of constituent lenses of the focusing lens group is limited to 2, or one negative lens and one positive lens are in use, the weight of the focusing lens group becomes very light and the quickness and easiness of the focusing operation is very improved. But, because of the small number of constituent lenses, the variation of aberrations with focusing and particularly the range of variation of spherical aberration and astigmatism becomes difficult to decrease. To minimize the range of variation of aberrations with focusing, $r > 0$, $r' > 0$ can be combined with the following condition:

$$0.7 < r/r' < 1.2 \qquad (3)$$

r, $r' > 0$ means that the center of curvature lies behind the surface as viewed from the direction in which light advances.

When the lower limit of the inequalities (3) is exceeded, or the radius of curvature of the rear surface of the negative lens is relatively small, the barrel type distortion produced from this surface gets larger. Though this affects reduction of the variation of the astigmatism of the focusing lens group, inward coma is produced instead. Therefore, the variation of spherical aberration is caused to increase. So its correction becomes more difficult to perform. Conversely when the upper limit of the inequalities (3) is exceeded, the coma produced from the front surface of the positive lens increases largely to outward form. Though this affects reduction of the variation of spherical aberration, large pincushion distortion is produced. Therefore, the variation of astigmatism is caused to increase. So its correction becomes more difficult to perform.

It should be noted that it is effective to take the conditions (1) to (3) into account independently of each other, yet it is more effective, of course, to apply any two of the three in combination, or all the three at once.

For the front sub-group, at least one meniscus negative lens concave toward the image side may be included to correct that under-correction of image surface which occurs after the second lens group for a higher grade of imaging performance.

The zoom lens of such character as described above may be modified to the 4-group form comprising, from front to rear, a divergent first lens group, a convergent second lens group, a divergent third lens group and a convergent fourth lens group wherein all these lens groups are made movable for zooming, thereby giving an advantage of further improving the imaging performance. This is because the aberrations can be canceled to better degrees than with the 2-group or 3-group zoom lens. Even if the residual aberrations of the first lens group are made considerably large, the image aberrations can be preserved excellent. From this reason, since the focusing lens group is only part of the first lens group, because the aberrations of the focusing lens group can be made small, the number of lens members of the first lens group may be reduced without sacrificing the imaging performance.

Yet another feature is that the fourth lens group includes at least one negative lens with an advantage of correcting the astigmatism produced from the meniscus negative lens of the sub-group 11A of the first lens group. Thus, a higher performance zoom lens can be realized.

The numerical data are shown below for examples of super wide-angle zoom lenses whose angle of view ranges from $2\omega = 93°$ to $65°$ and of standard zoom lenses whose angle of view ranges from $2\omega = 62°$ to $35°$.

In these numerical examples, Ri represents the radius of curvature of the i-th lens surface counting from front, Di the i-th lens thickness or air separation counting from front, and Ni and $\nu i$ respectively the refractive index for the spectral d-line and the Abbe number of the glass of the i-th lens element counting from front.

The shape of an aspheric surface in the coordinates of an X-axis in the axial direction and an H-axis in the perpendicular direction to the optical axis with the direction in which light advances being taken as positive is expressed by the following equation:

$$X = \frac{(1/R) H^2}{1 + \sqrt{1 - (H/R)^2}} + BH^4 + CH^6 + DH^8 + EH^{10}$$

where R is the radius of the osculating sphere, and B, C, D and E are the aspheric coefficients.

The zoom lens of the numerical example 1 is shown in the longitudinal section view of FIG. 1, and its aberrations with an object at infinity and 1 meter are shown in FIGS. 2(a), 2(b) and 2(c) and FIGS. 3(a), 3(b) and 3(c) respectively.

Numerical Example 1:

$R = 20.6-34.2 \quad FNO = 1:2.8 \quad 2\omega = 93°-65°$

| | | | |
|---|---|---|---|
| *R1 = 62.000 | D1 = 2.20 | N1 = 1.77250 | $\nu 1$ = 49.6 |
| R2 = 20.619 | D2 = 10.40 | | |
| R3 = −394.519 | D3 = 3.40 | N2 = 1.61293 | $\nu 2$ = 37.0 |
| R4 = −90.646 | D4 = 3.60 | | |
| R5 = −52.980 | D5 = 1.60 | N3 = 1.88300 | $\nu 3$ = 40.8 |
| R6 = 53.109 | D6 = 1.94 | | |
| R7 = 58.070 | D7 = 3.50 | N4 = 1.84666 | $\nu 4$ = 23.9 |
| R8 = −242.392 | D8 = Variable | | |
| R9 = 73.270 | D9 = 1.20 | N5 = 1.84666 | $\nu 5$ = 23.9 |
| R10 = 25.588 | D10 = 4.65 | N6 = 1.65160 | $\nu 6$ = 58.5 |
| R11 = −47.628 | D11 = 0.15 | | |
| R12 = 26.836 | D12 = 3.14 | N7 = 1.65160 | $\nu 7$ = 58.5 |
| R13 = 130.997 | D13 = Variable | | |
| R14 = Stop | D14 = 1.50 | | |
| R15 = −60.366 | D15 = 1.10 | N8 = 1.81600 | $\nu 8$ = 46.6 |
| R16 = 51.294 | D16 = 2.15 | | |
| R17 = −37.359 | D17 = 1.10 | N9 = 1.69680 | $\nu 9$ = 55.5 |
| R18 = 27.938 | D18 = 4.10 | N10 = 1.80518 | $\nu 10$ = 25.4 |
| R19 = −55.566 | D19 = Variable | | |
| R20 = 85.181 | D20 = 3.00 | N11 = 1.51633 | $\nu 11$ = 64.1 |
| R21 = −110.775 | D21 = 0.91 | | |
| R22 = 68.527 | D22 = 2.00 | N12 = 1.76182 | $\nu 12$ = 26.5 |
| R23 = 37.210 | D23 = 1.93 | | |
| R24 = 1093.805 | D24 = 3.80 | N13 = 1.69680 | $\nu 13$ = 55.5 |
| R25 = −37.162 | D25 = 0.20 | | |
| R26 = 464.036 | D26 = 7.50 | N14 = 1.65160 | $\nu 14$ = 58.5 |
| R27 = −18.493 | D27 = 1.40 | N15 = 1.84666 | $\nu 15$ = 23.9 |
| R28 = −55.992 | | | |

*Aspheric

Values of Aspheric Coefficients     Values of Factors

-continued

Numerical Example 1:

| | |
|---|---|
| B = 5.8920 × $10^{-6}$ | $F_1$ = −28.0 |
| C = −4.9470 × $10^{-10}$ | $f_A$ = −56.82 |
| D = 3.7880 × $10^{-13}$ | $f_B$ = −71.92 |
| E = 3.3853 × $10^{-15}$ | $R_5/R_6$ = 0.998 |

| | f | | |
|---|---|---|---|
| | 20.6 | 27.2 | 34.0 |
| D8 | 17.415 | 7.016 | 1.012 |
| D13 | 2.307 | 4.747 | 7.187 |
| D19 | 5.9 | 3.460 | 1.020 |

With the zoom lens of FIG. 1, when zooming from the wide-angle end to the telephoto end, the four lens groups move in such a way that the separation between the first lens group and the second lens group decreases, the separation between the second and third lens groups increases, and the separation between the third and fourth lens groups decreases. For the loci of motion, as shown in FIG. 1, the first lens group moves rearward on the wide-angle side, or slightly forward on the telephoto side, and the second to fourth lens groups move forward.

The first lens group is constructed from a negative front sub-group comprising, from front to rear, a negative meniscus lens convex toward the front and a positive lens and a negative rear sub-group comprising, from front to rear, a bi-concave lens and a positive lens whose front surface is of strong curvature convex toward the front.

When focusing from infinity to the closest object distance, the rear sub-group moves axially forward.

In this example, because the angle of view in the wide-angle end is $2\omega = 93°$, as this implies a super wide-angle zoom lens, for the purpose of correcting distortion, an aspheric surface is set in the negative meniscus lens of the front sub-group 11A of the first lens group and a negative lens and a positive lens are set in the rear sub-group 11B.

If the rear sub-group is used for well correcting the variation of spherical aberration with zooming and focusing, it is preferred that the aforesaid negative lens takes the bi-concave form. The variation of spherical aberration is altered by a suitable design of the positive lens on the image side of that negative lens.

And, at the concave surface of the negative lens, the distortion is extremely under-corrected in the wide-angle end. As to this, the use of the above-described rules of design for the front sub-group provides a possibility of well correcting the aberration.

It is also to be noted that the use of a arrangement of the bi-concave lens and a positive meniscus lens convex toward the front in the rear sub-group of the first lens group makes it possible to correct the spherical aberration for the wide-angle end resulting from the increase of the relative aperture, while preserving the negative refractive power.

Numerical Example 2:

$F = 20.50000 \quad FNO = 1:2.8 \quad 2\omega = 93°-65°$

| | | | |
|---|---|---|---|
| *R1 = 69.188 | D1 = 2.10 | N1 = 1.74400 | $\nu 1$ = 44.8 |
| R2 = 21.608 | D2 = 10.00 | | |
| R3 = 61.729 | D3 = 5.50 | N2 = 1.62004 | $\nu 2$ = 36.3 |
| R4 = −258.519 | D4 = 3.80 | | |
| R5 = −79.065 | D5 = 1.60 | N3 = 1.88300 | $\nu 3$ = 40.8 |
| R6 = 33.025 | D6 = 4.50 | | |
| R7 = 40.916 | D7 = 4.00 | N4 = 1.84666 | $\nu 4$ = 23.9 |

-continued

Numerical Example 2:

| | | | |
|---|---|---|---|
| R8 = 272.037 | D8 = Variable | | |
| R9 = Stop | D9 = 1.05 | | |
| R10 = 83.706 | D10 = 2.60 | N5 = 1.88300 | ν5 = 40.8 |
| R11 = −131.265 | D11 = 1.20 | N6 = 1.84666 | ν6 = 23.9 |
| R12 = 213.136 | D12 = 0.20 | | |
| R13 = 42.043 | D13 = 3.60 | N7 = 1.88300 | ν7 = 40.8 |
| R14 = −72.240 | D14 = 4.23 | | |
| R15 = −34.027 | D15 = 1.50 | N8 = 1.84666 | ν8 = 23.9 |
| R16 = −117.300 | D16 = 5.37 | | |
| R17 = 76.089 | D17 = 3.50 | N9 = 1.62041 | ν9 = 60.3 |
| R18 = −27.933 | D18 = 0.15 | | |
| R19 = −29.600 | D19 = 1.00 | N10 = 1.8300 | ν10 = 40.8 |
| R20 = 34.582 | D20 = 2.20 | | |
| R21 = −144.064 | D21 = 3.50 | N11 = 1.65160 | ν11 = 58.5 |
| R22 = −28.558 | D22 = 1.00 | N12 = 1.84666 | ν12 = 23.9 |
| R23 = −34.837 | D23 = 0.10 | | |
| R24 = −150.014 | D24 = 2.75 | N13 = 1.62041 | ν13 = 60.3 |
| R25 = −51.325 | D25 = 0.11 | | |
| R26 = 762.579 | D26 = 3.00 | N14 = 1.62041 | ν14 = 60.3 |
| R27 = −59.661 | | | |

*Aspheric

| Values of Aspheric Coefficients | Values of Factors |
|---|---|
| B = 4.92428 × $10^{-6}$ | $F_1$ = −33.4 |
| C = −8.81613 × $10^{-10}$ | $f_A$ = −125.5 |
| D = 7.41805 × $10^{-13}$ | $f_B$ = −57.19 |
| E = 1.65937 × $120^{-15}$ | $R_6/R_7$ = 0.807 |

| | f | | |
|---|---|---|---|
| | 20.5 | 27.3 | 34.1 |
| D8 | 28.85 | 13.57 | 4.39 |

Figure 4:
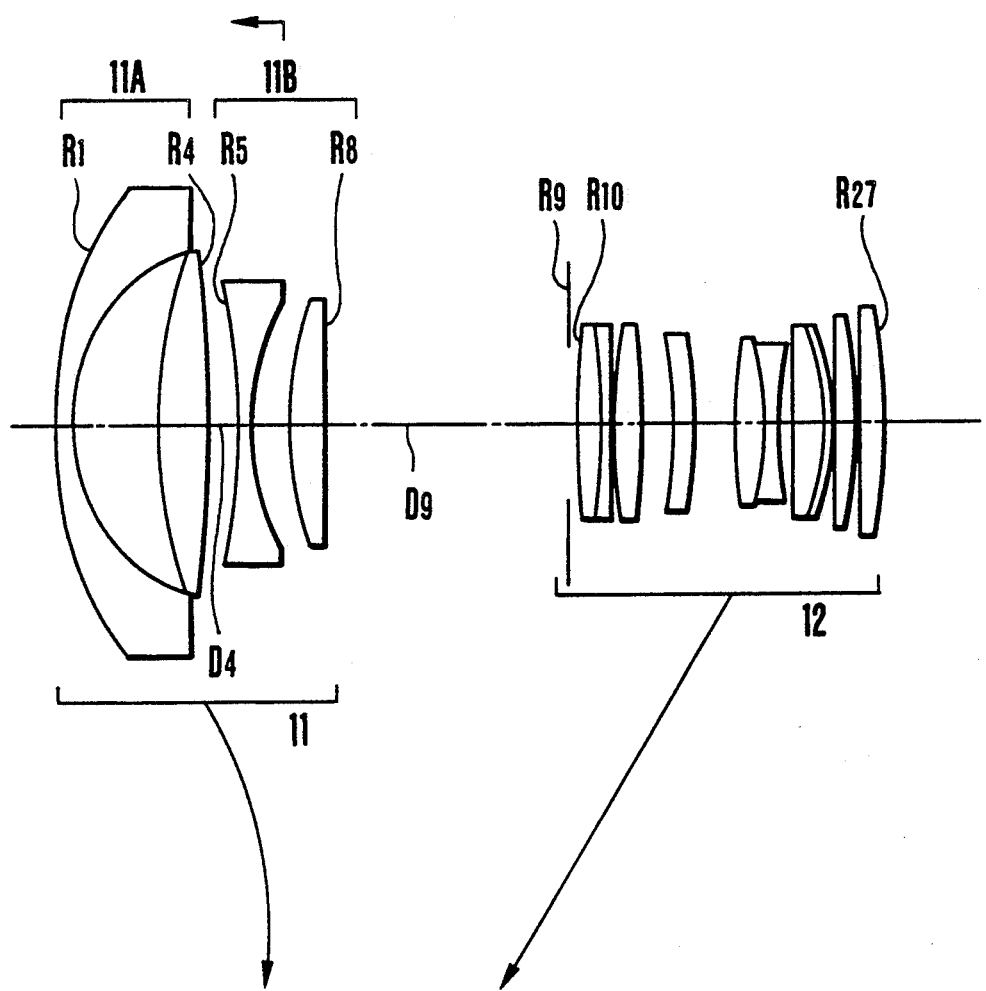
Figure 5A:
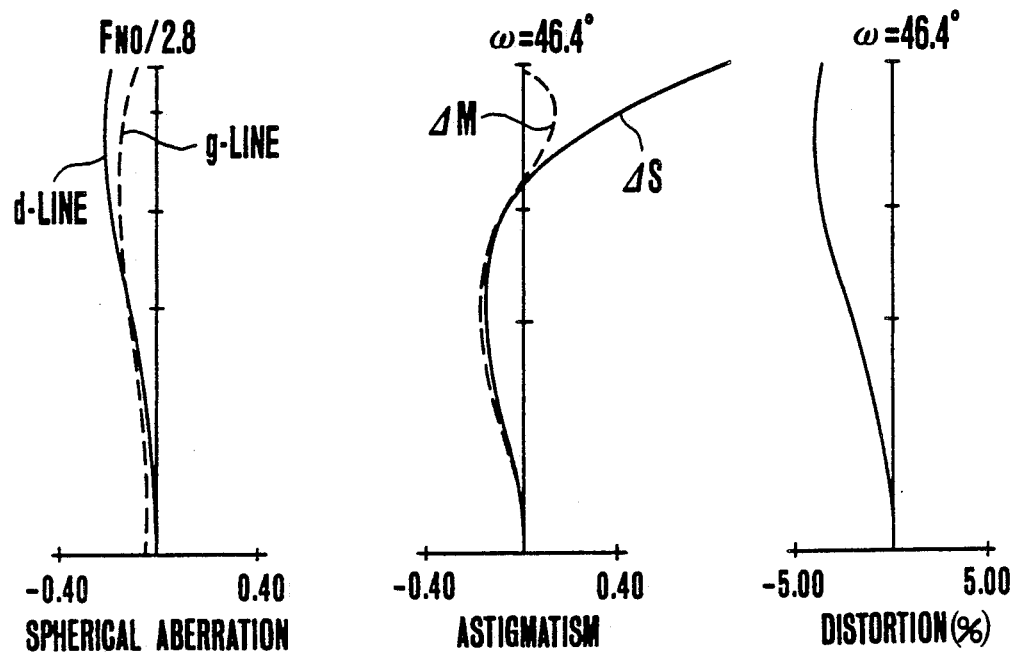
Figure 5B:
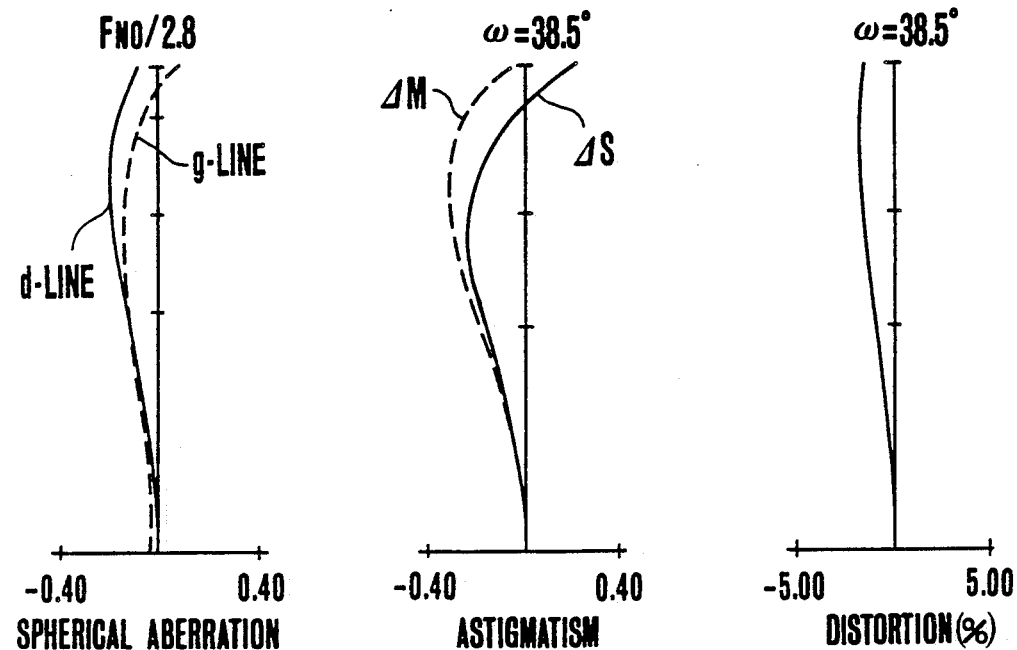
Figure 5C:
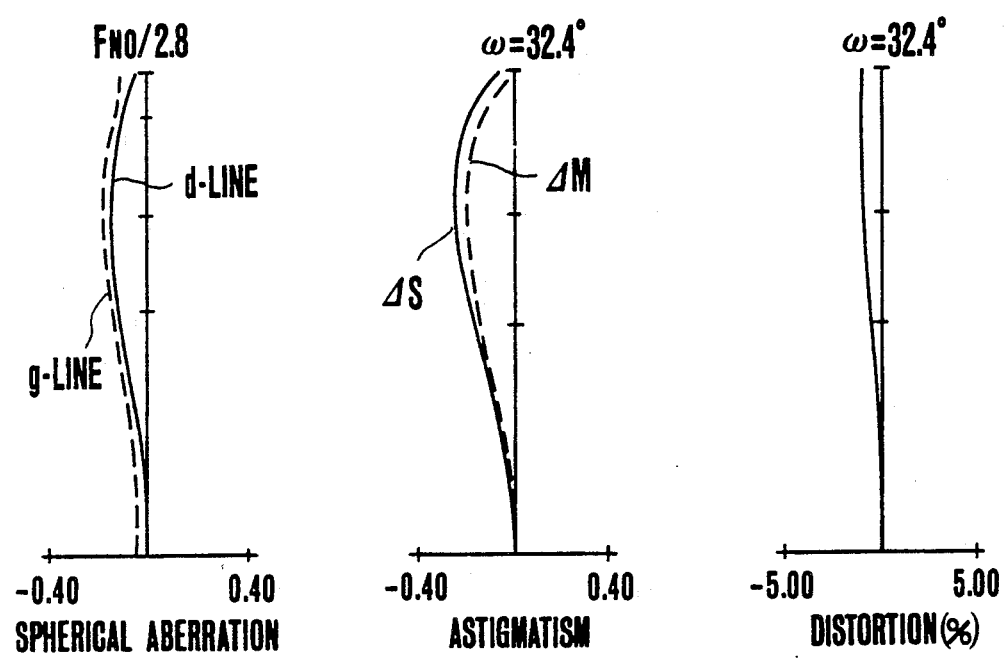
Figure 6A:
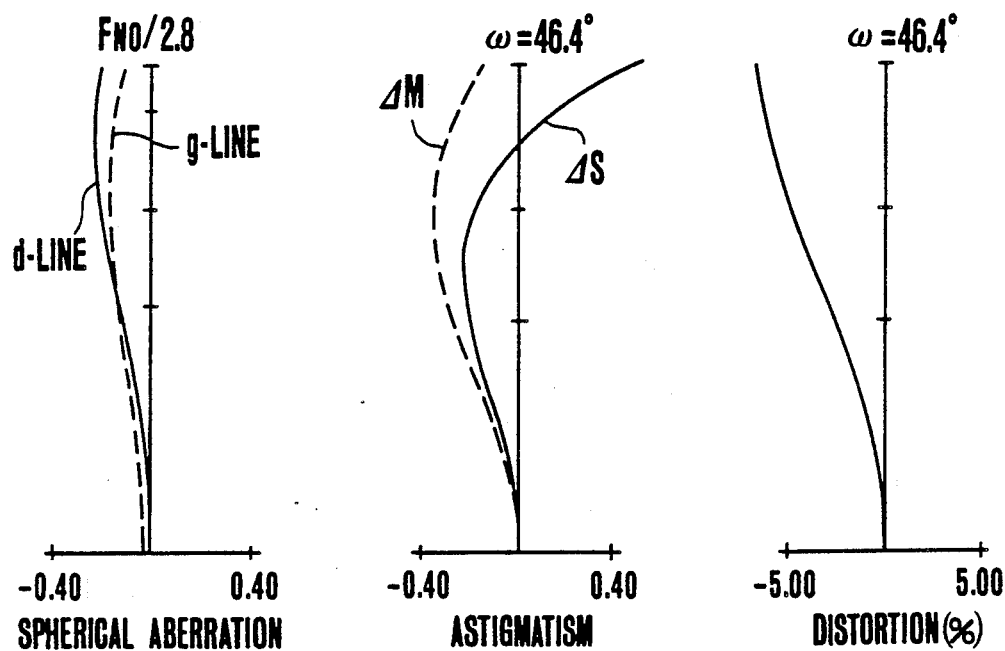
Figure 6B:
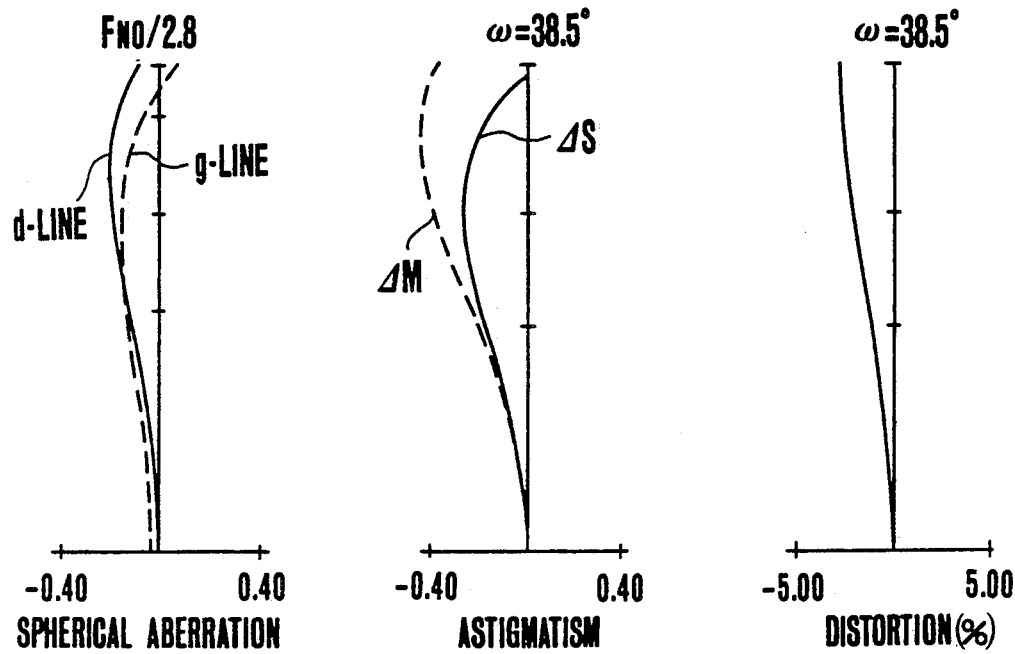
Figure 6C:
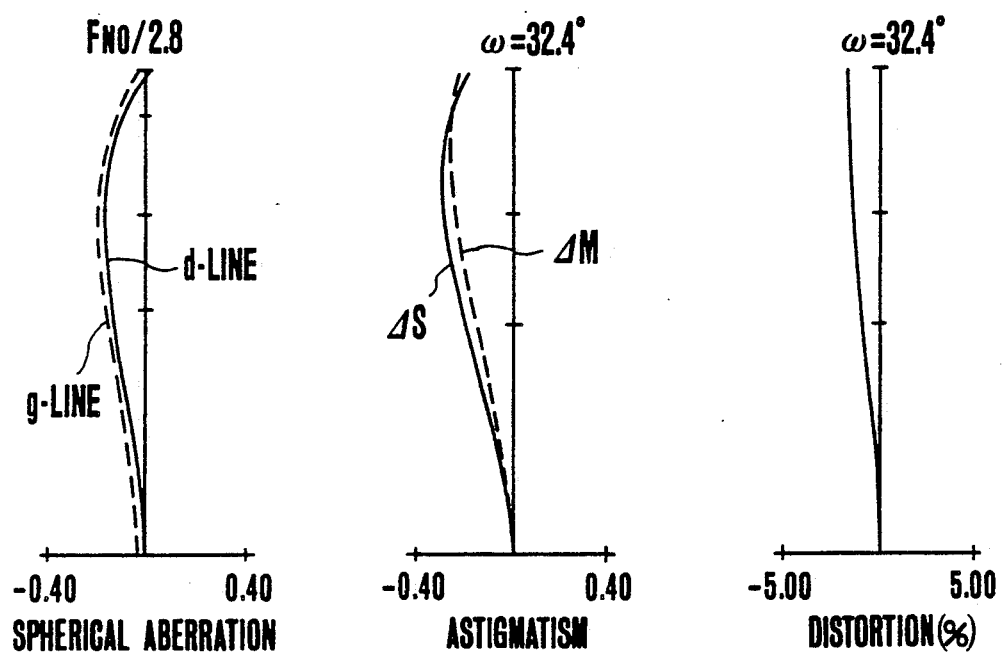

The zoom lens of the example 2 is shown in the longitudinal section view of FIG. 4 and its aberrations with an object at infinity and 1 meter are shown in FIGS. 5(a), 5(b) and 5(c) and FIGS. 6(a), 6(b) and 6(c) respectively.

A negative first lens group 11 and a positive second lens group 12 constitute the zoom lens of the 2-group form. When zooming, the first lens group and the second lens group both move axially.

As shown in FIG. 4, the second lens group moves forward as zooming from the wide-angle end to the telephoto end, while the first lens group moves in such a way as to decrease the separation between the first and second lens groups.

The first lens group 11 is constructed from two negative sub-groups. The front sub-group 11A comprises a negative meniscus lens convex toward the front and a positive lens, and the rear sub-group 11B comprises a bi-concave lens and a positive lens whose front surface is of strong curvature convex toward the front.

When focusing from infinity to finite distances, the rear sub-group 11B moves axially forward.

Numerical Example 3:

F = 20.59999   FNO = 1:2.8   2ω = 93°−65°

| | | | |
|---|---|---|---|
| *R1 = 62.000 | D1 = 2.20 | N1 = 1.77250 | ν1 = 49.6 |
| R2 = 19.719 | D2 = 11.00 | | |
| R3 = −160.795 | D3 = 3.00 | N2 = 1.61293 | ν2 = 37.0 |
| R4 = −91.758 | D4 = 3.60 | | |
| R5 = −51.064 | D5 = 1.60 | N3 = 1.88300 | ν3 = 40.8 |
| R6 = 85.280 | D6 = 3.50 | N4 = 1.84666 | ν4 = 23.9 |
| R7 = −114.765 | D7 = Variable | | |
| R8 = 84.439 | D8 = 1.20 | N5 = 1.84666 | ν5 = 23.9 |
| R9 = 27.478 | D9 = 4.65 | N6 = 1.65160 | ν6 = 58.5 |
| R10 = −51.499 | D10 = 0.15 | | |
| R11 = 24.468 | D11 = 3.14 | N7 = 1.65160 | ν7 = 58.5 |
| R12 = 119.825 | D12 = Variable | | |
| R13 = Stop | D13 = 1.50 | | |
| R14 = −68.773 | D14 = 1.10 | N8 = 1.81600 | ν8 = 46.6 |
| R15 = 45.327 | D15 = 2.15 | | |

-continued

Numerical Example 3:

| | | | |
|---|---|---|---|
| R16 = −43.961 | D16 = 1.10 | N9 = 1.69680 | ν9 = 55.5 |
| R17 = 23.936 | D17 = 4.10 | N10 = 1.80518 | ν10 = 25.4 |
| R18 = −67.829 | D18 = Variable | | |
| R19 = 94.338 | D19 = 3.00 | N11 = 1.51633 | ν11 = 64.1 |
| R20 = −166.021 | D20 = 0.13 | | |
| R21 = 63.134 | D21 = 2.00 | N12 = 1.76182 | ν12 = 26.5 |
| R22 = 38.688 | D22 = 1.93 | | |
| R23 = 1111.903 | D23 = 3.80 | N13 = 1.69680 | ν13 = 55.5 |
| R24 = −38.361 | D24 = 0.20 | | |
| R25 = 248.146 | D25 = 7.50 | N14 = 1.65160 | ν14 = 58.5 |
| R26 = −17.633 | D26 = 1.40 | N15 = 1.84666 | ν15 = 23.9 |
| R27 = −55.850 | | | |

*Aspheric

| Values of Aspheric Coefficients | Values of Factors |
|---|---|
| B = 6.36045 × $10^{-6}$ | $F_1$ = −28.0 |
| C = −2.58667 × $10^{-10}$ | $f_A$ = −45.3 |
| D = 2.86020 × $10^{-13}$ | $f_B$ = −100.1 |
| E = 4.22784 × $10^{-15}$ | $R_5/R_6$ = 1.0 |

| | f | | |
|---|---|---|---|
| | 20.6 | 27.4 | 34.27 |
| D7 | 19.10 | 8.59 | 2.57 |
| D12 | 2.15 | 4.63 | 7.11 |
| D18 | 5.90 | 3.42 | 0.94 |

Figure 7:
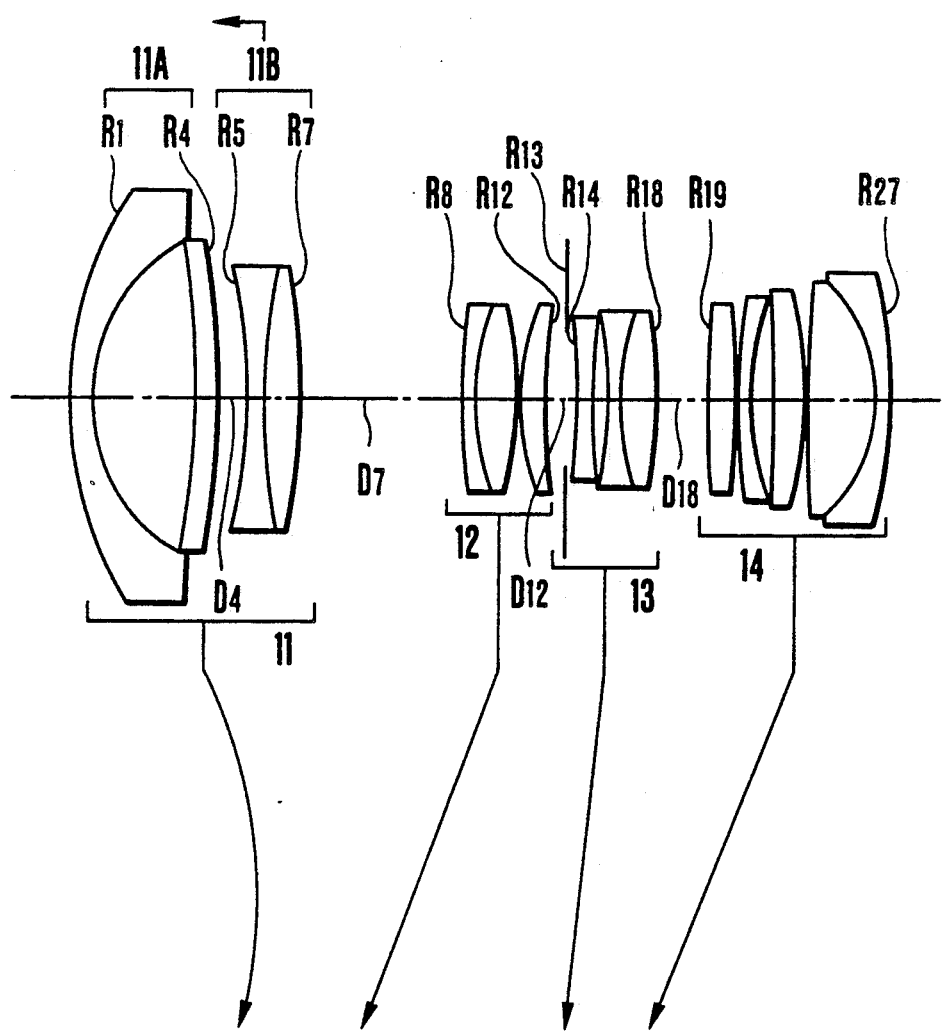
Figure 8A:
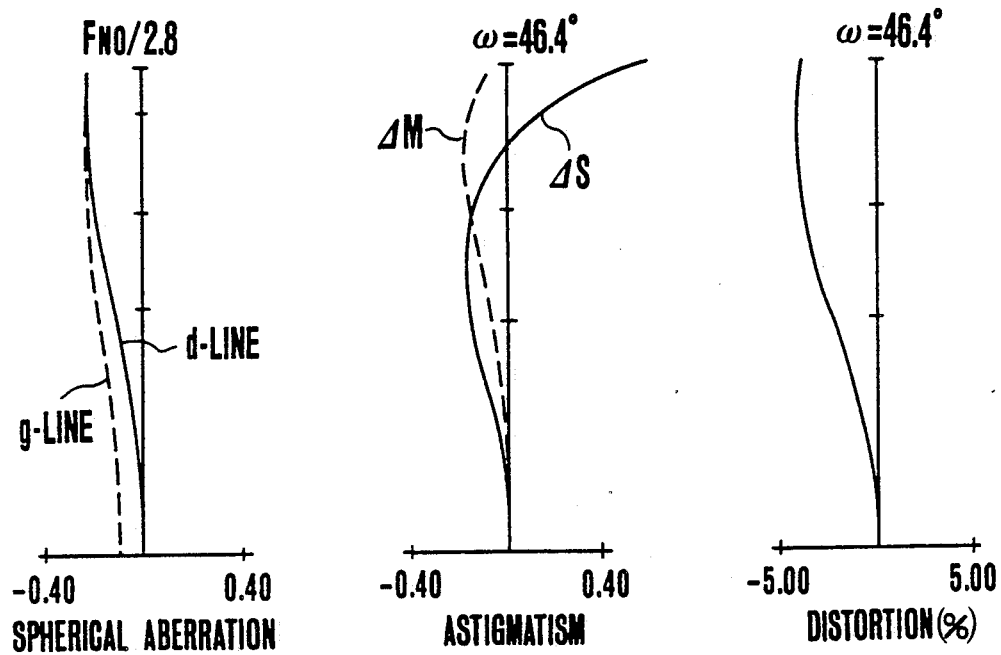
Figure 8B:
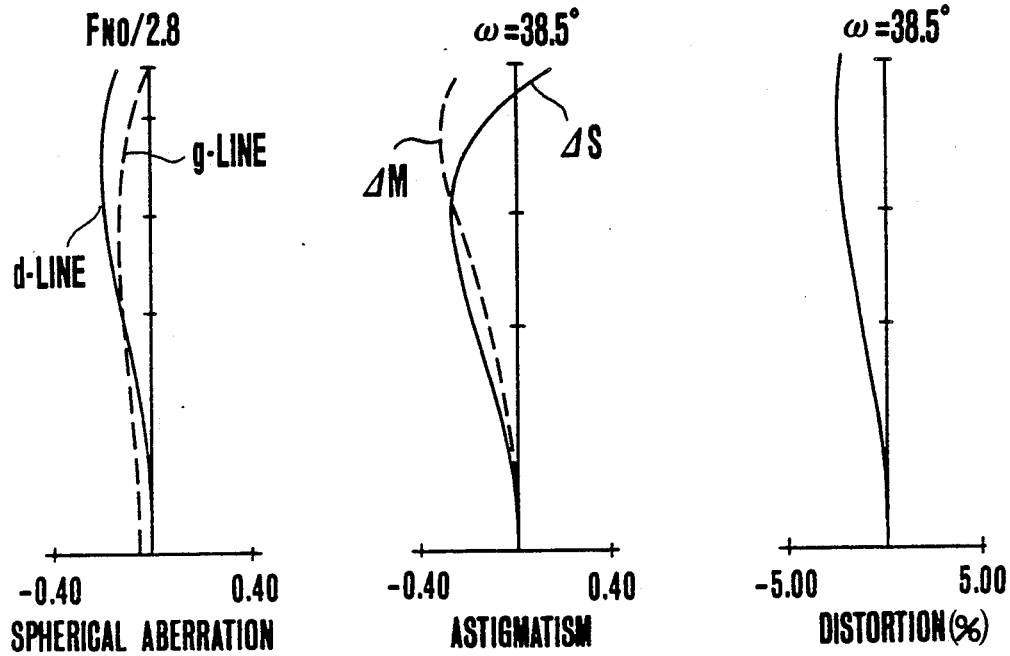
Figure 8C:
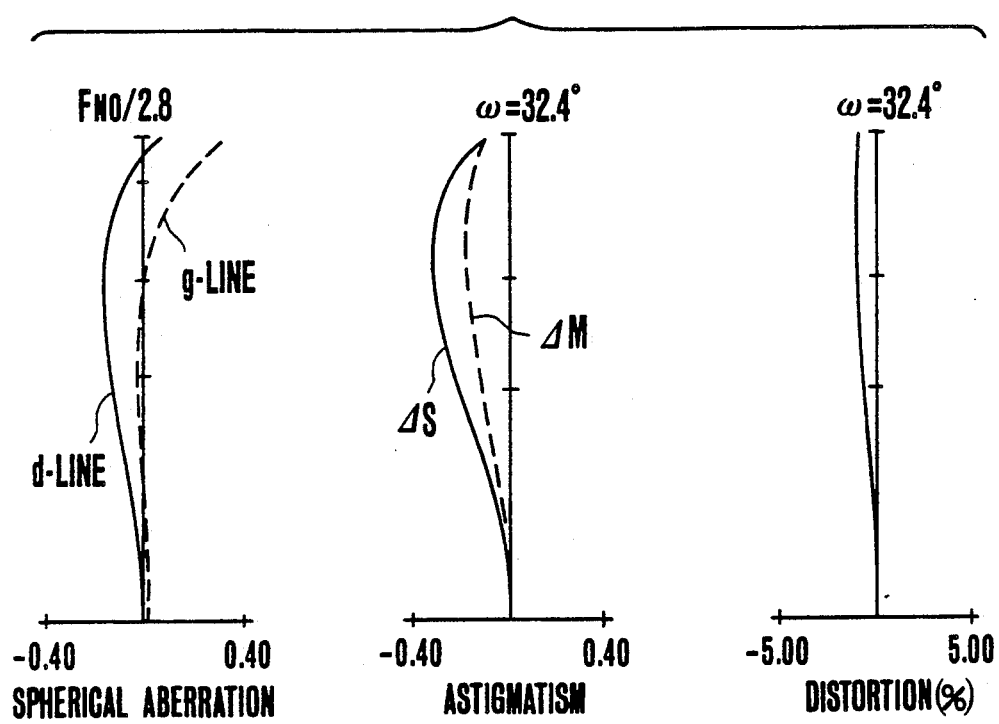
Figure 9A:
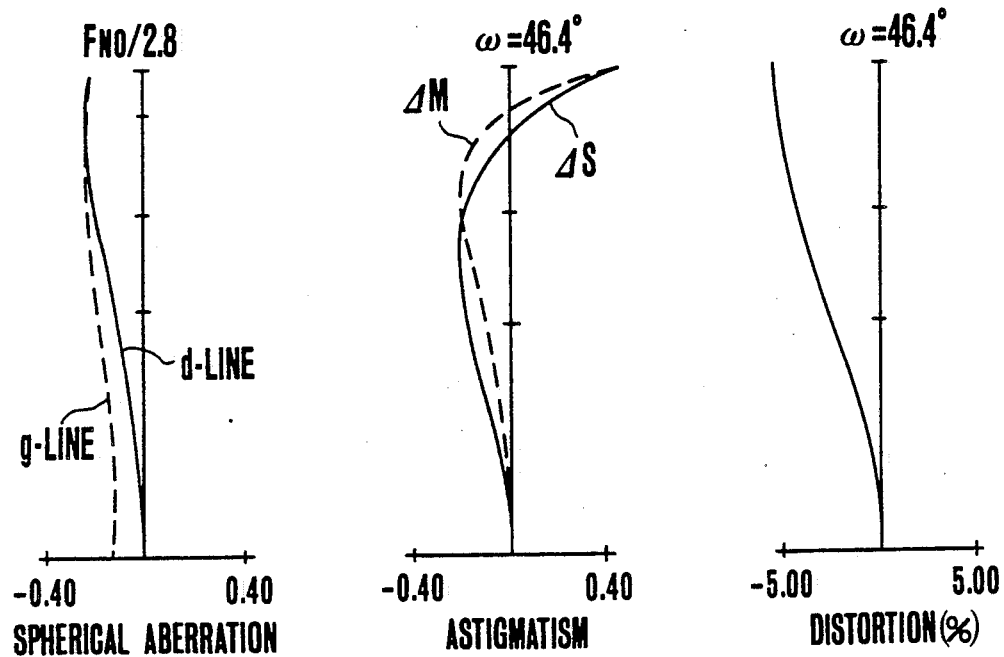
Figure 9B:
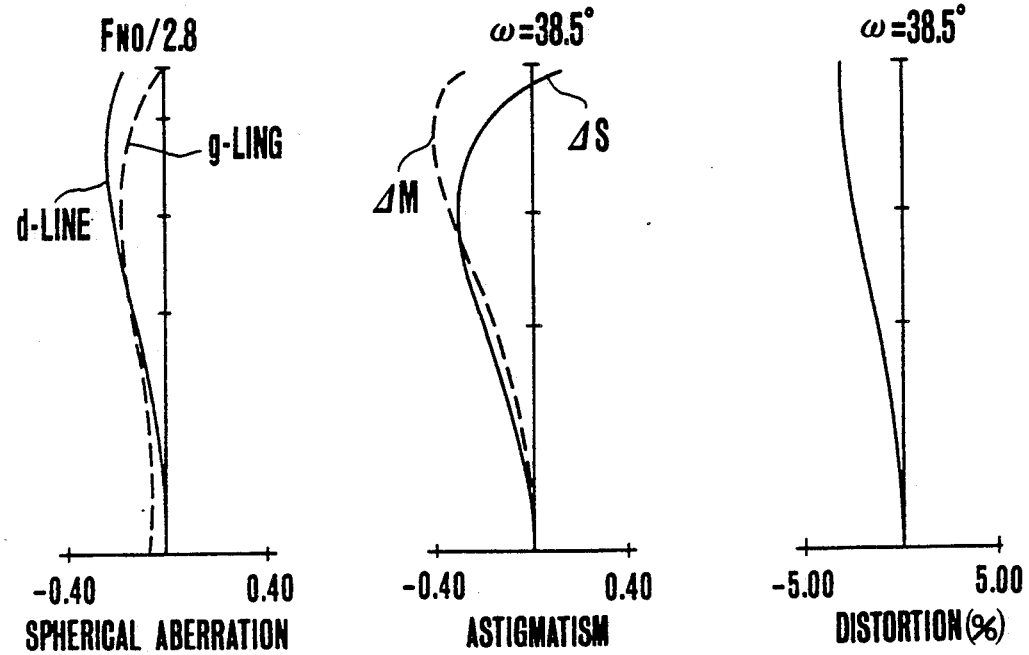
Figure 9C:
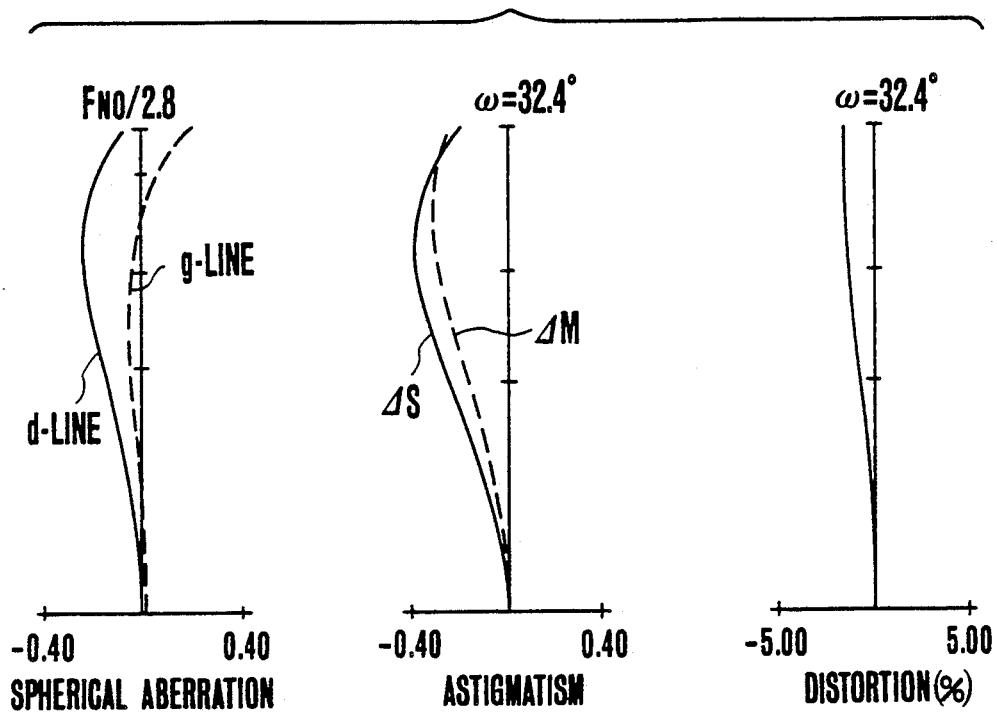

The zoom lens of the example 3 is shown in the longitudinal section view of FIG. 7 and its aberrations with an object at infinity and 1 meter are shown in FIGS. 8(a), 8(b) and 8(c) and FIGS. 9(a), 9(b) and 9(c).

A negative first lens group 11 counting from the front, a positive second lens group 12, a negative third lens group 13 and a positive fourth lens group 14 constitute the zoom lens. When zooming from the wide-angle end to the telephoto end, the separation between the first lens group 11 and the second lens group 12 decreases, the separation between the second lens group 12 and the third lens group 13 increases, and the separation between the third lens group 13 and the fourth lens group 14 decreases.

For the first lens group, its front sub-group 11A is constructed with two lenses, of which the front is a negative meniscus lens convex toward the front followed by a positive lens, and the rear sub-group 11B is constructed with a cemented negative doublet consisting of a bi-concave lens and a positive lens. When focusing from infinity to finite distances, the rear sub-group 11B moves axially forward.

Numerical Example 4:

F = 20.59999   FNO = 1:2.8   2ω = 93°−65°

| | | | |
|---|---|---|---|
| *R1 = 62.000 | D1 = 2.20 | N1 = 1.77250 | ν1 = 49.6 |
| R2 = 19.897 | D2 = 10.30 | | |
| R3 = −432.725 | D3 = 3.50 | N2 = 1.61293 | ν2 = 37.0 |
| R4 = −77.220 | D4 = 3.00 | | |
| R5 = −49.998 | D5 = 1.60 | N3 = 1.88300 | ν3 = 40.8 |
| R6 = 40.293 | D6 = 2.70 | N4 = 1.80518 | ν4 = 25.4 |
| R7 = 56.743 | D7 = 1.00 | | |
| R8 = 53.191 | D8 = 3.30 | N5 = 1.76182 | ν5 = 26.5 |
| R9 = −178.582 | D9 = Variable | | |
| R10 = 74.118 | D10 = 1.20 | N6 = 1.84666 | ν6 = 23.9 |
| R11 = 25.878 | D11 = 4.65 | N7 = 1.65160 | ν7 = 58.5 |
| R12 = −48.431 | D12 = 0.15 | | |
| R13 = 26.061 | D13 = 3.14 | N8 = 1.65160 | ν8 = 58.5 |
| R14 = 119.068 | D14 = Variable | | |
| R15 = Stop | D15 = 1.50 | | |
| R16 = −61.291 | D16 = 1.10 | N9 = 1.81600 | ν9 = 46.6 |
| R17 = 48.345 | D17 = 2.15 | | |
| R18 = −43.670 | D18 = 1.10 | N10 = 1.69680 | ν10 = 55.5 |
| R19 = 26.698 | D19 = 4.10 | N11 = 1.80518 | ν11 = 25.4 |
| R20 = −63.630 | D20 = Variable | | |
| R21 = 115.728 | D21 = 3.00 | N12 = 1.51633 | ν12 = 64.1 |

-continued

Numerical Example 4:

| | | | |
|---|---|---|---|
| R22 = −347.512 | D22 = 0.48 | | |
| R23 = 68.058 | D23 = 2.00 | N13 = 1.76182 | ν13 = 26.5 |
| R24 = 40.613 | D24 = 1.93 | | |
| R25 = 474.345 | D25 = 3.80 | N14 = 1.69680 | ν14 = 55.5 |
| R26 = −35.094 | D26 = 0.20 | | |
| R27 = 245.824 | D27 = 7.50 | N15 = 1.65160 | ν15 = 58.5 |
| R28 = −19.189 | D28 = 1.40 | N16 = 1.84666 | ν16 = 23.9 |
| R29 = −60.532 | | | |

*Aspheric

| Values of Aspheric Coefficients | Values of Factors |
|---|---|
| $B = 6.21293 \times 10^{-6}$ | $F_1 = -28.0$ |
| $C = -3.58078 \times 10^{-10}$ | $f_A = -59.0$ |
| $D = 1.24853 \times 10^{-13}$ | $f_B = -70.2$ |
| $E = 4.24724 \times 10^{-15}$ | $R_6/R_7 = 1.07$ |

| | f | | |
|---|---|---|---|
| | 20.6 | 27.3 | 34.1 |
| D9 | 17.33 | 6.80 | 0.75 |
| D14 | 2.16 | 4.64 | 7.12 |
| D20 | 5.90 | 3.42 | 0.94 |

Figure 10:
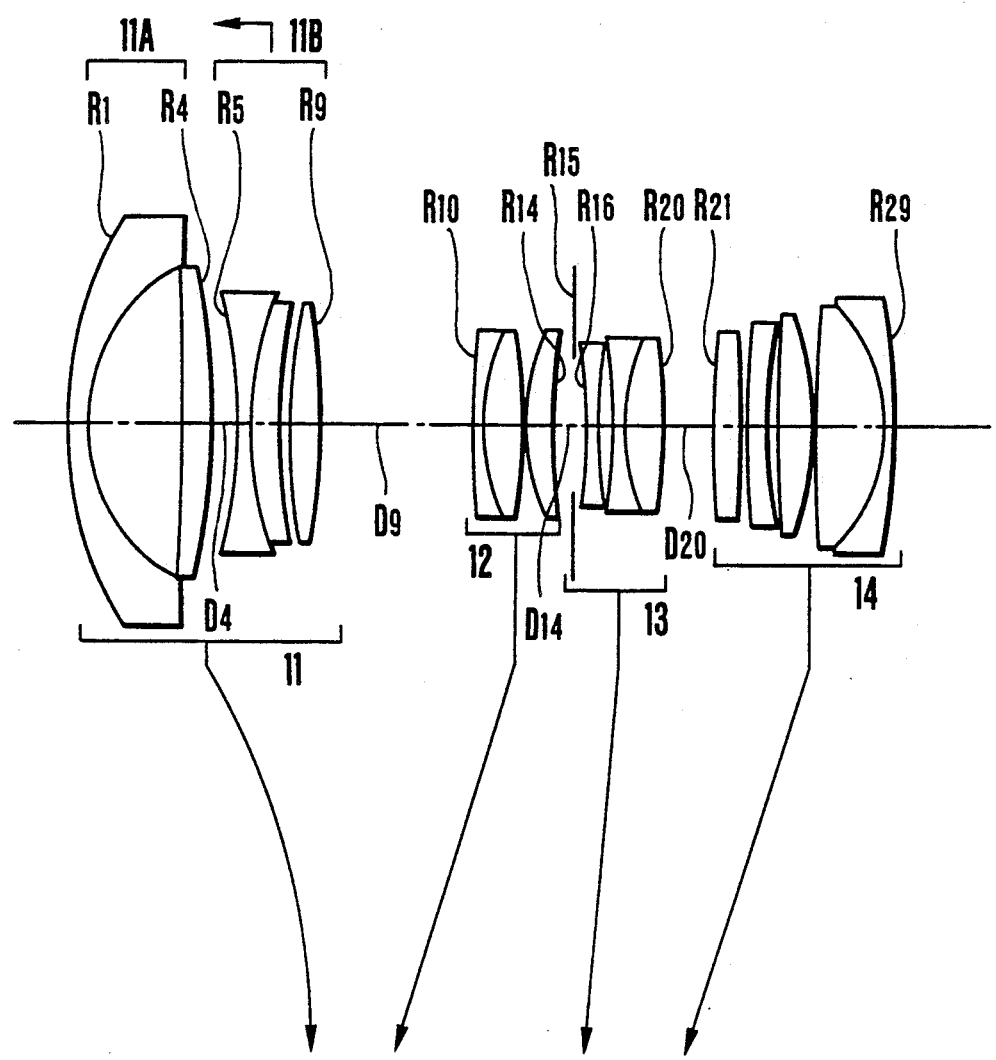
Figure 11A:
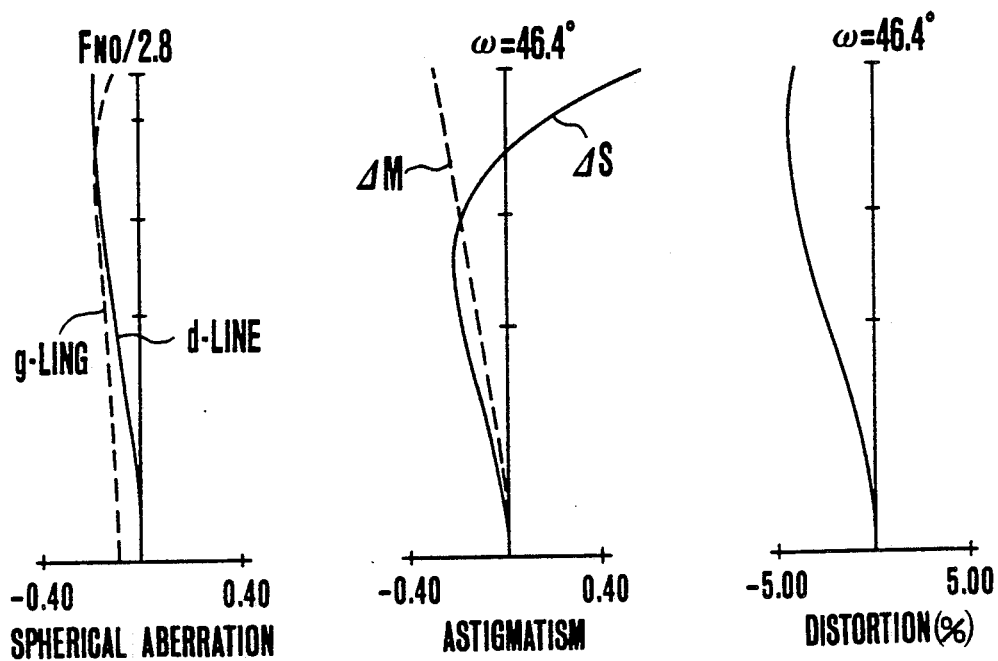
Figure 11B:
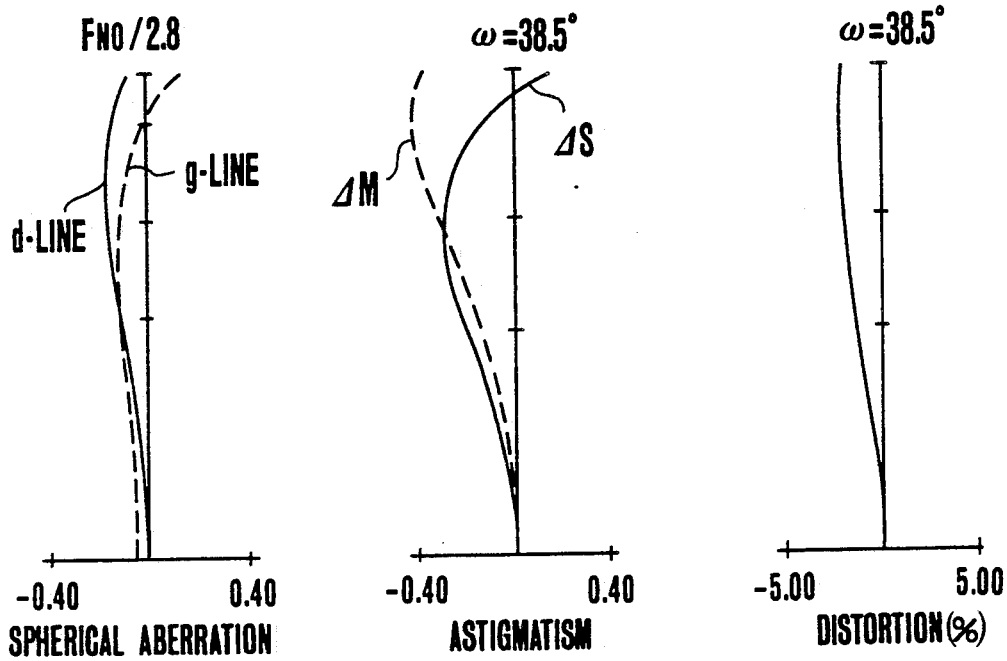
Figure 12A:
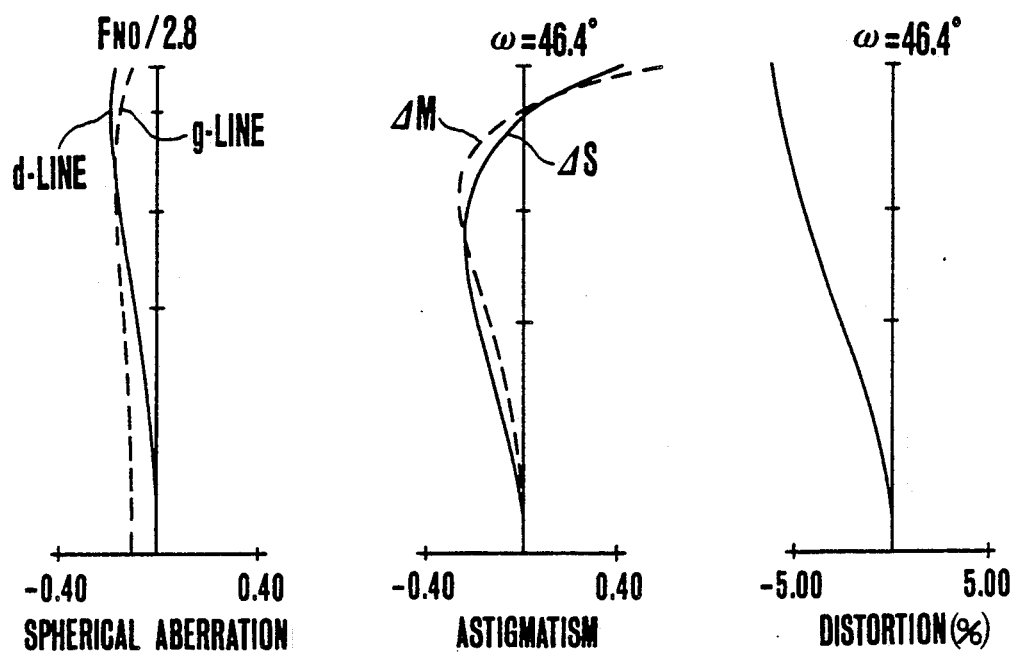
Figure 12B:
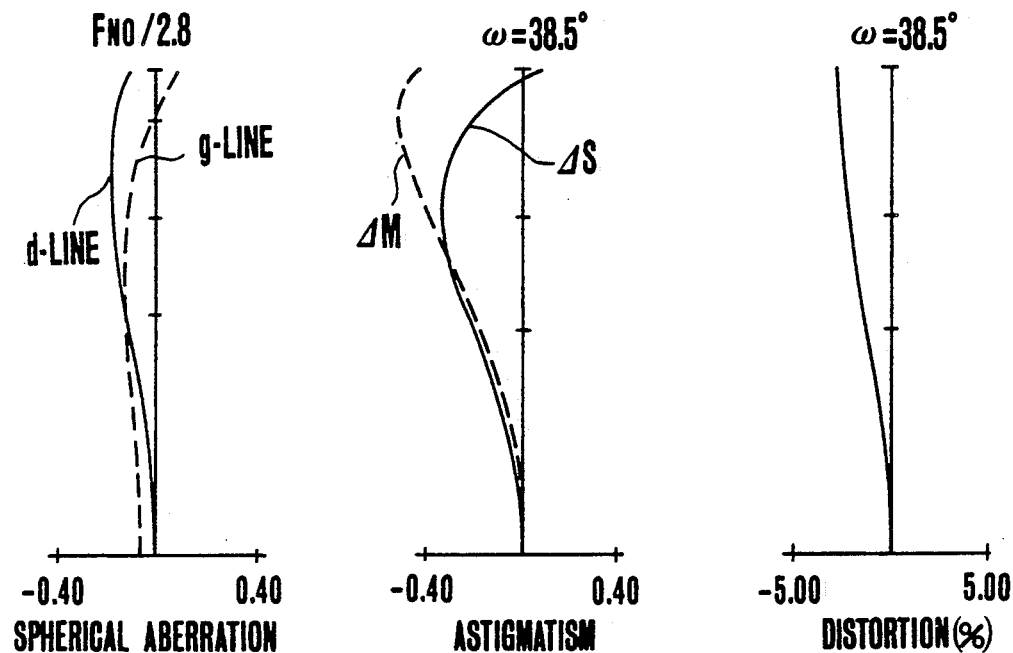
Figure 12C:
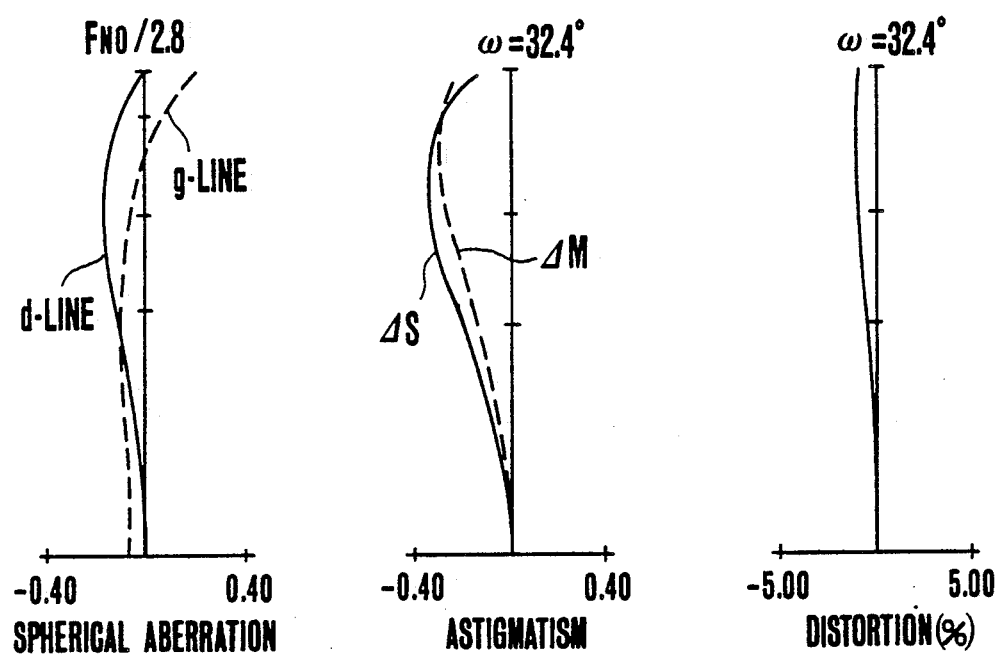

The zoom lens of the example 4 is shown in the longitudinal section view of FIG. 10 and its aberrations with an object at infinity and 1 meter are shown in FIGS. 11(a), 11(b) and 11(c) and FIGS. 12(a), 12(b) and 12(c) respectively.

A negative first lens group 11 counting from the front, a positive second lens group 12, a negative third lens group 13 and a positive fourth lens group 14 constitute the zoom lens. When zooming from the wide-angle end to the telephoto end, the separation between the first lens group 11 and the second lens group 12 decreases, the separation between the second lens group 12 and the third lens group 13 increases and the separation between the third lens group 13 and the fourth lens group 14 decreases.

For the first lens group, its front sub-group 11A is constructed with two lenses, of which the front is a negative meniscus lens convex toward the front followed by a positive lens, and its rear sub-group 11B is constructed with a negative cemented doublet consisting of a biconcave lens and a positive lens. When focusing from infinity to finite distances, the rear sub-group 11B moves axially forward.

Numerical Example 5:
F = 67.95 − 35.93  FNO = 1:2.828  2ω = 35° − 62°

| | | | |
|---|---|---|---|
| *R1 = 71.545 | D1 = 2.20 | N1 = 1.77250 | ν1 = 49.6 |
| R2 = 36.661 | D2 = 14.68 | | |
| R3 = −120.365 | D3 = 1.80 | N2 = 1.88300 | ν2 = 40.8 |
| R4 = 54.024 | D4 = 1.70 | | |
| R5 = 60.717 | D5 = 3.97 | N3 = 1.84666 | ν3 = 23.9 |
| R6 = −6989.016 | D6 = Variable | | |
| R7 = 90.513 | D7 = 1.50 | N4 = 1.84666 | ν4 = 23.9 |
| R8 = 35.995 | D8 = 6.13 | N5 = 1.69680 | ν5 = 55.5 |
| R9 = −117.445 | D9 = 0.15 | | |
| R10 = 58.981 | D10 = 3.08 | N6 = 1.77250 | ν6 = 49.6 |
| R11 = 115.128 | D11 = 0.15 | | |
| R12 = 49.513 | D12 = 4.48 | N7 = 1.69680 | ν7 = 55.5 |
| R13 = 1229.061 | D13 = Variable | | |
| R14 = −110.357 | D14 = 3.37 | N8 = 1.78472 | ν8 = 25.7 |
| R15 = −34.261 | D15 = 1.30 | N9 = 1.65844 | ν9 = 50.9 |
| R16 = 60.882 | D16 = 2.87 | | |
| R17 = Stop | D17 = Variable | | |
| R18 = −129.950 | D18 = 1.30 | N10 = 1.84666 | ν10 = 23.9 |
| R19 = 42.128 | D19 = 2.33 | | |
| R20 = −123.711 | D20 = 2.27 | N11 = 1.69680 | ν11 = 55.5 |
| R21 = −52.154 | D21 = 0.15 | | |

Numerical Example 5:
F = 67.95 − 35.93  FNO = 1:2.828  2ω = 35° − 62°

| | | | |
|---|---|---|---|
| R22 = 62.882 | D22 = 4.63 | N12 = 1.77250 | ν12 = 49.6 |
| R23 = −62.882 | | | |

*Aspheric

| | f | | |
|---|---|---|---|
| | 67.95 | 52.08 | 35.93 |
| D6 | 1.00 | 13.20 | 37.12 |
| D13 | 16.62 | 10.01 | 3.40 |
| D17 | 3.30 | 9.91 | 16.52 |

$F_1 = -52.49$
$f_A = 100.28$
$f_B = -100.38$
$R_5/R_6 = 0.89$

Equation for Aspheric First Surface R1:

$$x = \frac{h^2/R}{1 + \sqrt{1 - (h/R)^2}} + A' h^3 + Bh^4 + B' h^5 +$$
$$Ch^6 + C' h^7 + Dh^8 + D' h^9 + Eh^{10}$$

where x is the deviation in the axial direction and h is the height from the optical axis.

| | |
|---|---|
| $A' = -4.56 \times 10^{-7}$ | $C' = 5.60 \times 10^{-10}$ |
| $B = 1.01 \times 10^{-6}$ | $D = -1.68 \times 10^{-11}$ |
| $B' = -1.38 \times 10^{-8}$ | $D' = -4.24 \times 10^{-15}$ |
| $C = -5.44 \times 10^{-9}$ | $E = 5.64 \times 10^{-15}$ |

Figure 13:
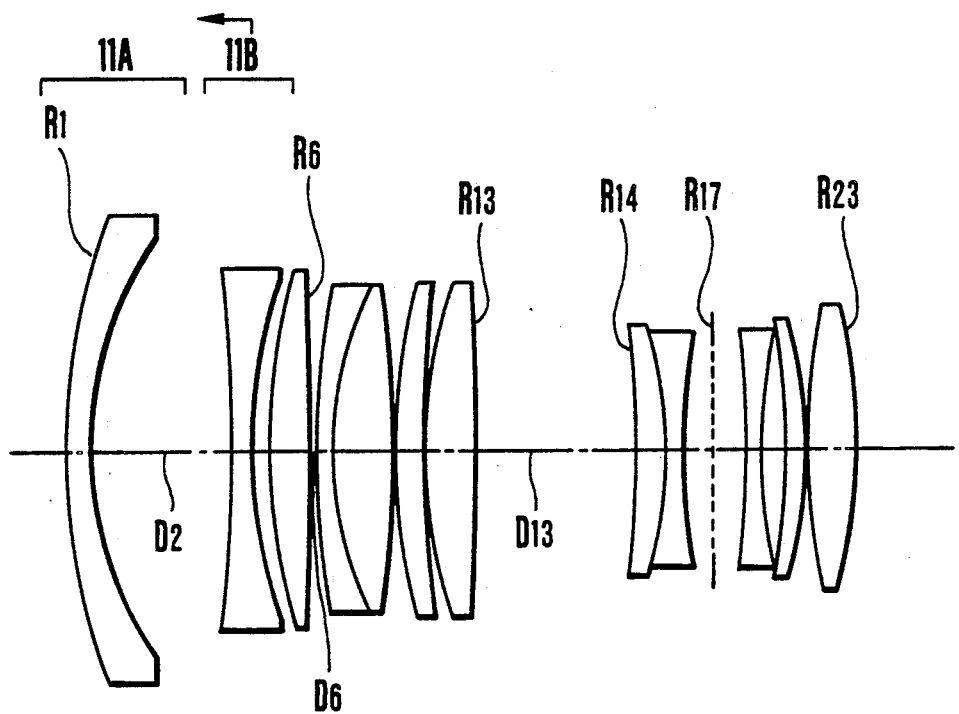
Figure 14A:
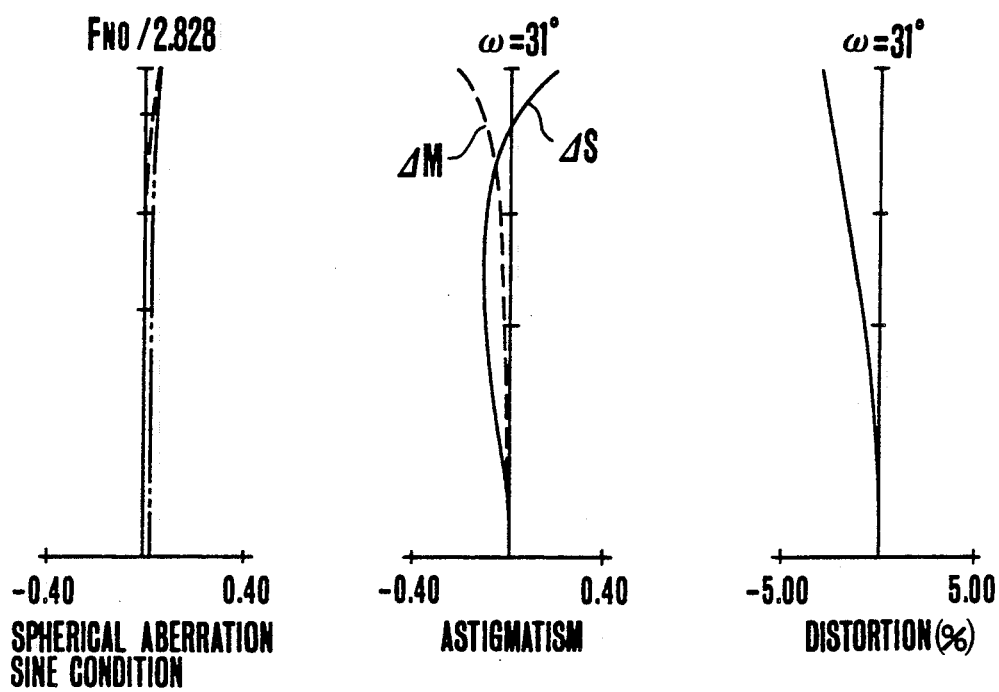
Figure 14B:
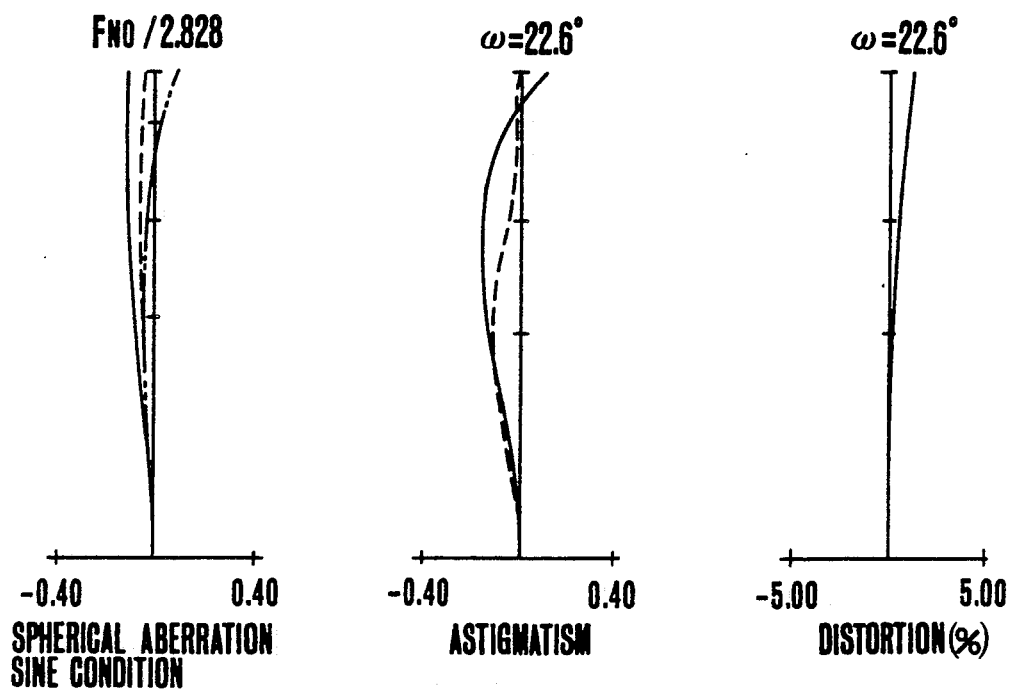
Figure 14C:
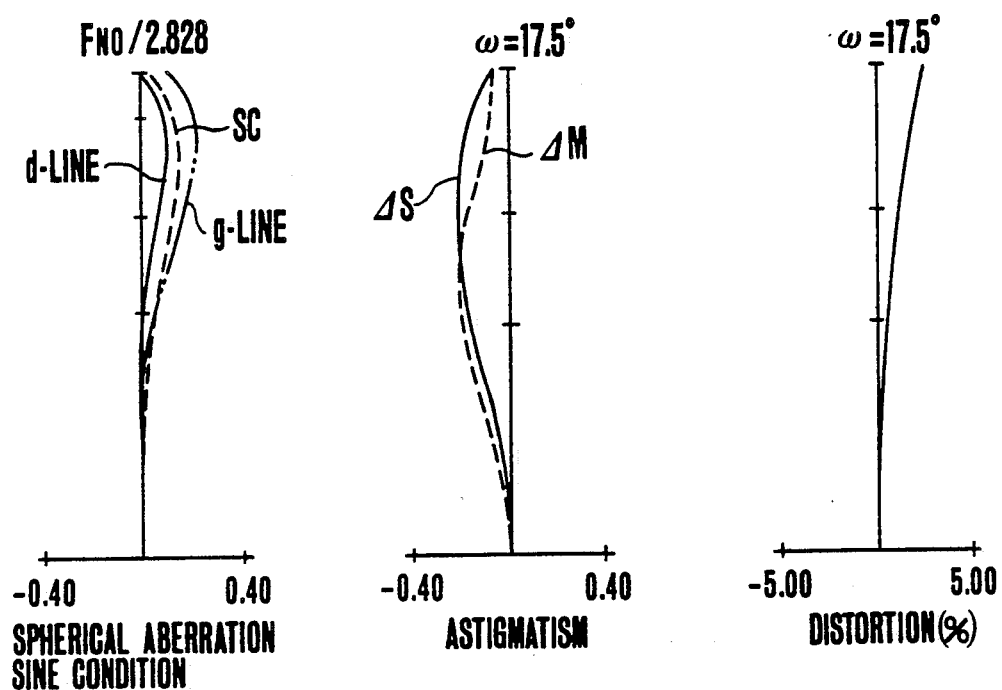
Figure 15A:
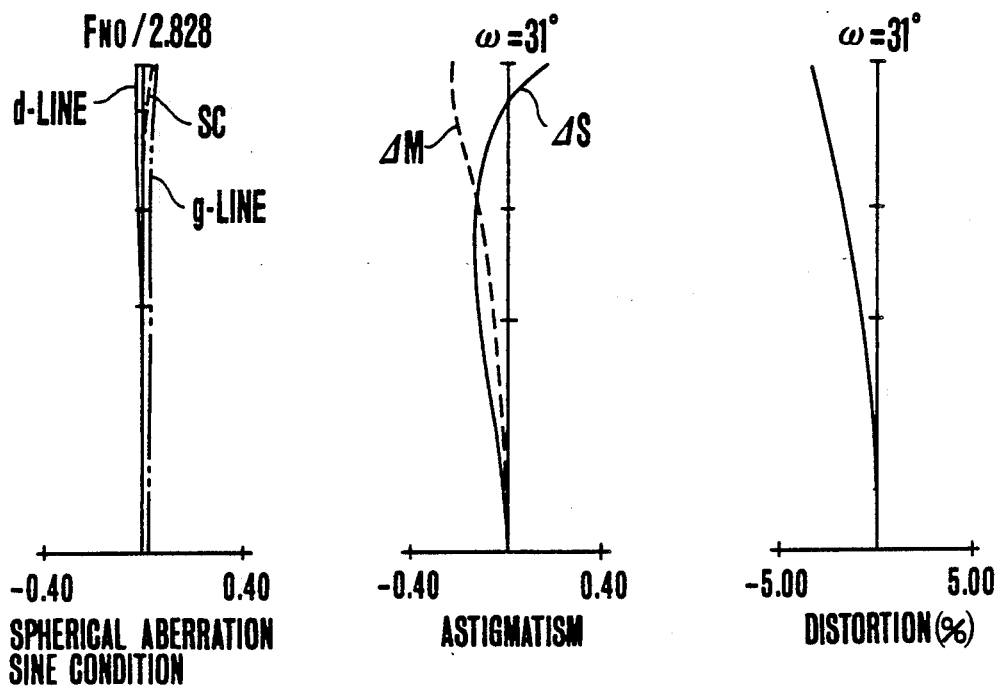
Figure 15B:
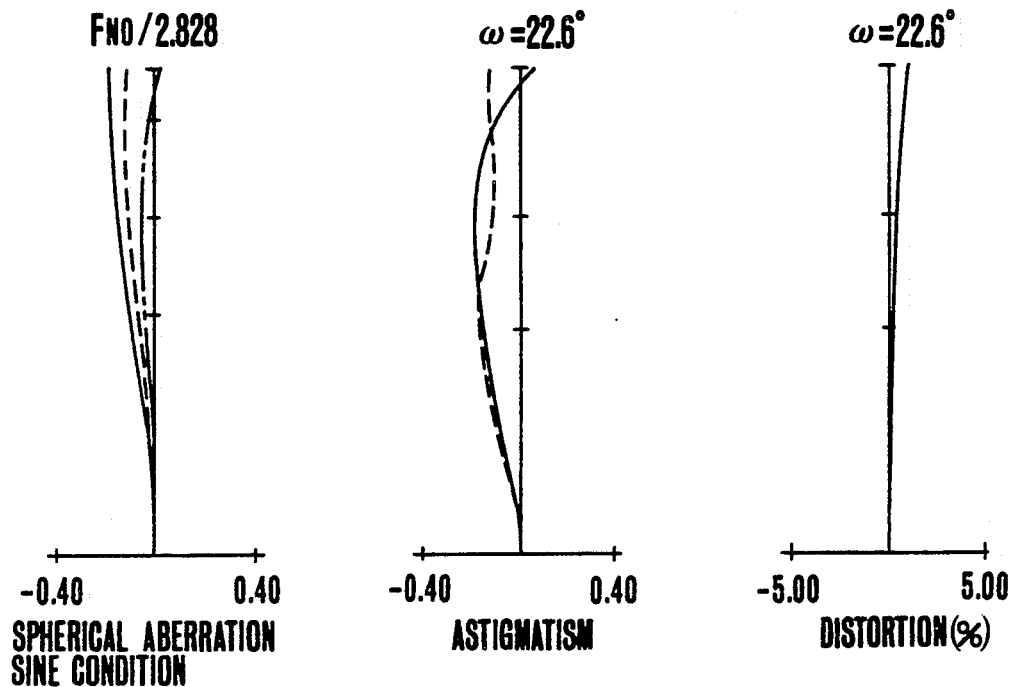
Figure 15C:
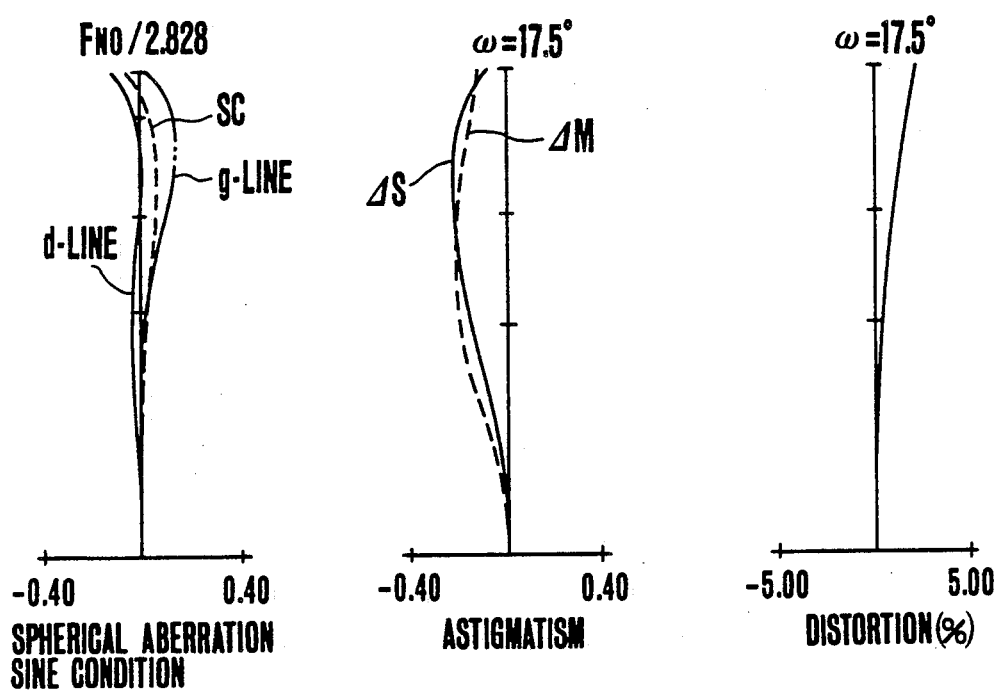

The zoom lens of the example 5 is shown in the longitudinal section view of FIG. 13 and its aberrations with an object at infinity and 1 meter are shown in FIGS. 14(a), 14(b) and 14(c) and FIGS. 15(a), 15(b) and 15(c) respectively.

When zooming from the wide-angle end to the telephoto end, the separation between the first lens group 11 and the second lens group 12 increases, the separation between the second lens group 12 and the third lens group 13 decreases and the separation between the third lens group 13 and the fourth lens group 14 increases.

The front sub-group 11A of the first lens group comprises a negative meniscus lens convex toward the front and the rear sub-group 11B comprises a bi-concave lens and a bi-convex lens whose front surface is of strong curvature.

Numerical Example 6:
F = 68−36  FNO = 1:2.828  2ω = 35°−62°

| | | | |
|---|---|---|---|
| *R1 = 170.401 | D1 = 2.20 | N1 = 1.77250 | ν1 = 49.6 |
| R2 = 38.654 | D2 = 6.72 | | |
| R3 = 27914.496 | D3 = 2.61 | N2 = 1.59551 | ν2 = 39.2 |
| R4 = −199.923 | D4 = 9.49 | | |
| R5 = −227.614 | D5 = 1.88 | N3 = 1.88300 | ν3 = 40.8 |
| R6 = 74.754 | D6 = 2.00 | | |
| R7 = 76.890 | D7 = 3.43 | N4 = 1.84666 | ν4 = 23.9 |
| R8 = 1029.569 | D8 = Variable | | |
| R9 = 137.971 | D9 = 1.50 | N5 = 1.84666 | ν5 = 23.9 |
| R10 = 45.733 | D10 = 5.23 | N6 = 1.71299 | ν6 = 55.8 |
| R11 = −215.202 | D11 = 0.15 | | |
| R12 = 57.161 | D12 = 3.51 | N7 = 1.81600 | ν7 = 46.6 |
| R13 = 260.207 | D13 = 0.15 | | |
| R14 = 54.110 | D14 = 3.56 | N8 = 1.69680 | ν8 = 55.5 |
| R15 = 130.159 | D15 = Variable | | |
| R16 = −390.802 | D16 = 2.78 | N9 = 1.84666 | ν9 = 23.9 |
| R17 = −79.177 | D17 = 2.00 | N10 = 1.69680 | ν10 = 55.5 |
| R18 = 66.960 | D18 = 2.94 | | |
| R19 = Stop | D19 = Variable | | |
| R20 = −180.697 | D20 = 1.30 | N11 = 1.84666 | ν11 = 23.9 |
| R21 = 42.990 | D21 = 2.18 | | |
| R22 = −183.268 | D22 = 1.96 | N12 = 1.77250 | ν12 = 49.6 |
| R23 = −70.432 | D23 = 0.15 | | |
| R24 = 62.463 | D24 = 4.44 | N13 = 1.77250 | ν13 = 49.6 |
| R25 = −65.548 | | | |

*Aspheric f  $F_1 = -58.25$

-continued

| Numerical Example 6: | | | |
|---|---|---|---|
| | 68.00 | 52.15 | 36.00 | $f_A = -83.53$ |
| D8 | 0.53 | 14.35 | 41.57 | $f_B = -192.51$ |
| D15 | 19.62 | 11.23 | 2.84 | $R_6/R_7 = 0.87$ |
| D19 | 2.25 | 10.64 | 19.03 | |
| Values of Aspheric Coefficients: | | | |
| $A' = 0$ | | $C' = 0$ | |
| $B = 1.08 \times 10^{-6}$ | | $D = 8.48 \times 10^{-13}$ | |
| $B' = 0$ | | $D' = 0$ | |
| $C = -3.95 \times 10^{-10}$ | | $E = -7.06 \times 10^{-16}$ | |

Figure 16:
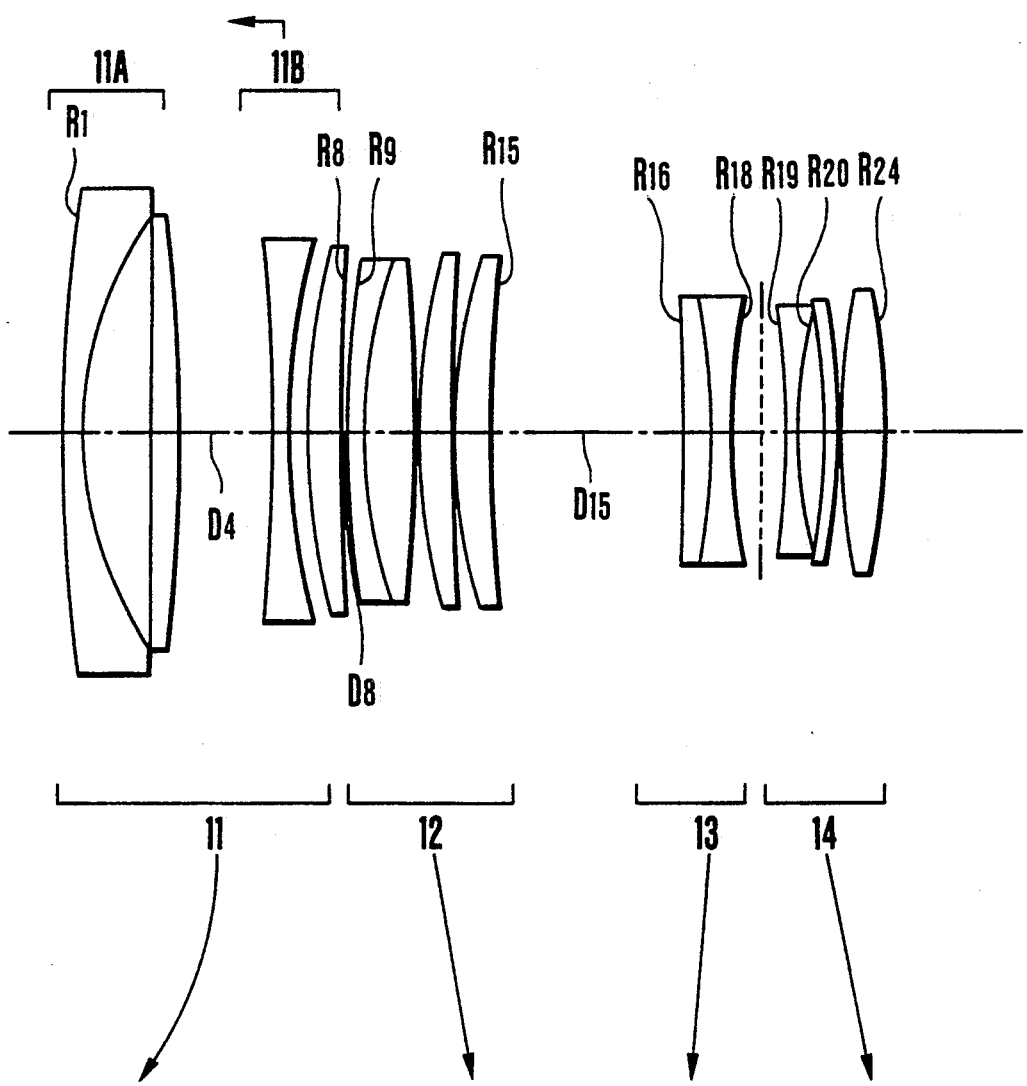
Figure 17A:
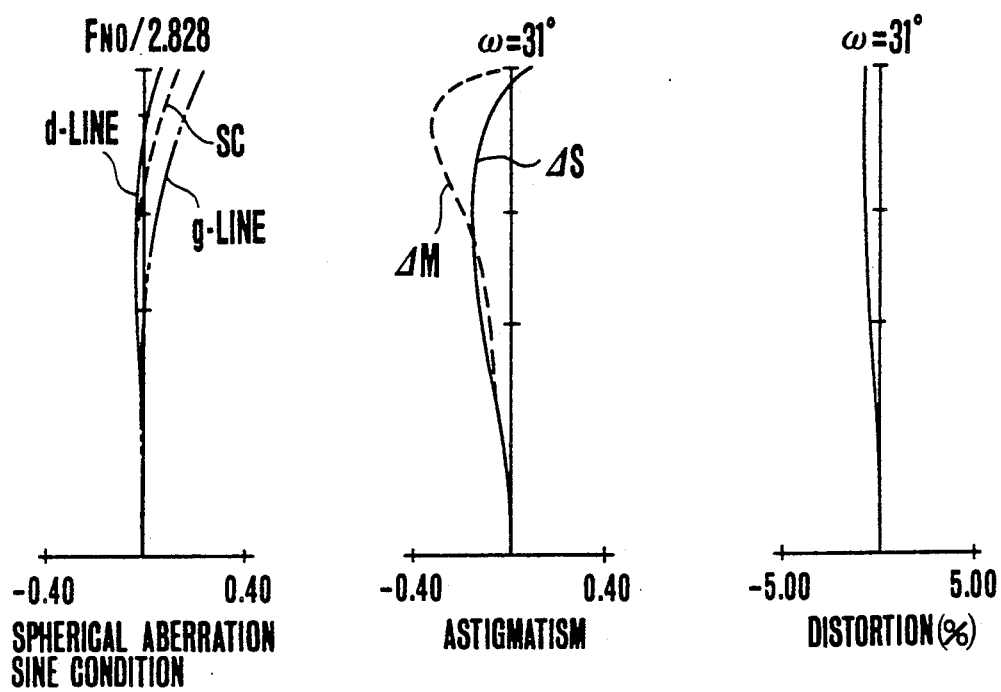
Figure 17B:
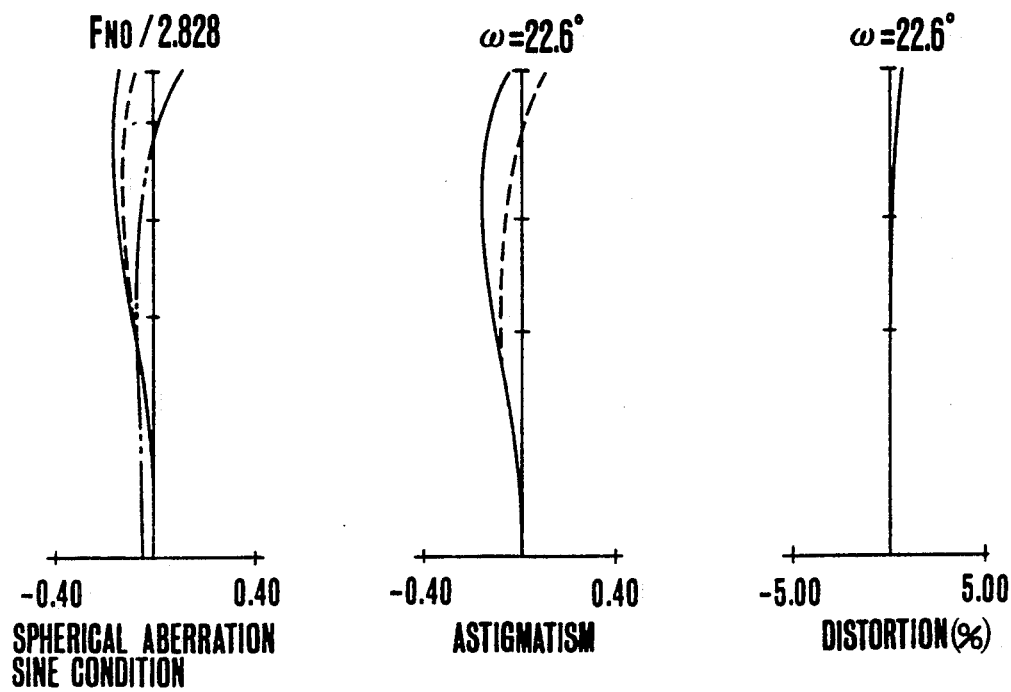
Figure 17C:
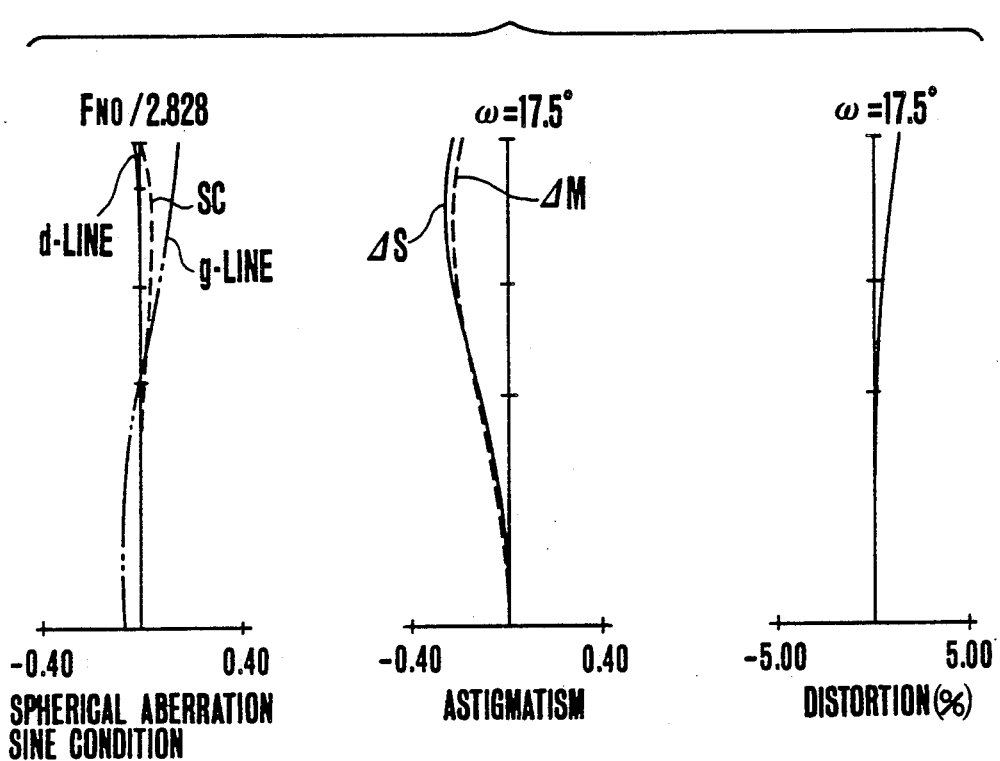
Figure 18A:
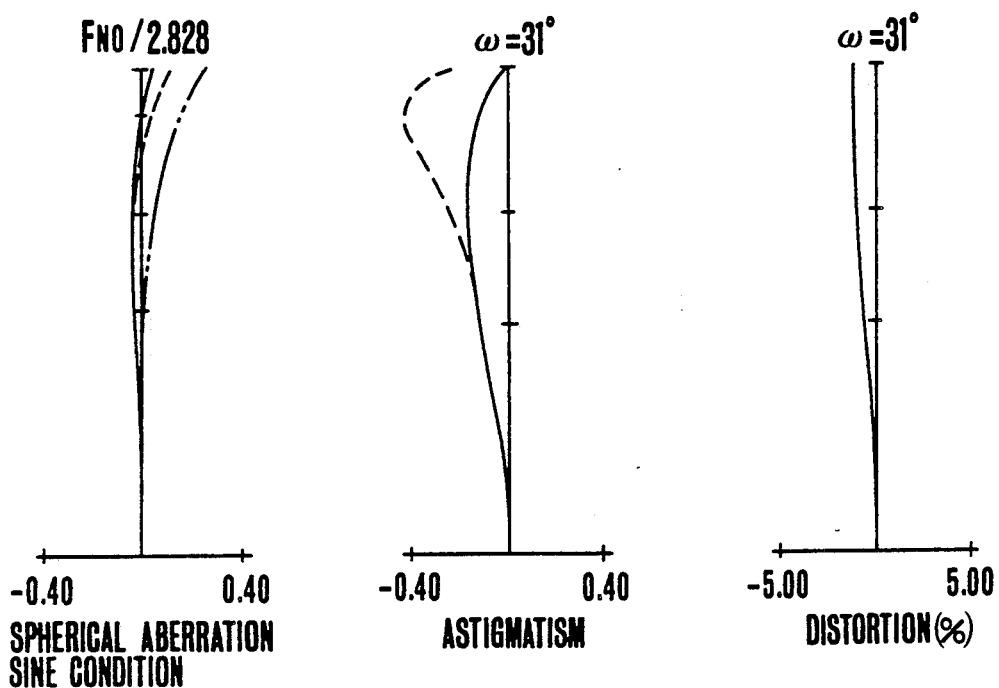
Figure 18B:
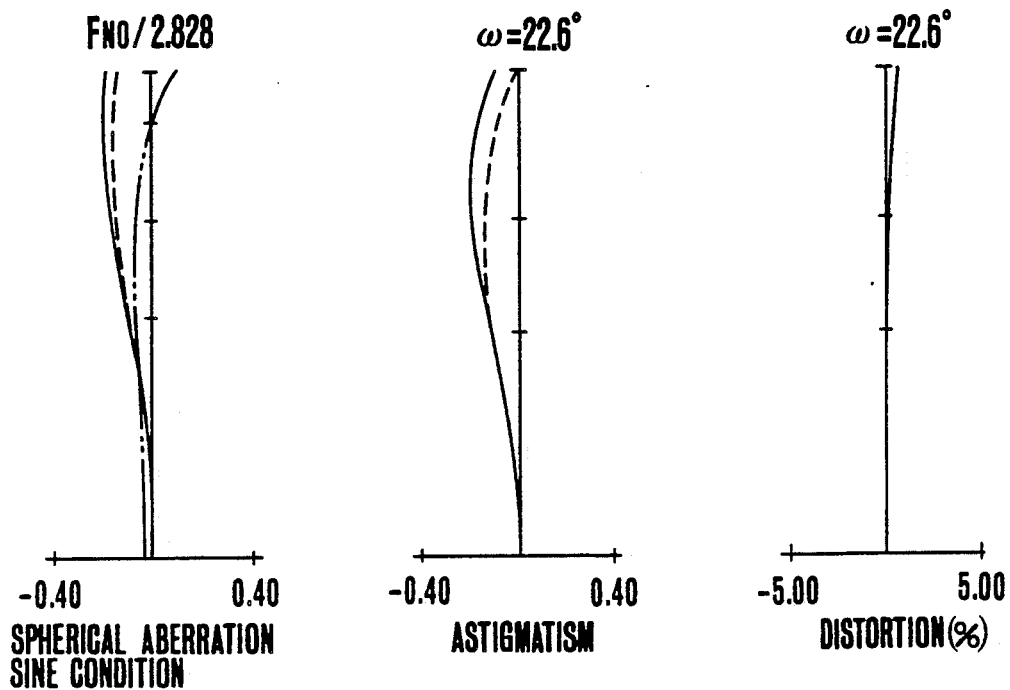

The zoom lens of the example 6 is shown in the longitudinal section view of FIG. 16 and its aberrations with an object at infinity and 1 meter are shown in FIGS. 17(a), 17(b) and 17(c) and FIGS. 18(a), 18(b) and 18(c) respectively.

When zooming from the wide-angle end to the telephoto end, the separation between the first lens group 11 and the second lens group 12 increases, the separation between the second lens group 12 and the third lens group 13 decreases and the separation between the third lens group 13 and the fourth lens group 14 increases.

The front sub-group 11A of the first lens group comprises a negative meniscus lens convex toward the front, and a positive meniscus lens convex toward the rear, and the rear sub-group 11B comprises a bi-concave lens and a positive meniscus lens convex toward the front.

| Numerical Example 7: | | | |
|---|---|---|---|
| F = 68-36 | FNO = 1:2.828 | 2ω = 35°-62° | |
| *R1 = 164.458 | D1 = 2.20 | N1 = 1.77250 | ν1 = 49.6 |
| R2 = 37.504 | D2 = 5.59 | | |
| R3 = 304.257 | D3 = 1.95 | N2 = 1.68893 | ν2 = 31.1 |
| R4 = 2079.191 | D4 = 8.80 | | |
| R5 = −829.587 | D5 = 1.80 | N3 = 1.88300 | ν3 = 40.8 |
| R6 = 59.891 | D6 = 1.57 | | |
| R7 = 59.299 | D7 = 3.15 | N4 = 1.84666 | ν4 = 23.9 |
| R8 = 214.128 | D8 = Variable | | |
| R9 = 84.438 | D9 = 1.50 | N5 = 1.84666 | ν5 = 23.9 |
| R10 = 34.234 | D10 = 5.96 | N6 = 1.71299 | ν6 = 53.8 |
| R11 = −237.135 | D11 = 0.15 | | |
| R12 = 56.738 | D12 = 4.05 | N7 = 1.80400 | ν7 = 46.6 |
| R13 = 317.349 | D13 = 0.15 | | |
| R14 = 58.954 | D14 = 4.09 | N8 = 1.69680 | ν8 = 55.5 |
| R15 = 452.955 | D15 = Variable | | |
| R16 = −141.764 | D16 = 3.69 | N9 = 1.78472 | ν9 = 25.7 |
| R17 = −34.023 | D17 = 1.19 | N10 = 1.69680 | ν10 = 55.5 |
| R18 = 54.814 | D18 = 2.67 | | |
| R19 = Stop | D19 = Variable | | |
| R20 = −63.293 | D20 = 1.72 | N11 = 1.84666 | ν11 = 23.9 |
| R21 = 55.903 | D21 = 2.15 | | |
| R22 = −541.018 | D22 = 2.76 | N12 = 1.69680 | ν12 = 55.5 |
| R23 = −45.263 | D23 = 0.15 | | |
| R24 = 97.106 | D24 = 4.47 | N13 = 1.71299 | ν13 = 53.8 |
| R25 = −56.387 | | | |

*Aspheric

| | f | | $F_1 = -52.82$ |
|---|---|---|---|
| | 68.00 | 52.13 | 36.00 | $f_A = -73.03$ |
| D8 | 0.45 | 13.10 | 37.85 | $f_B = -190.84$ |
| D15 | 15.40 | 9.08 | 2.76 | $R_6/R_7 = 1.01$ |
| D19 | 2.83 | 9.15 | 15.47 | |
| Values of Aspheric Coefficients: | | | |
| $A' = 0$ | | $C' = 0$ | |
| $B = 9.86 \times 10^{-7}$ | | $D = 3.16 \times 10^{-12}$ | |
| $B' = 0$ | | $D' = 0$ | |
| $C = -1.18 \times 10^{-9}$ | | $E = -2.80 \times 10^{-15}$ | |

Figure 19:
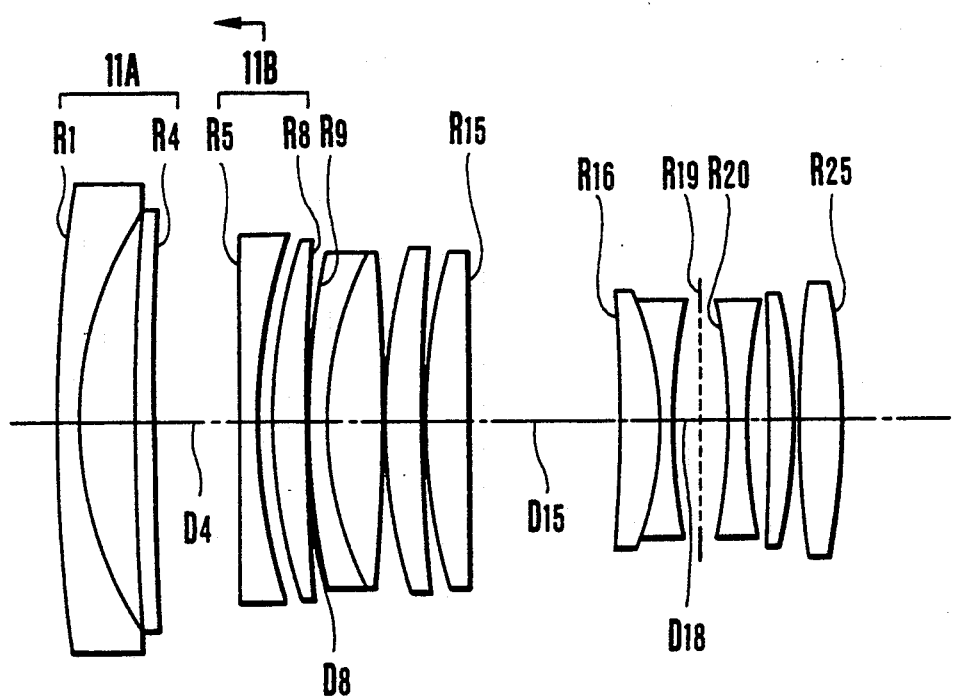
Figure 20A:
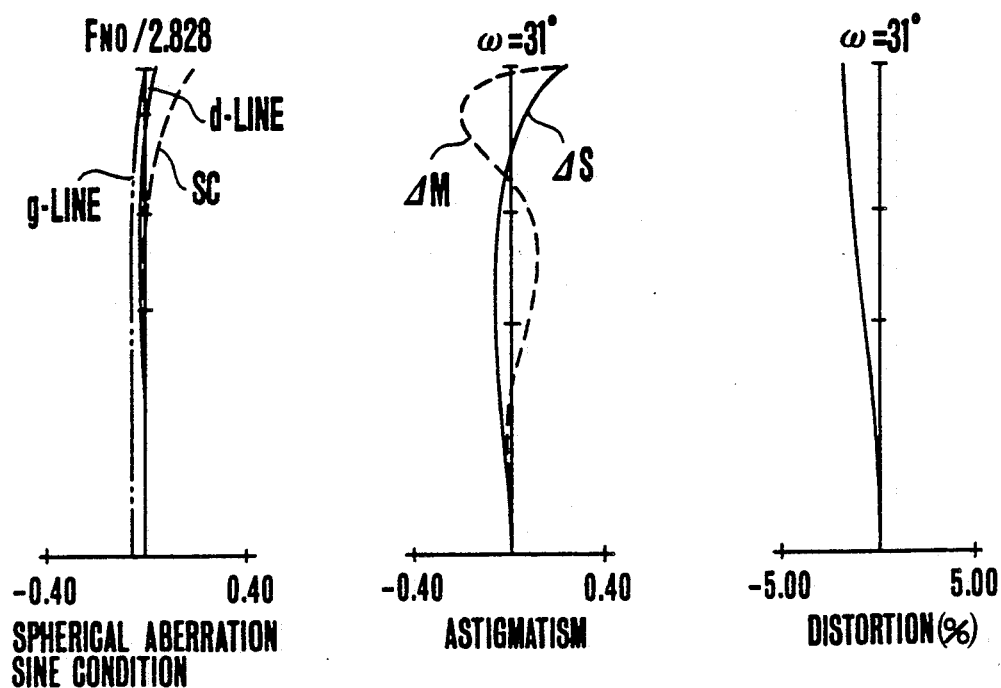
Figure 20B:
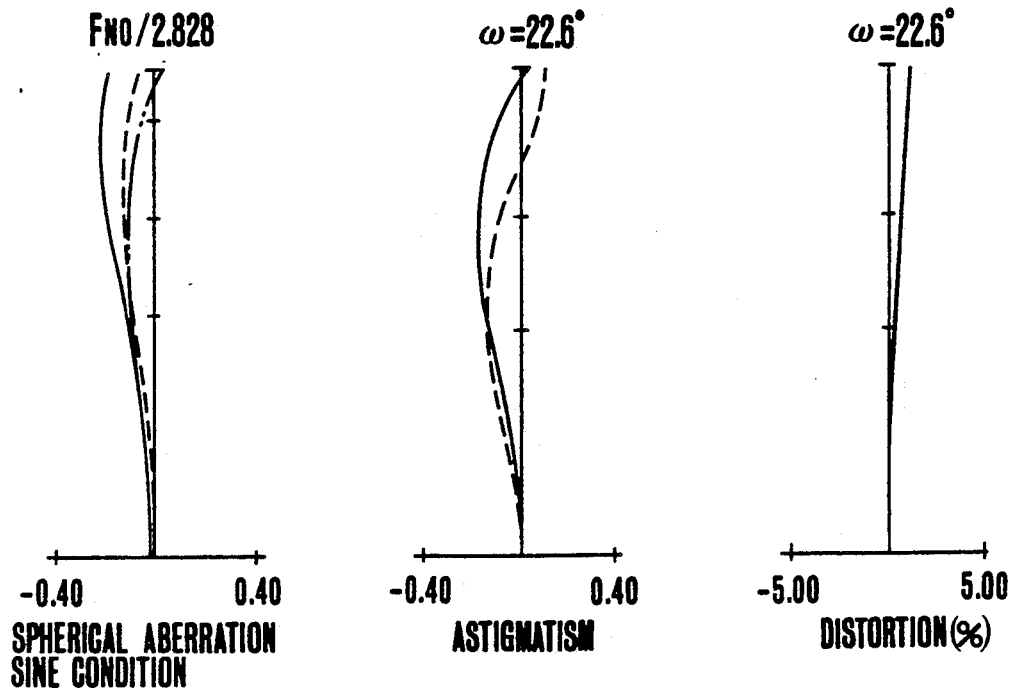
Figure 21A:
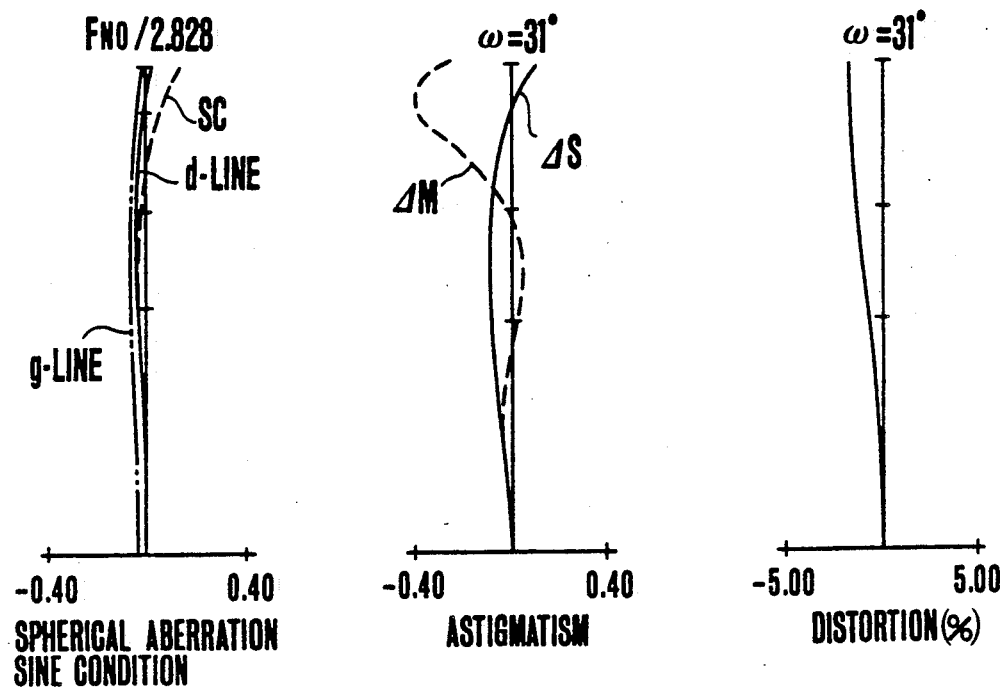
Figure 21B:
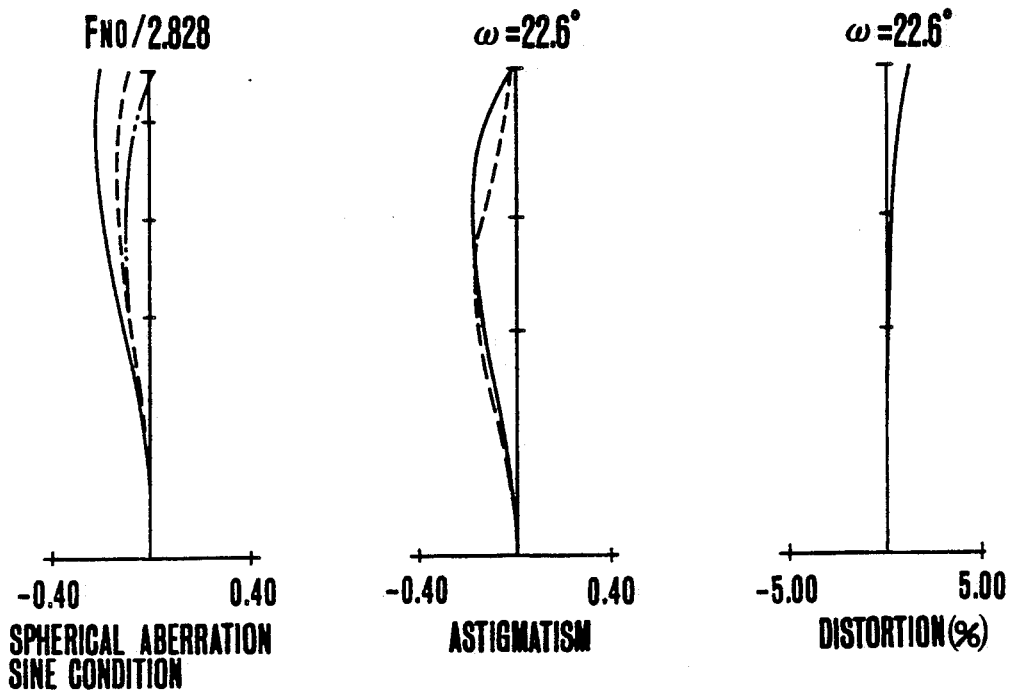
Figure 21C:
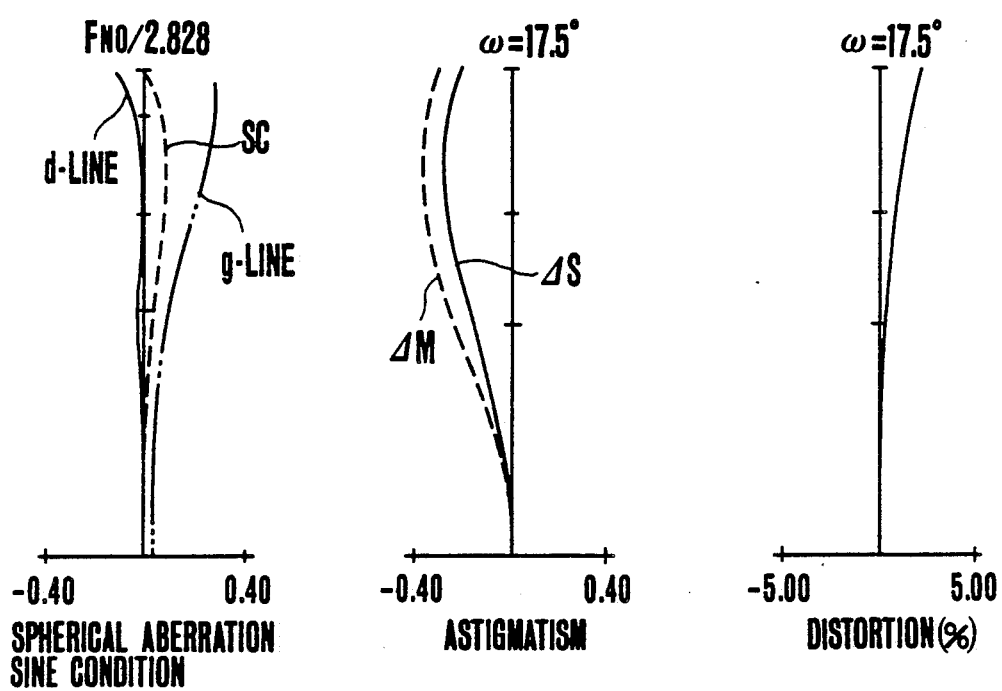

The zoom lens of the example 7 is shown in the longitudinal section view of FIG. 19 and its aberrations with an object at infinity and 1 meter are shown in FIGS. 20(a), 20(b) and 20(c) and FIGS. 21(a), 21(b) and 21(c).

The manner in which zooming is performed is similar to that described in connection with the numerical example 5 or 6.

The front sub-group 11A of the first lens group comprises a negative meniscus lens convex toward the front and a positive meniscus lens convex toward the front, and the rear sub-group 11b comprises a bi-concave lens whose rear surface of strong curvature and a positive meniscus lens convex toward the front.

| Numerical Example 8: | | | |
|---|---|---|---|
| F = 68-36 | FNO = 1:2.828 | 2ω = 35°-62° | |
| *R1 = 197.332 | D1 = 2.20 | N1 = 1.77250 | ν1 = 49.6 |
| R2 = 58.219 | D2 = 4.91 | | |
| R3 = −401.106 | D3 = 3.84 | N2 = 1.72825 | ν2 = 28.5 |
| R4 = −81.770 | D4 = 4.92 | | |
| R5 = −95.574 | D5 = 2.00 | N3 = 1.88300 | ν3 = 40.8 |
| R6 = 46.047 | D6 = 2.69 | | |
| R7 = 53.714 | D7 = 4.89 | N4 = 1.78472 | ν4 = 25.7 |
| R8 = 202.723 | D8 = Variable | | |
| R9 = 94.551 | D9 = 1.60 | N5 = 1.84666 | ν5 = 23.9 |
| R10 = 38.625 | D10 = 4.99 | N6 = 1.69680 | ν6 = 55.5 |
| R11 = −318.444 | D11 = 0.15 | | |
| R12 = 71.204 | D12 = 3.87 | N7 = 1.81600 | ν7 = 46.6 |
| R13 = −184.839 | D13 = 0.15 | | |
| R14 = 37.294 | D14 = 3.99 | N8 = 1.60311 | ν8 = 60.7 |
| R15 = 52.421 | D15 = Variable | | |
| R16 = −261.253 | D16 = 2.18 | N9 = 1.78472 | ν9 = 25.7 |
| R17 = −64.727 | D17 = 1.50 | N10 = 1.69680 | ν10 = 55.5 |
| R18 = 71.914 | D18 = 2.00 | | |
| R19 = Stop | D19 = Variable | | |
| R20 = −62.361 | D20 = 1.60 | N11 = 1.78472 | ν11 = 25.7 |
| R21 = 48.251 | D21 = 2.04 | | |
| R22 = −197.815 | D22 = 2.54 | N12 = 1.77250 | ν12 = 49.6 |
| R23 = −54.118 | D23 = 0.15 | | |
| R24 = 66.696 | D24 = 4.94 | N13 = 1.81600 | ν13 = 46.6 |
| R25 = −62.862 | | | |

| | f | | $F_1 = -53.31$ |
|---|---|---|---|
| | 68.00 | 52.17 | 36.00 | $f_A = -592.06$ |
| D8 | 1.30 | 12.45 | 34.62 | $f_B = -58.59$ |
| D15 | 19.74 | 11.18 | 2.63 | $R_6/R_7 = 0.86$ |
| D19 | 0.96 | 9.51 | 18.06 | |

Figure 22:
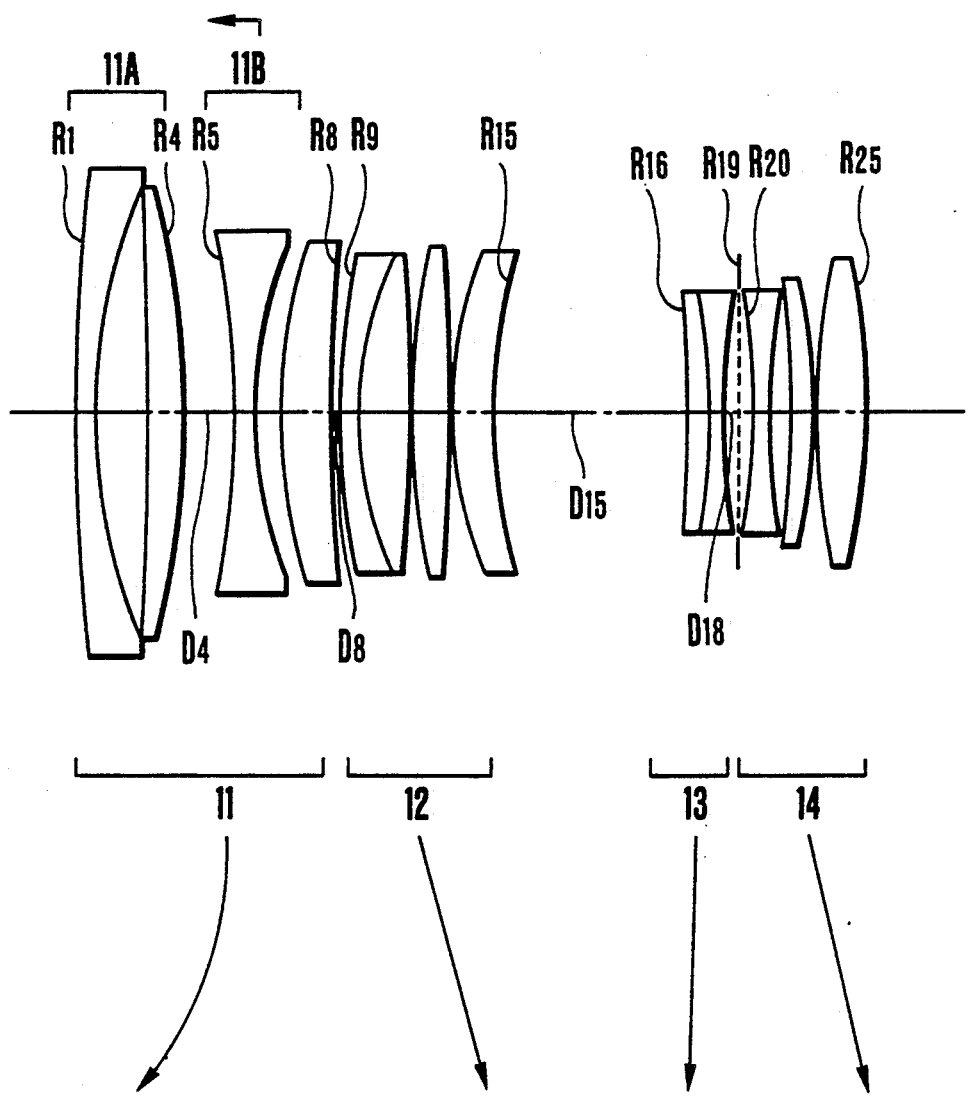
Figure 23A:
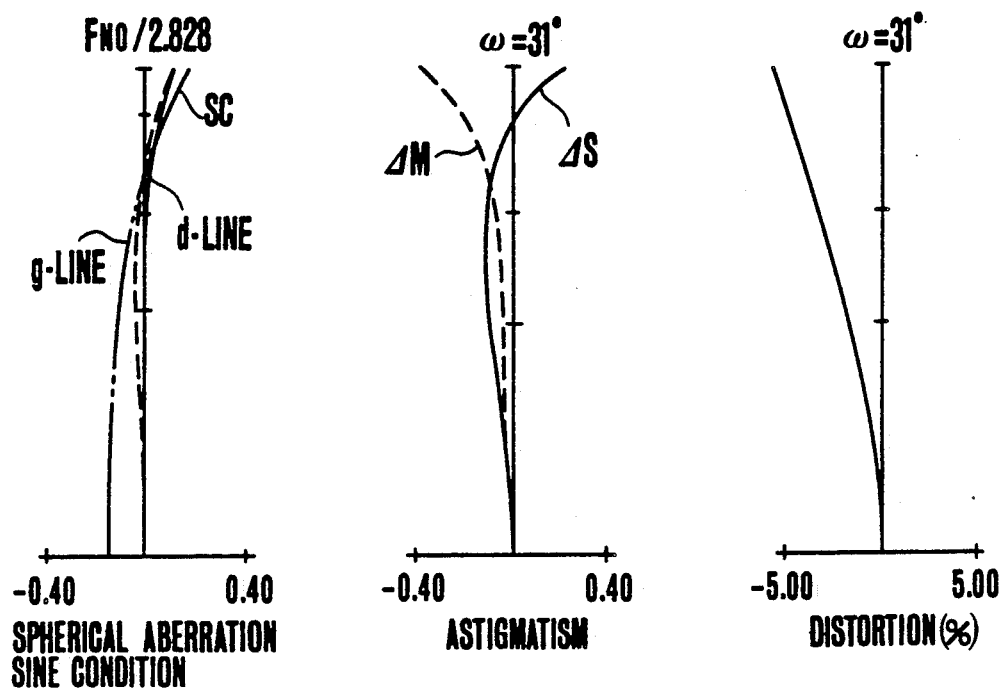
Figure 23B:
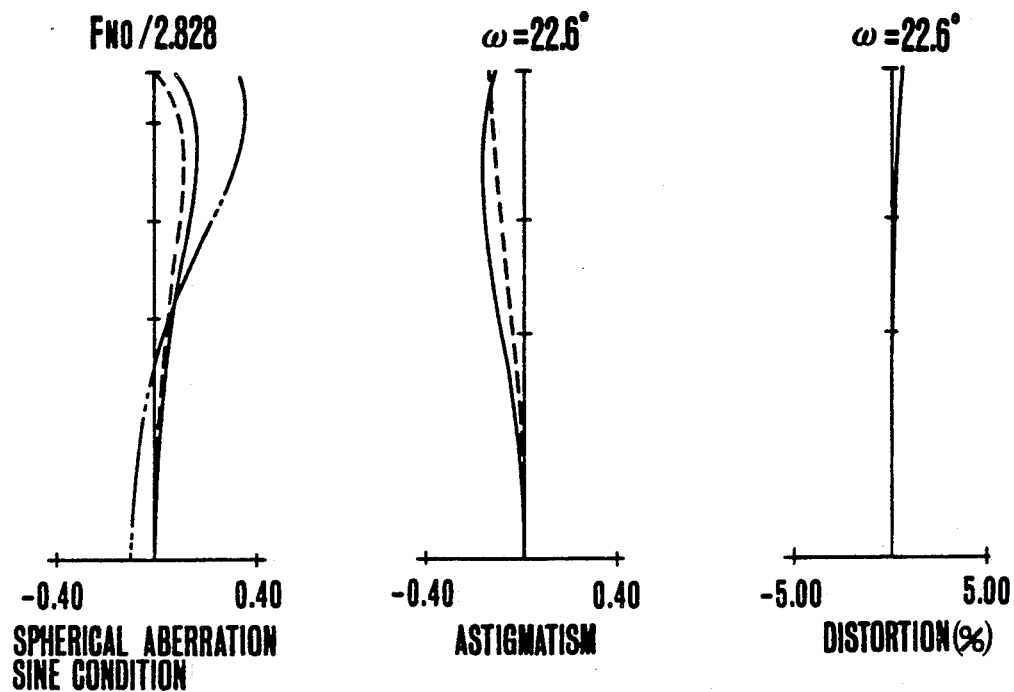
Figure 23C:
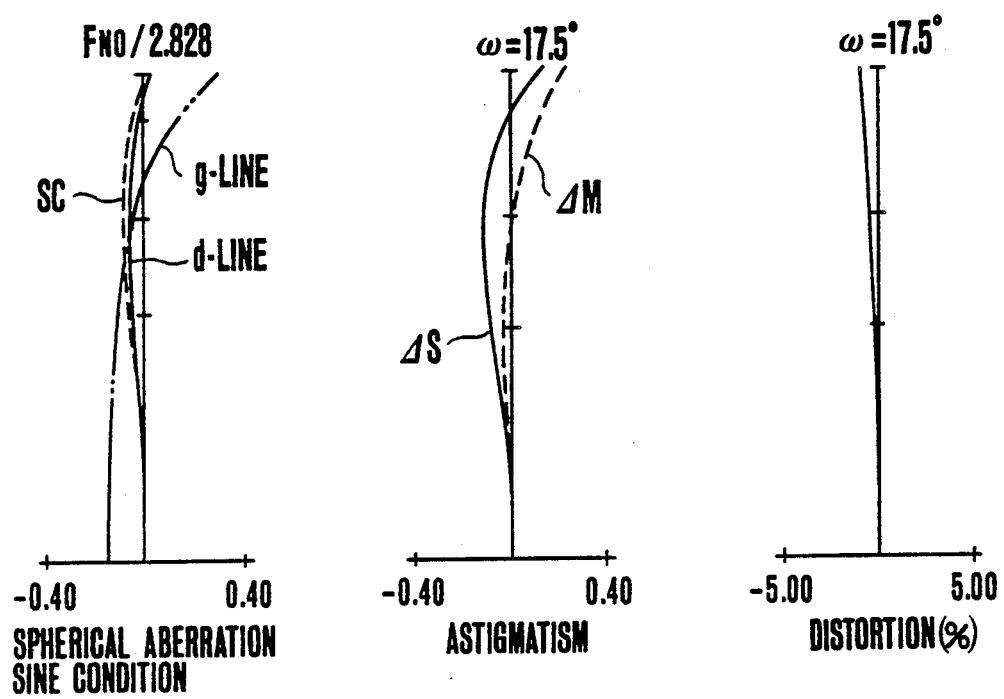
Figure 24A:
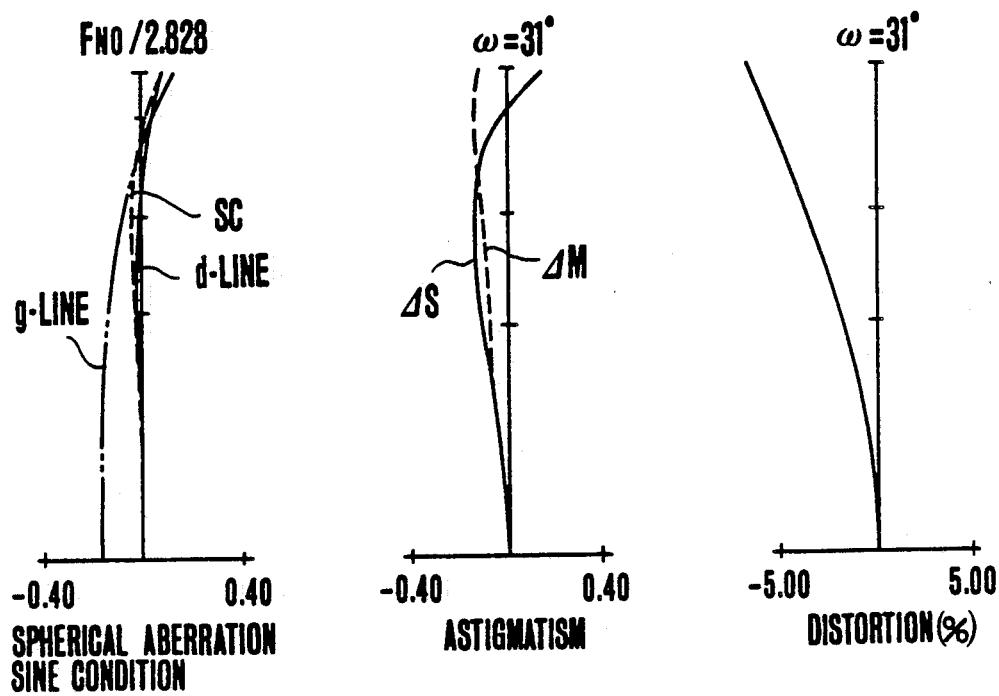
Figure 24B:
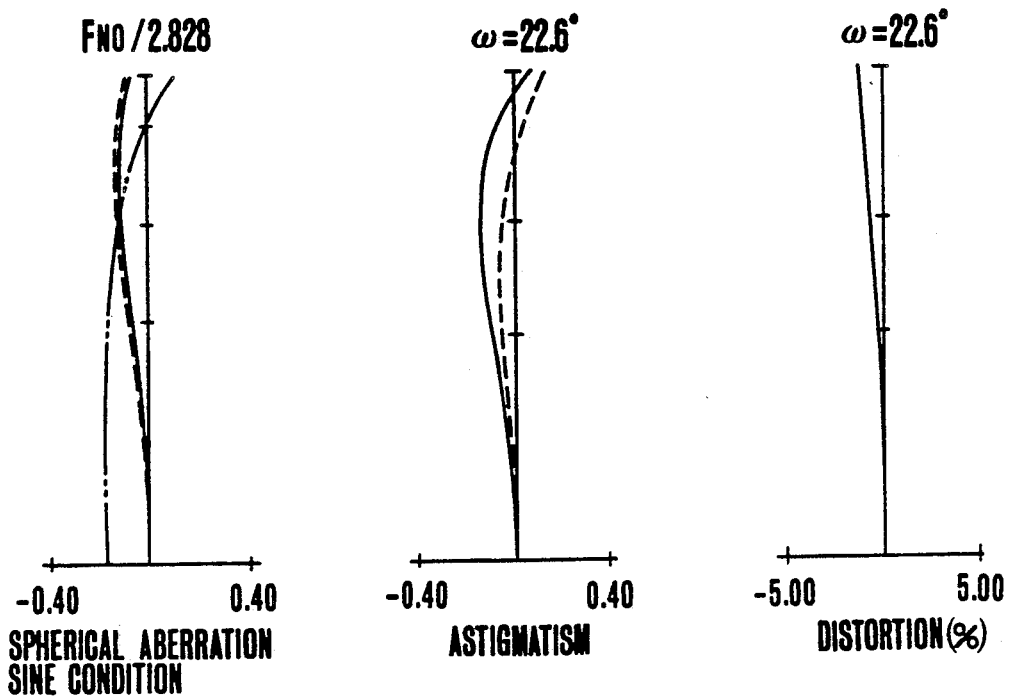
Figure 24C:
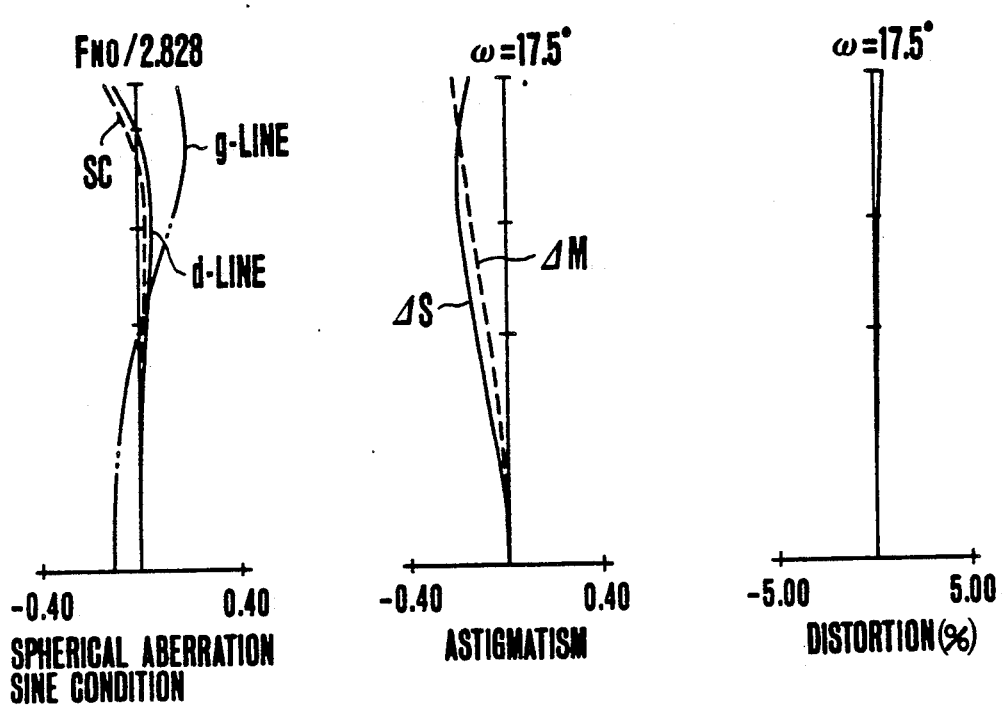

The zoom lens of the example 8 is shown in the longitudinal section view of FIG. 22 and its aberrations with an object at infinity and 1 meter are shown in FIGS. 23(a), 23(b) and 23(c) and FIGS. 24(a), 24(b) and 24(c) respectivelys.

The manner in which zooming is performed is similar to that described in connection with the before-described numerical examples.

The front sub-group 11A of the first lens group comprises a negative meniscus lens convex toward the front and a positive meniscus lens convex toward the rear, and the rear sub-group 11B comprises a bi-concave lens and a positive meniscus lens convex toward the front.

| Numerical Example 9: | | | |
|---|---|---|---|
| F = 68-36 | FNO = 1:2.828 | 2ω = 35°-62° | |
| *R1 = 148.925 | D1 = 2.20 | N1 = 1.77250 | ν1 = 49.6 |
| R2 = 39.437 | D2 = 5.06 | | |
| R3 = 161.711 | D3 = 1.77 | N2 = 1.68893 | ν2 = 31.1 |
| R4 = 207.985 | D4 = 11.03 | | |
| R5 = −161.921 | D5 = 1.80 | N3 = 1.88300 | ν3 = 40.8 |
| R6 = 66.611 | D6 = 3.86 | N4 = 1.84666 | ν4 = 23.9 |
| R7 = −1691.055 | D7 = Variable | | |
| R8 = 112.777 | D8 = 1.50 | N5 = 1.84666 | ν5 = 23.9 |
| R9 = 35.015 | D9 = 6.53 | N6 = 1.71299 | ν6 = 53.8 |
| R10 = −280.715 | D10 = 0.15 | | |
| R11 = 51.522 | D11 = 4.69 | N7 = 1.80400 | ν7 = 46.6 |

-continued

Numerical Example 9:

| R12 = 1994.281 | D12 = 0.15 | | |
| R13 = 55.337 | D13 = 3.37 | N8 = 1.69680 | ν8 = 55.5 |
| R14 = 221.748 | D14 = Variable | | |
| R15 = −152.245 | D15 = 3.89 | N9 = 1.78472 | ν9 = 25.7 |
| R16 = −33.078 | D16 = 1.19 | N10 = 1.69680 | ν10 = 55.5 |
| R17 = 52.916 | D17 = 2.67 | | |
| R18 = Stop | D18 = Variable | | |
| R19 = −65.477 | D19 = 1.72 | N11 = 1.84666 | ν11 = 23.9 |
| R20 = 54.800 | D20 = 2.14 | | |
| R21 = 3663.553 | D21 = 3.14 | N12 = 1.69680 | ν12 = 55.5 |
| R22 = −45.021 | D22 = 0.15 | | |
| R23 = 80.834 | D23 = 4.31 | N13 = 1.71299 | ν13 = 53.8 |
| R24 = −74.396 | | | |

*Aspheric

| | f | | | $F_1 = -53.22$ |
|---|---|---|---|---|
| | 68.00 | 52.13 | 36.00 | $f_4 = -75.20$ |
| D7 | 0.95 | 13.60 | 38.35 | $f_B = -182.08$ |
| D14 | 15.77 | 9.45 | 3.13 | $R_6/R_7 = 1$ |
| D18 | 3.31 | 9.63 | 15.95 | |

Figure 25:
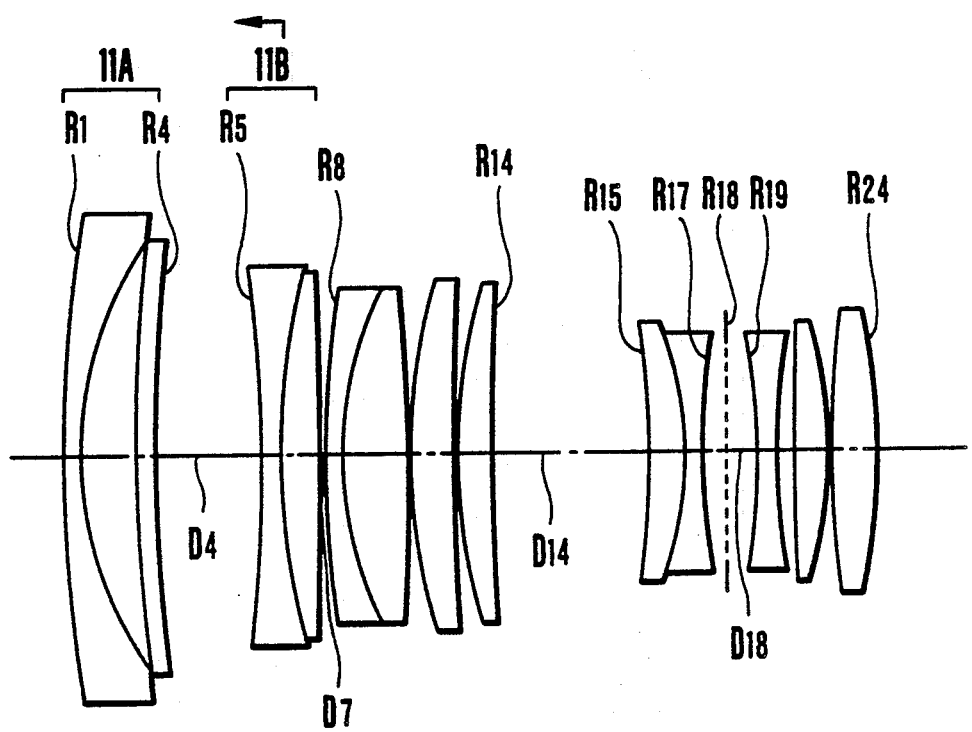
Figure 25:
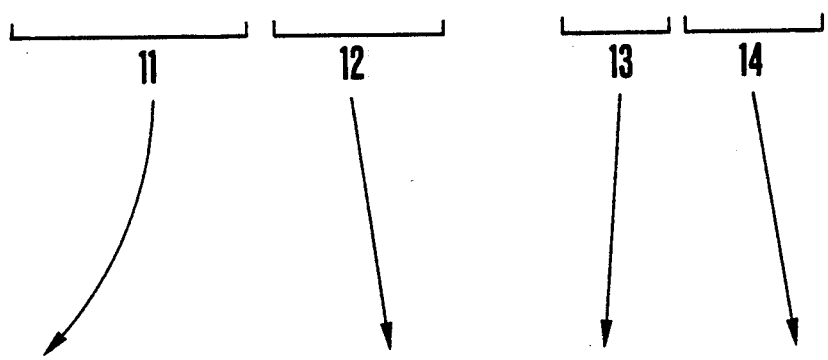
Figure 26A:
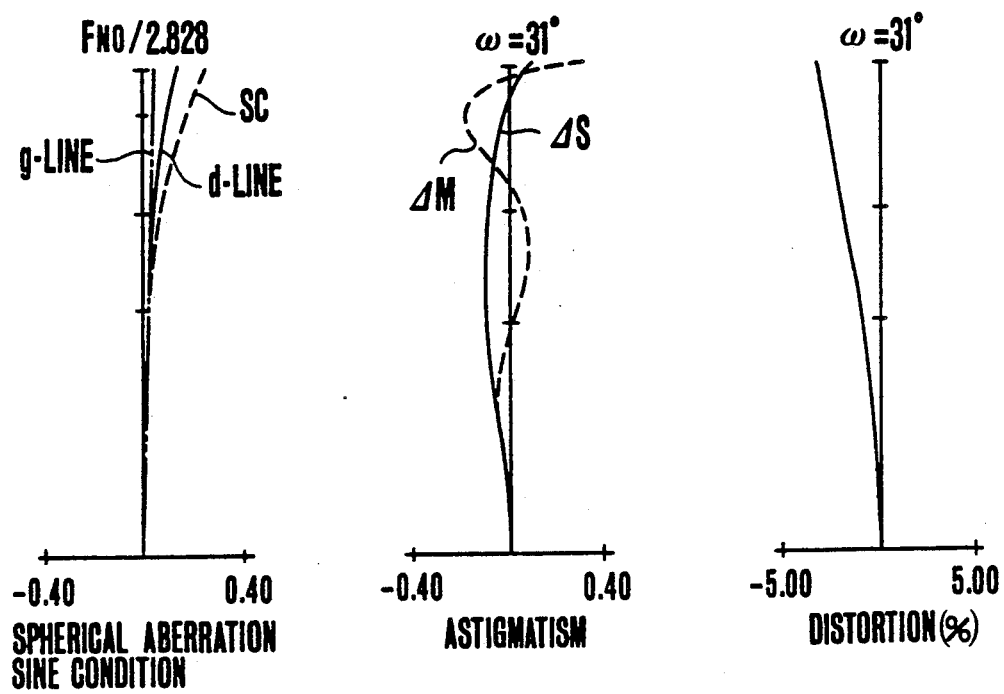
Figure 26B:
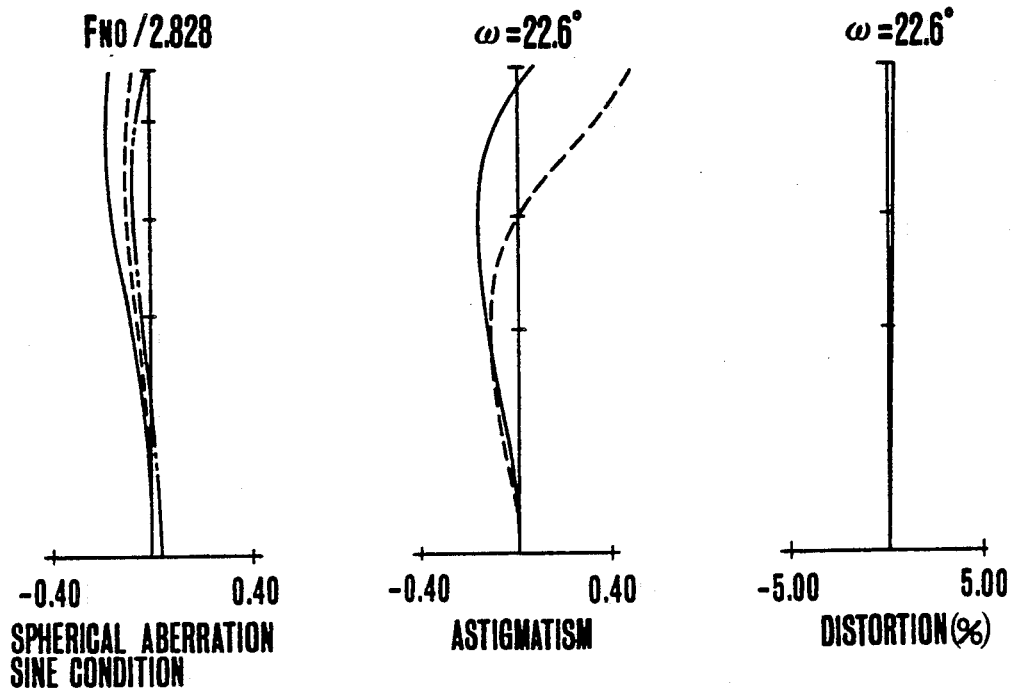
Figure 26C:
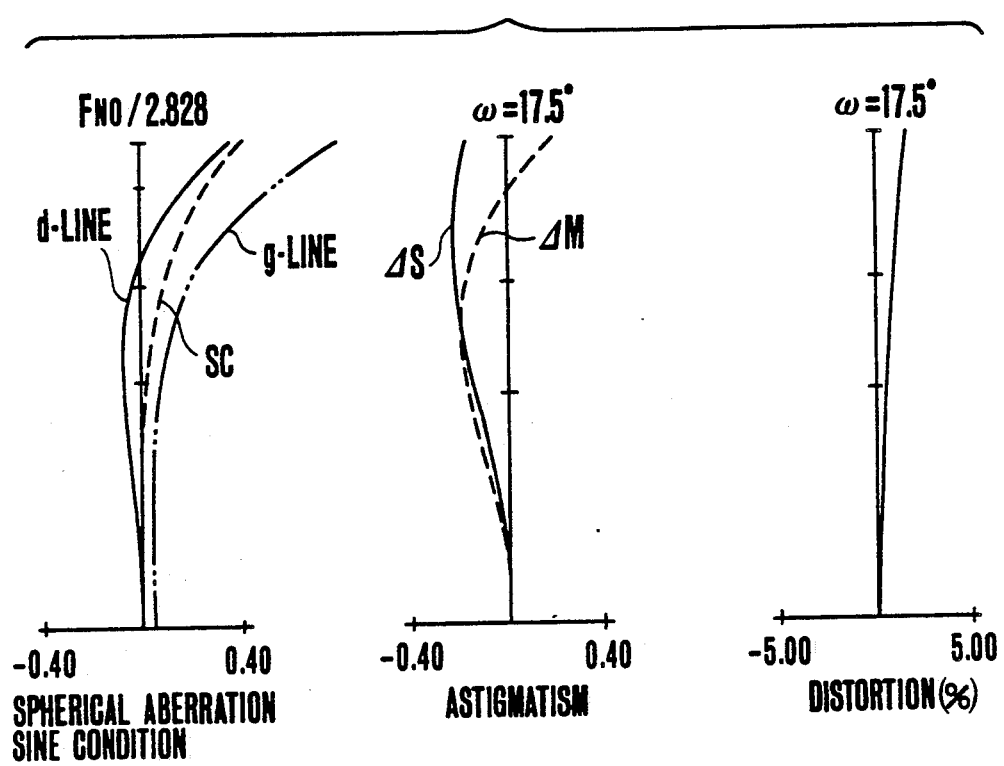
Figure 27A:
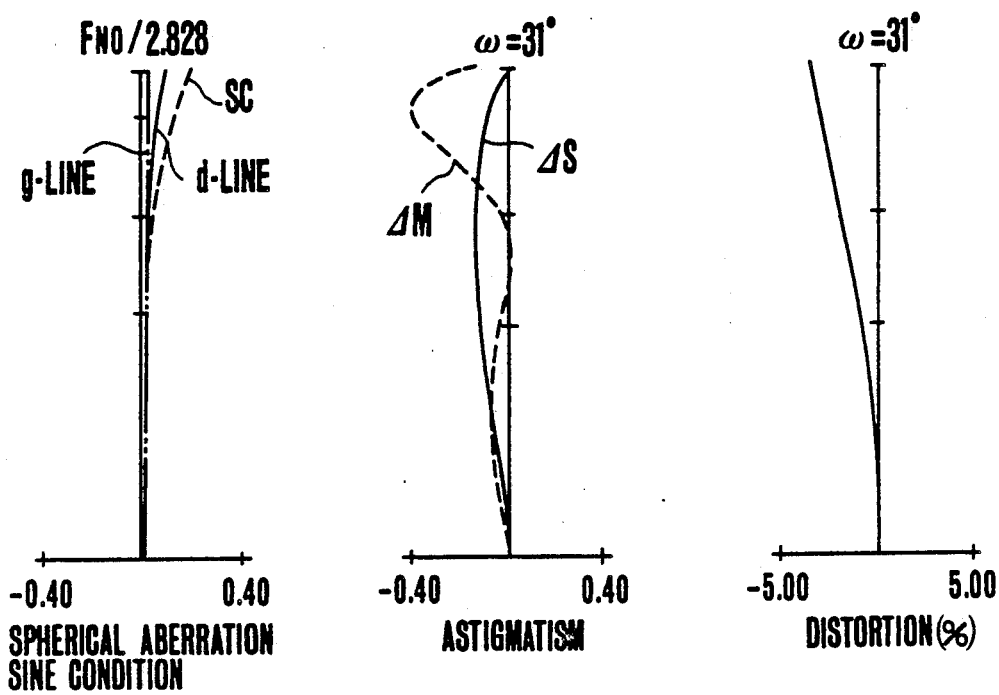
Figure 27B:
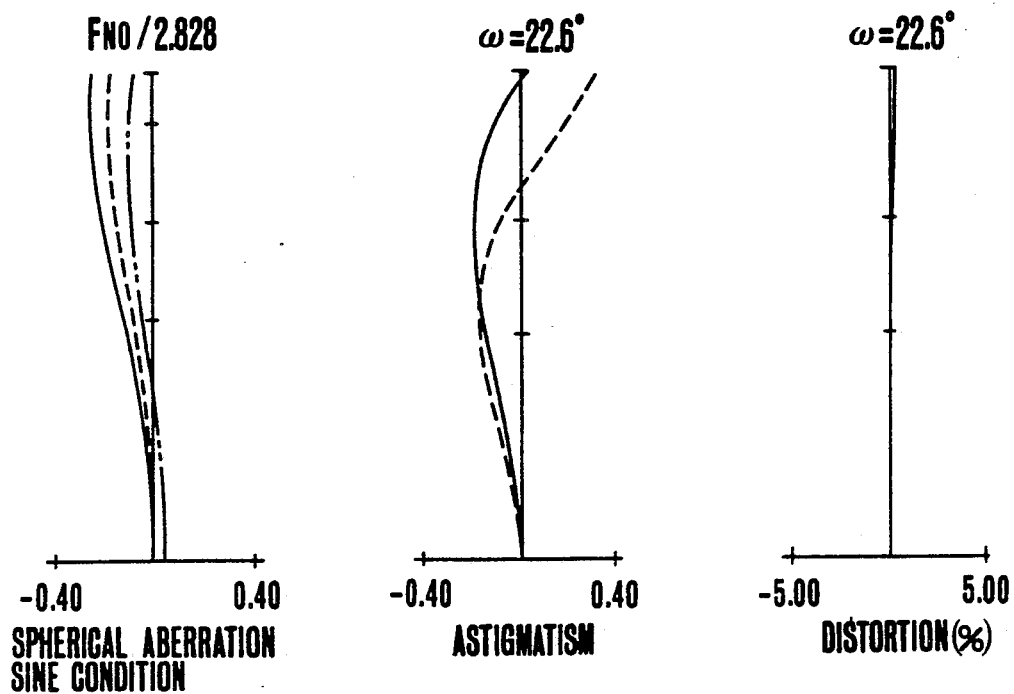
Figure 27C:
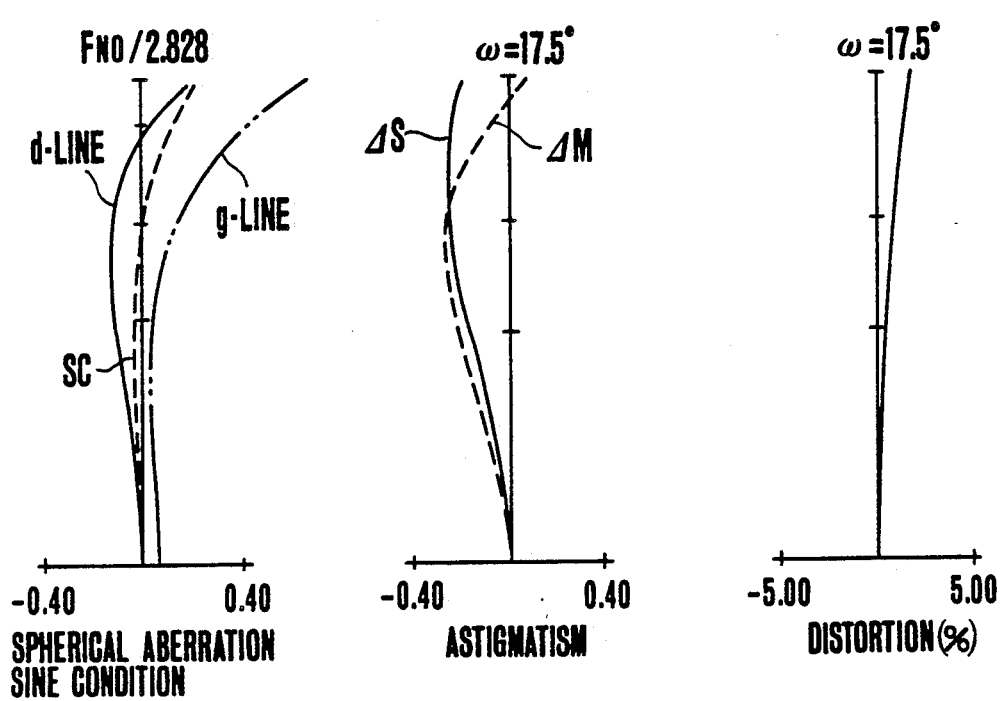

Values of Aspheric Coefficients:

$A' = 0$     $C' = 0$
$B = 8.90 \times 10^{-7}$     $D = 3.33 \times 10^{-12}$
$B' = 0$     $D' = 0$
$C = -1.37 \times 10^{-9}$     $E = -2.68 \times 10^{-15}$ The zoom lens of the example 9 is shown in the longitudinal section view of FIG. 25 and its aberrations with an object at infinity and 1 meter are shown in FIG. 26(a), 26(b) and 26(c) and FIGS. 27(a), 27(b) and 27(c) respectively.

The manner in which zooming is performed is similar to that described in connection with the before-described numerical examples.

The front sub-group 11A of the first lens group comprises a negative meniscus lens convex toward the front and a positive meniscus lens convex toward the front, and the rear sub-group 11B comprises a cemented doublet consisting of a bi-concave lens and a bi-convex lens.

Numerical Example 10:

| F = 68−36.04 | FNO = 1:35−2.828 | 2ω = 35°−62° | |
|---|---|---|---|
| *R1 = 136.208 | D1 = 6.21 | N1 = 1.51633 | ν1 = 64.1 |
| R2 = −676.351 | D2 = 0.10 | | |
| R3 = 104.993 | D3 = 2.20 | N2 = 1.74400 | ν2 = 44.8 |
| R4 = 36.110 | D4 = 21.12 | | |
| R5 = −115.021 | D5 = 5.81 | N3 = 1.62299 | ν3 = 58.1 |
| R6 = −42.938 | D6 = 1.80 | N4 = 1.83400 | ν4 = 37.2 |
| R7 = 51.333 | D7 = 2.91 | | |
| R8 = 58.318 | D8 = 4.92 | N5 = 1.84666 | ν5 = 23.9 |
| R9 = −210.959 | D9 = Variable | | |
| R10 = 118.079 | D10 = 4.05 | N6 = 1.77250 | ν6 = 49.6 |
| R11 = −569.863 | D11 = 0.10 | | |
| R12 = 35.472 | D12 = 5.31 | N7 = 1.69680 | ν7 = 55.5 |
| R13 = 93.855 | D13 = 0.10 | | |
| R14 = 34.912 | D14 = 4.81 | N8 = 1.69680 | ν8 = 55.5 |
| R15 = 68.263 | D15 = 2.50 | | |
| R16 = Stop | D16 = 2.00 | | |
| R17 = −719.233 | D17 = 5.91 | N9 = 1.78472 | ν9 = 25.7 |
| R18 = 22.374 | D18 = 5.70 | | |
| R19 = 66.535 | D19 = 5.53 | N10 = 1.60311 | ν10 = 60.7 |
| R20 = −46.306 | | | |

| | f | | | $F_1 = -66.88$ |
|---|---|---|---|---|
| | 68.00 | 52.36 | 36.04 | $f_4 = -118.20$ |
| D9 | 1.00 | 14.90 | 42.25 | $f_B = -154.06$ |
| | | | | $R_7/R_8 = 0.88$ |

Figure 28:
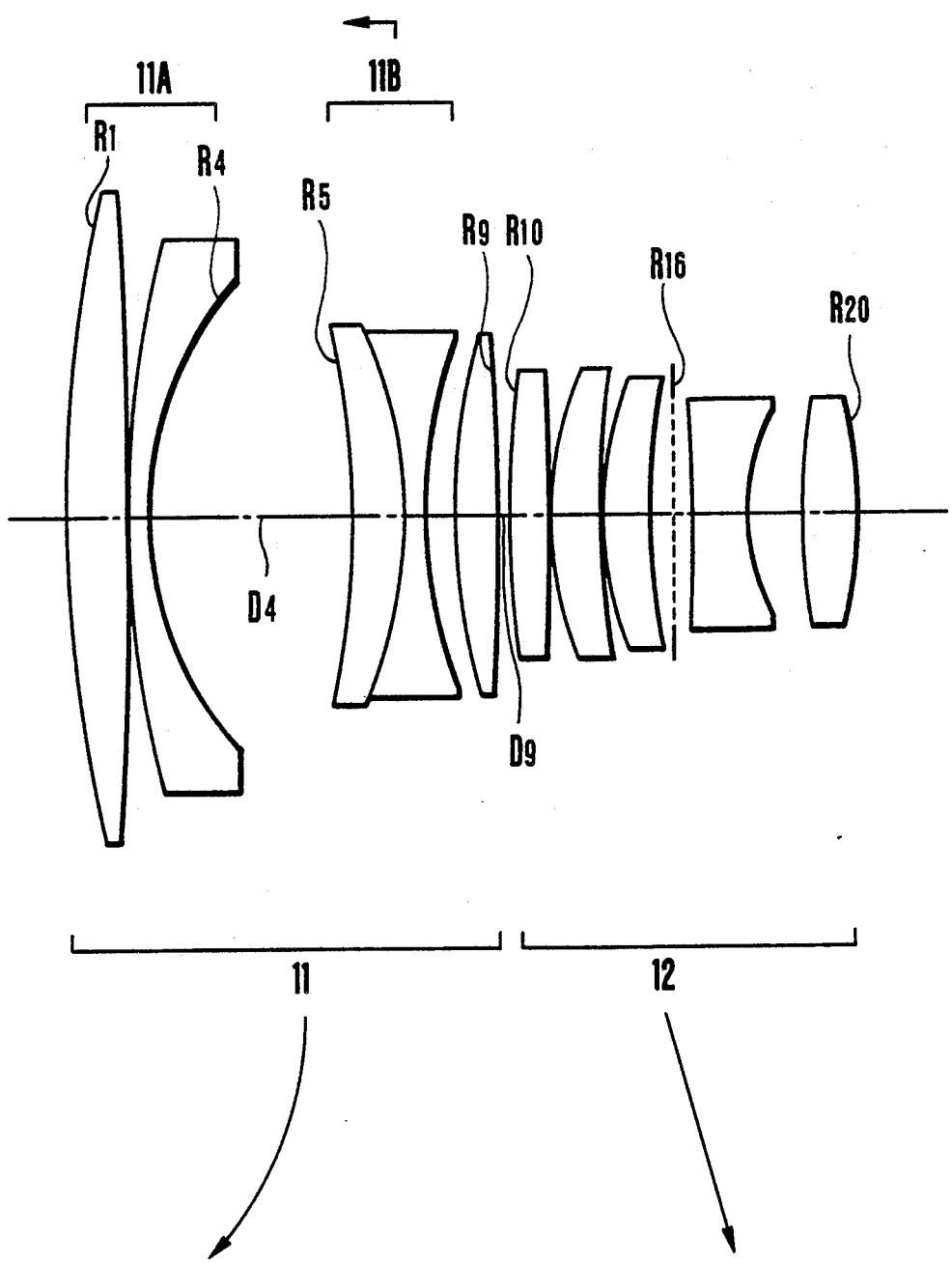
Figure 29A:
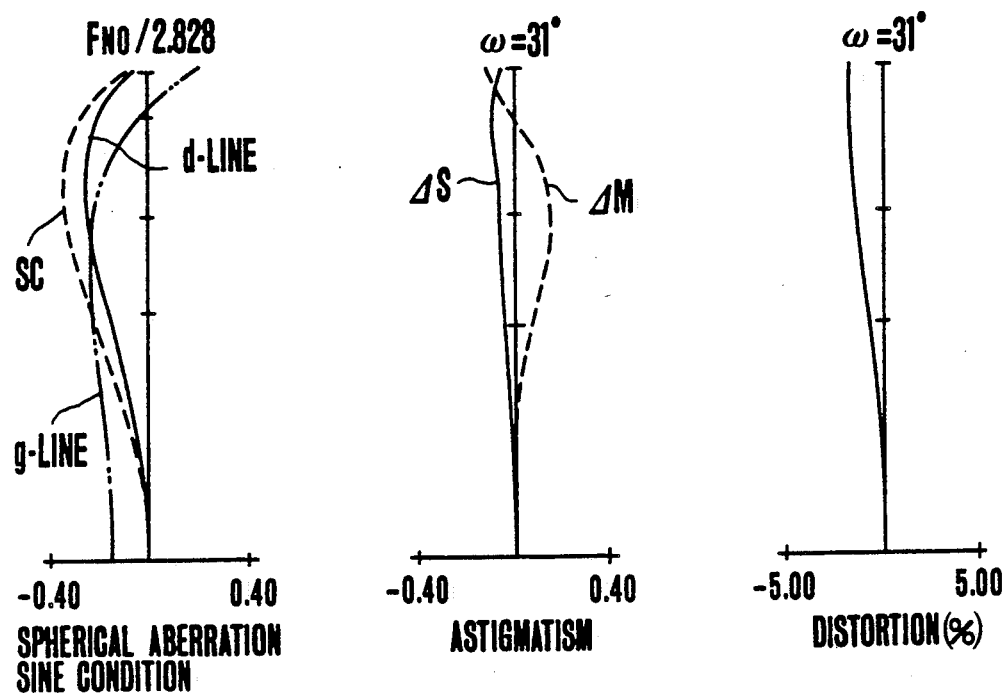
Figure 29B:
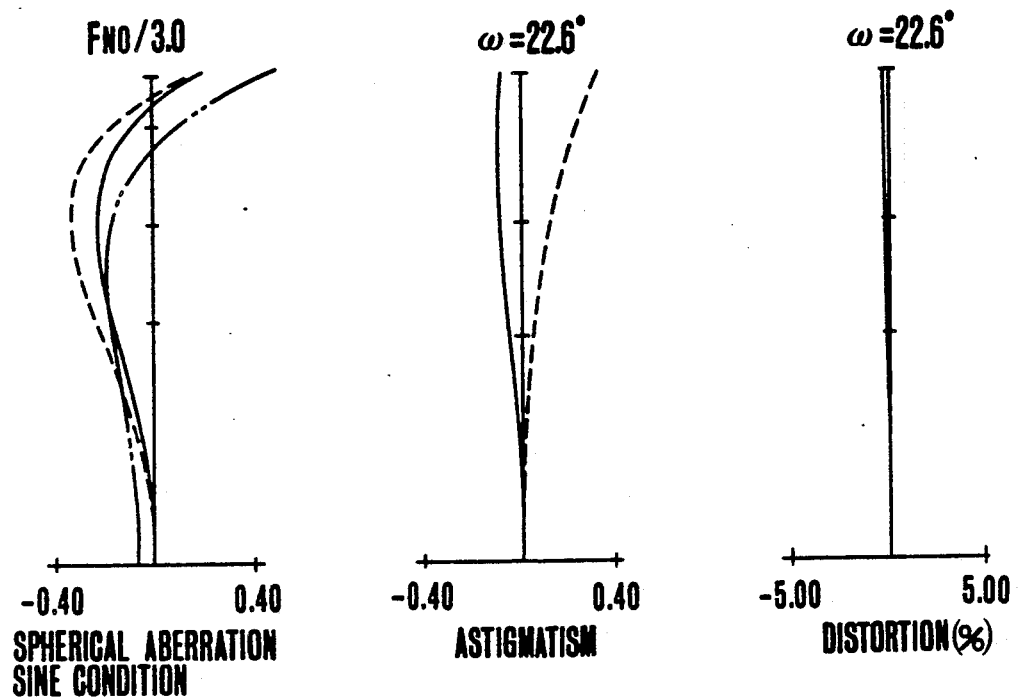
Figure 29C:
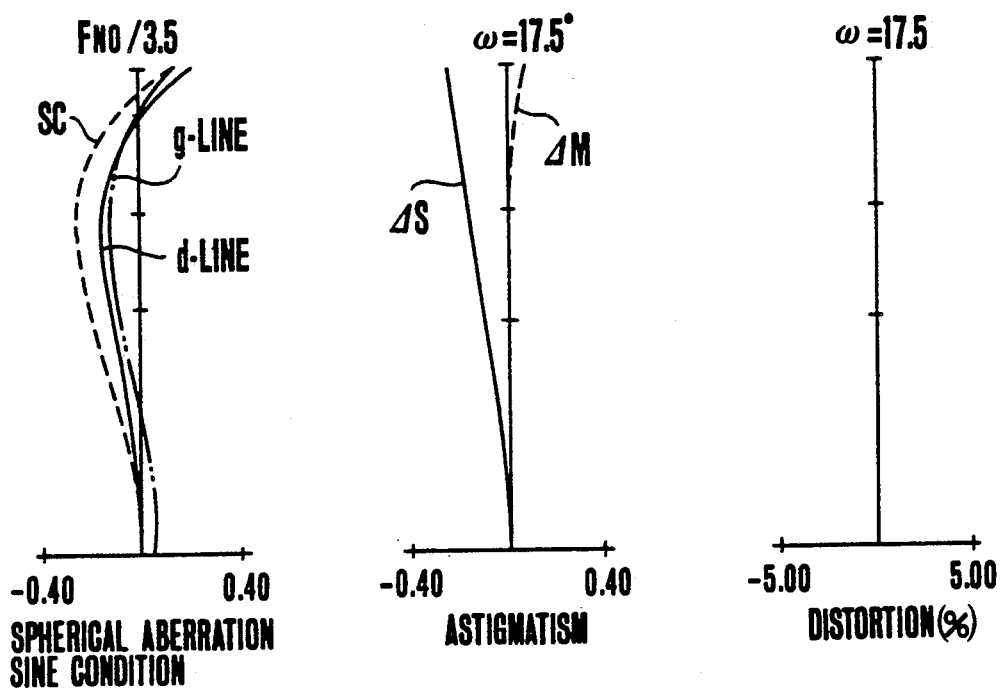
Figure 30A:
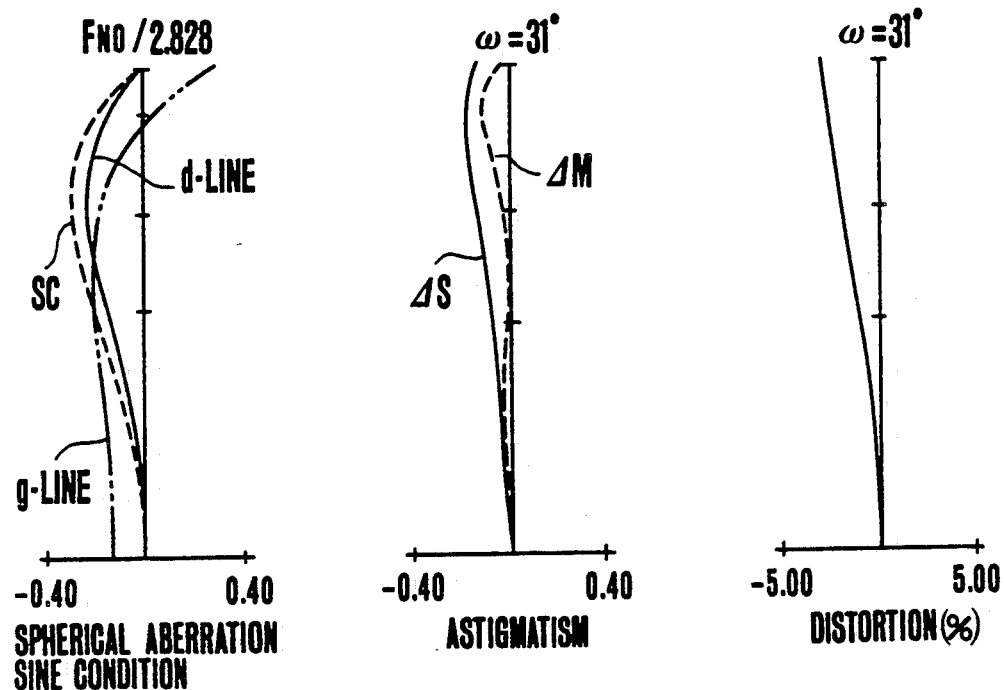
Figure 30B:
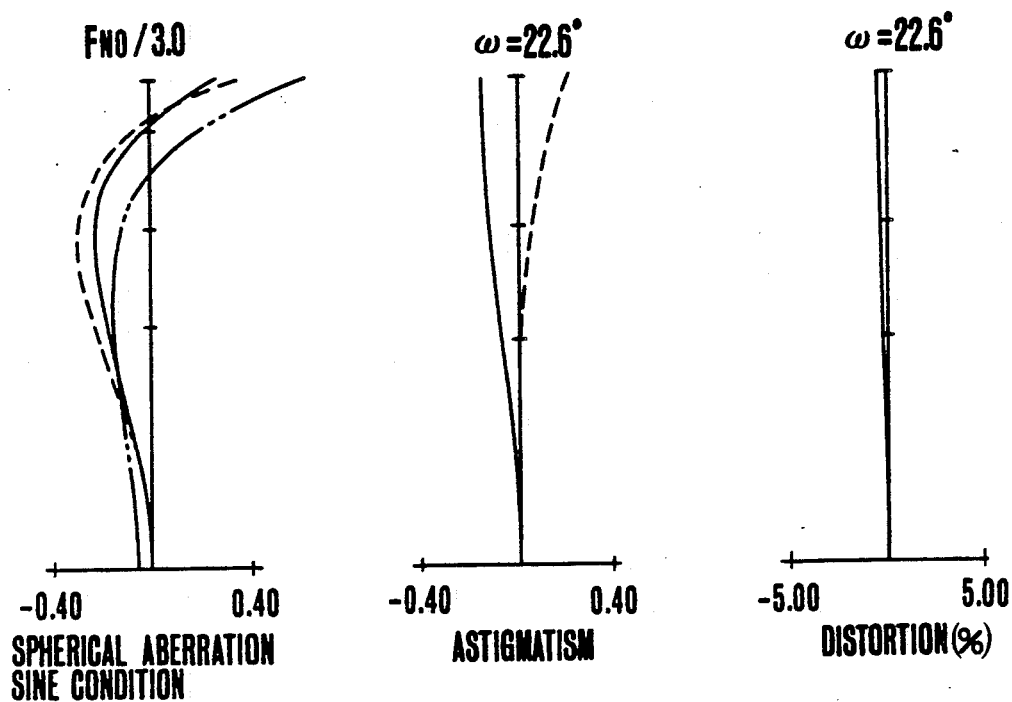

The zoom lens of the example 10 is shown in the longitudinal section view of FIG. 28 and its aberrations with an object at infinity and 1 meter are shown in FIGS. 29(a), 29(b) and 29(c) and FIGS. 30(a), 30(b) and 30(c) respectively.

When zooming from the wide-angle end to the telephoto end, and the separation between the first lens group and the second lens group increases.

The front sub-group 11A of the first lens group comprises a bi-convex lens whose front surface is of strong curvature and a negative meniscus lens convex toward the front, and the rear sub-group 11B comprises a negative doublet consisting of a positive meniscus lens and a bi-concave lens cemented together at their adjoining surfaces and a bi-convex lens.

| Factor | Numerical Example No. | | | | |
|---|---|---|---|---|---|
| | 1 | 2 | 3 | 4 | 5 |
| $f_B/F_1$ | 2.569 | 1.712 | 3.575 | 2.509 | 2.103 |
| $f_A/f_B$ | 0.790 | 2.194 | 0.453 | 0.839 | 0.907 |
| f/r' | 0.998 | 0.807 | 1.0 | 1.07 | 0.89 |
| | 6 | 7 | 8 | 9 | 10 |
| $f_B/F_1$ | 3.305 | 3.613 | 1.099 | 3.421 | 2.303 |
| $f_A/f_B$ | 0.434 | 0.384 | 10.105 | 0.413 | 0.767 |
| r/r' | 0.97 | 1.01 | 0.86 | 1.0 | 0.88 |

When designing the zoom lens having four movable lens groups for zooming as shown in FIG. 1, FIG. 7 or FIG. 10, it is desirable to have reference to the following features:

As it has a first lens group counting from front having a negative refractive power, a second lens group having a positive refractive power, a third lens group having a negative refractive power and a fourth lens group having a positive refractive power, the first lens group, the second lens group and fourth lens group moving in such a manner that when zooming from the wide-angle end to the telephoto end, the separation between the first lens group and the second lens group, the separation between the second lens group and the third lens group and the separation between the third lens group and the fourth lens group decreases, increases and decreases respectively, the following conditions are satisfied:

$$0.6 < |f1/Ft| < 1.2 \qquad (4)$$

$$0.6 < f2/ft < 1.1 \qquad (5)$$

$$0.8 < |f3/Ft| < 1.4 \qquad (6)$$

$$0.95 < f4/Ft < 1.6 \qquad (7)$$

where f1, f2, f3 and f4 are the focal lengths of the first, second, third and fourth lens groups respectively and Ft is the longest focal length of the entire lens system.

Figure 31:
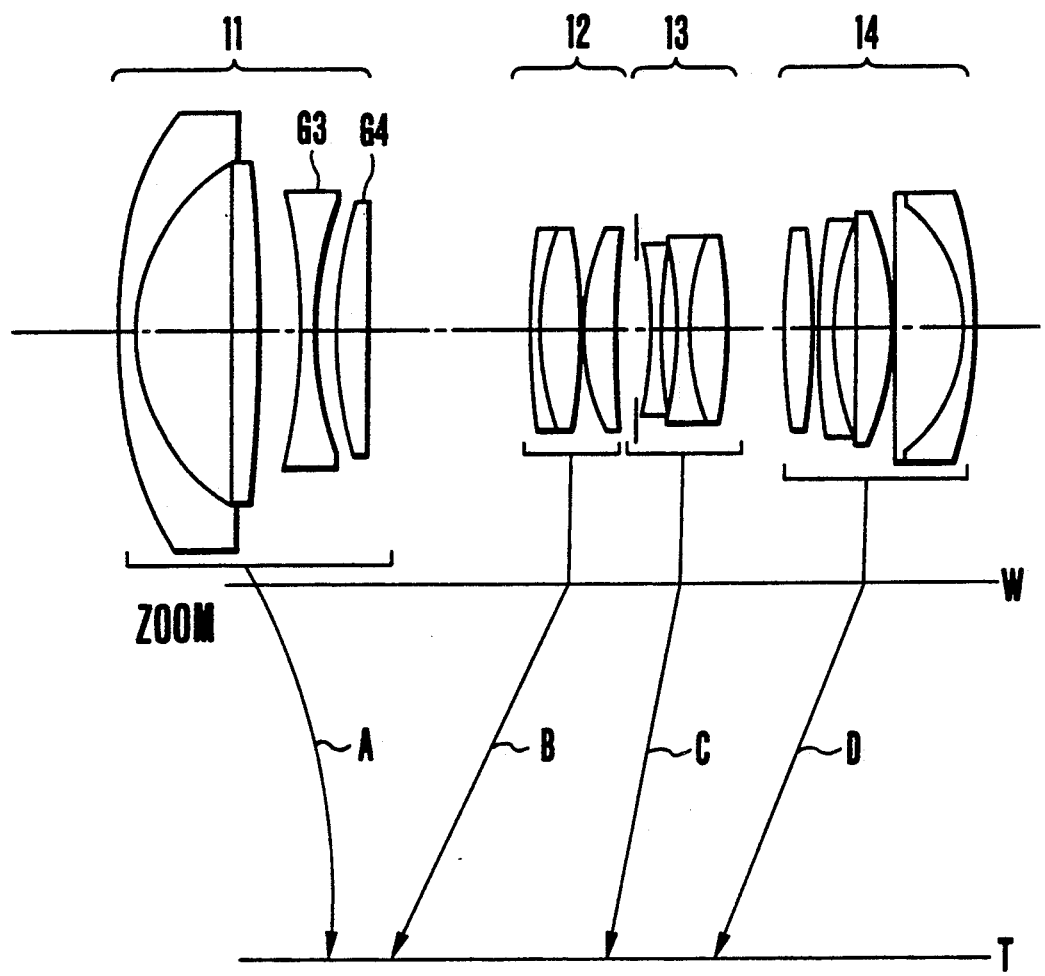
FIG. 31 and FIG. 32 are longitudinal section views of numerical examples 11 and 12 of zoom lenses respectively.

In FIG. 31 there is shown a zoom lens comprising, from front to rear, a first lens group 11 of negative power, a second lens group 12 of positive power, a third lens group 13 of negative power and a fourth lens group 14 of positive power, the first, second, third and fourth lens groups moving along respective loci A, B, C and D such that when zooming from the wide-angle end to the telephoto end, the separation between the first and second lens groups, the separation between the second and third lens groups and the separation between the third and fourth lens group decreases, increases and decreases respectively. And, the second through fourth lens groups are equivalent to the before-described rear group so that they enhance its effect of varying the image magnification, and contribute to an increase of the degree of freedom of the refractive power distribution which makes it possible to afford a hold of the necessary back focal distance. It is desirable to satisfy such a refractive power arrangement of the zoom lens groups and the conditions described above.

The inequalities of condition (4) concern with the refractive power share of the first lens group. When the upper limit is exceeded, the refractive power distribution on the first lens group becomes weak, so that in the super wide-angle zoom lens as in the invention of the present patent application, a drawback arises that the filter diameter increases too much. Also, the stroke of zooming movement increases so that the drawback of increasing the size of the lens system becomes conspicuous, and the tendency to shorten the back focal distance is intensified. Also, the exceeding beyond the lower limit corresponds to an extreme strengthening of the refractive power distribution on the first lens group.

This is advantageous in the paraxial arrangement for the filter diameter, the compactness and the hold of the back focal distance But, the strengthening of the refractive power arrangement of the first lens group must not be reflected to an increase of the complexity of structure of the first lens group. Otherwise, the size of the first lens group would be increased, and an increase of the filter diameter would be involved. Therefore, in particular, it becomes impossible to take such a simple lens form as shown in the embodiments of the present patent application.

The inequalities of condition (5) concern with the refractive power share of the second lens group. When the upper limit is exceeded, the refractive power distribution on the second lens group becomes weak, which is advantageous at securing the back focal distance. But, the tendency to increase the total length of the lens becomes strong, which is very disadvantageous to the compact form. Another drawback is that the height at which the axial light beam emerges from the second lens group increases, making it difficult to correct the spherical aberration in the third lens group. The drawback of increasing the diameter of the diaphragm is also intensified.

When the lower limit is exceeded, the refractive power distribution on the second lens group is extremely strengthened. The increase of the refractive power of the second lens group is advantageous at advancing the compact form, but in the case of the super wide-angle zoom lens as in the present patent application, another problem of securing the back focal distance gets more difficult to solve. Also, because of the strong refractive power distribution on the second lens group, the structure of construction of the lens group has to be complicated. So, a drawback of thickening the second lens group arises. In the case of the zoom configuration of this example, to arrange the diaphragm in the space between the second and third lens groups is most advantageous on the optical performance. With this, when the thickness of the second lens group increases, the diameter of the first lens group must be increased to admit of the light beam to the maximum image height in the wide-angle end. In addition, there is a drawback of increasing the filter diameter. Further, it becomes difficult for the lens to take a simple form.

The inequalities of condition (6) concern with the refractive power share of the third lens group.

In the super wide-angle zoom lens, because of the extreme short of the focal length, it is very difficult to afford a hold for the back focal distance. The weaker the refractive power distribution on the third lens group, the more advantageous on the aberration correction. But, when it is made weaker than the upper limit, the difficulty of securing the back focal distance is very increased. The excess beyond the lower limit corresponds to the extreme strengthening of the refractive power distribution on the second lens group. This is advantageous at securing the back focal distance in the sense of the paraxial arrangement. But, because of the stronger refractive power distribution on the third lens group, for the purpose of aberration correction, the structure of the lens group must be made complicated. Particularly, correction of spherical aberration and field curvature by zooming becomes difficult.

The inequalities of condition (7) concern with the refractive power share of the fourth lens group. When the upper limit is exceeded, the refractive power distribution on the fourth lens group becomes weak, which is advantageous at advancing the compact form. But, the difficulty of securing the back focal distance increases largely The excess beyond the lower limit corresponds to the extreme strengthening of the refractive power distribution on the fourth lens group. The strengthening of the refractive power of the fourth lens group is advantageous at securing the back focal distance. But because of the stronger refractive power distribution on the fourth lens group, a new drawback arises that the structure of construction of the lens group must be made complicated.

Additional numerical are described. In these numerical examples, Ri represents the radius of curvature of the i-th lens surface counting from the front, Di the i-th lens thickness or air separation counting from front, and Ni and $\nu i$ the refractive index for the spectral d-line and Abbe number of the glass of the i-th lens element counting from front.

The shape of an aspheric surface in the coordinate of an X-axis in the axial direction and an H-axis in the perpendicular direction to the optical axis, with the direction in which light advances being taken as positive is expressed by the following equation:

$$X = \frac{(1/R) H^2}{1 + (1 - (H/R)^2)^{\frac{1}{2}}} + BH^4 + CH^6 + DH^8 + EH^{10}$$

where R is the radius of the osculating sphere and B. C, D and E are the aspheric coefficients.

Figure 33A:
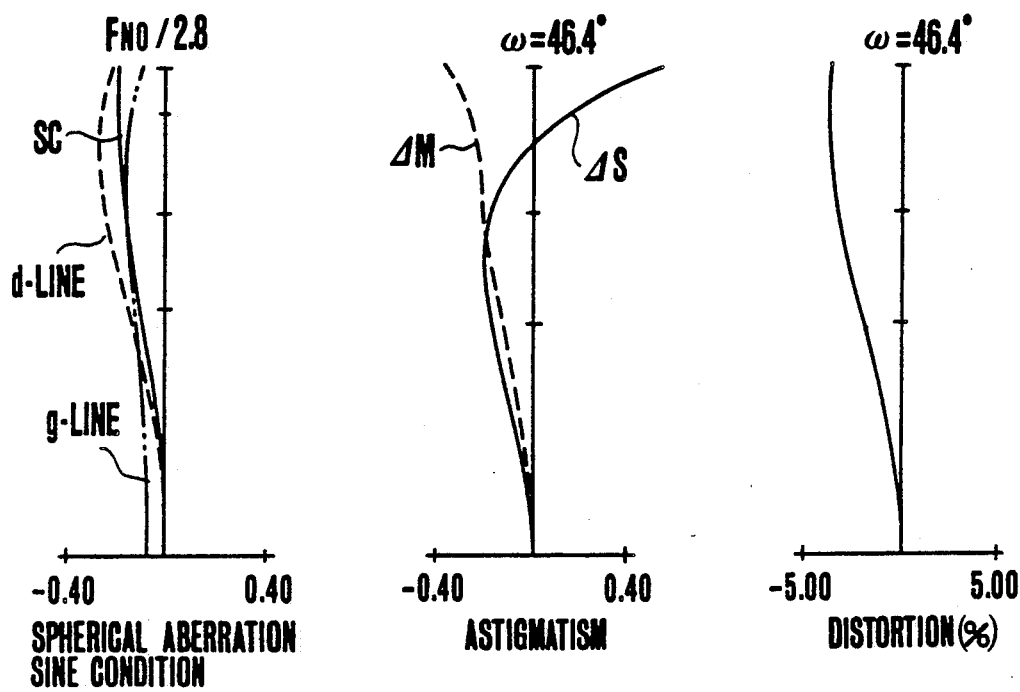
FIGS. 33(a), 33(b) and 33(c) and FIGS. 34(a), 34(b) and 34(c) are graphic representation of the aberrations of the numerical examples 11 and 12 of zoom lenses respectively.
Figure 33B:
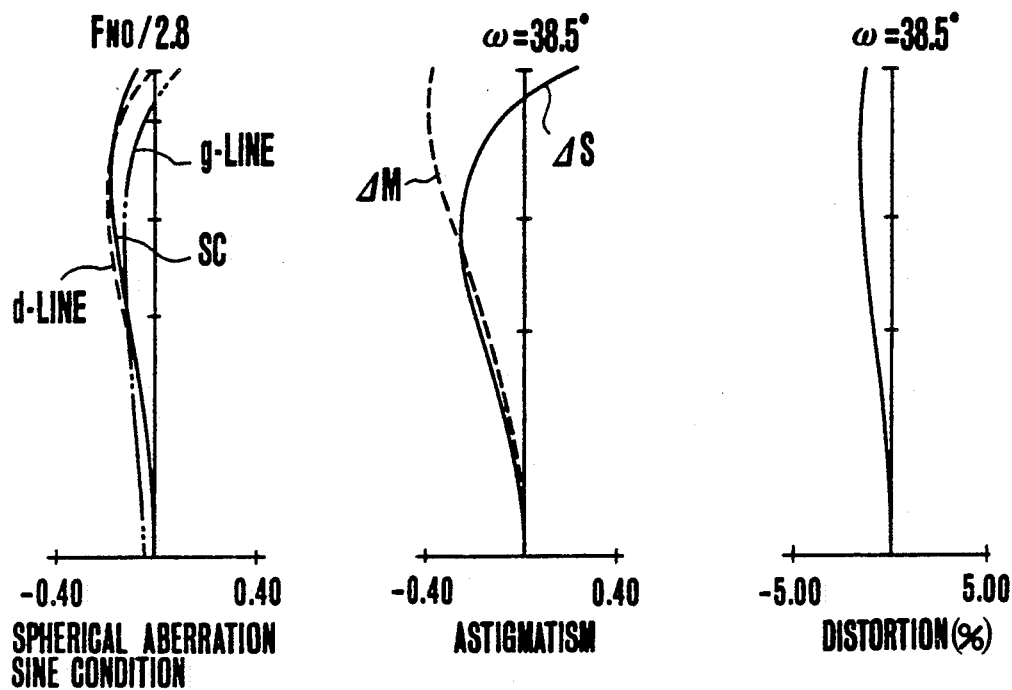
Figure 33C:
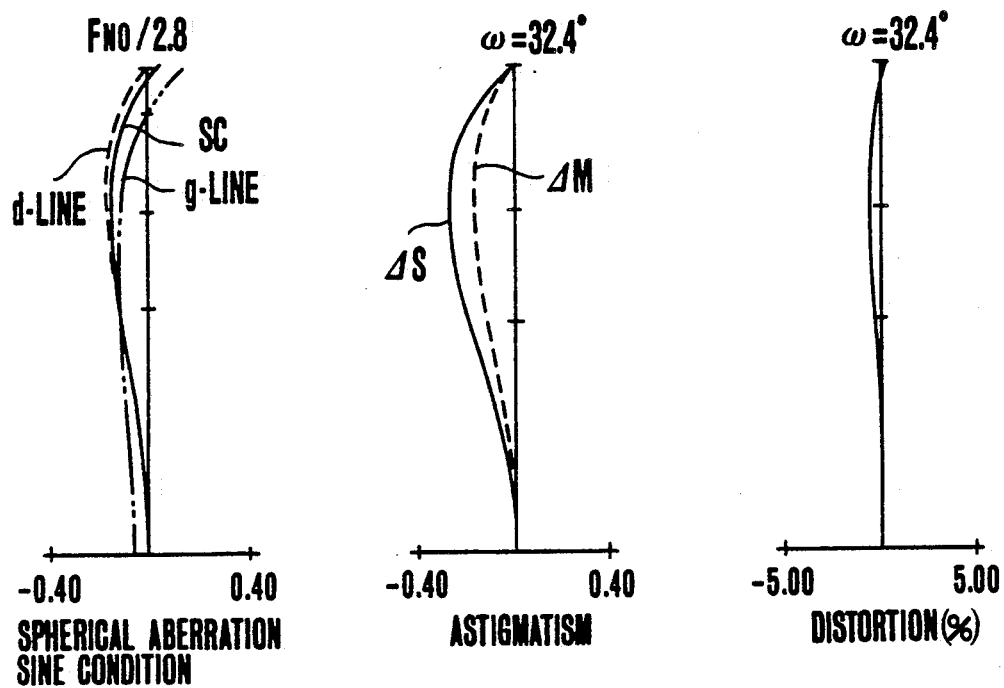

The numerical example 11 is shown below. The longitudinal section of this zoom lens is shown in FIG. 31 along with the loci of zooming movement of all the lens groups. Its aberrations in the wide-angle end, an intermediate position and the telephoto end with an object at infinity are shown in FIGS. 33(a), 33(b) and 33(c) respectively.

The zoom lens comprises, from front to rear, a first lens group 11 of negative power, a second lens group 12 of positive power, a third lens group 13 of negative power and a fourth lens group of positive power. When zooming from the wide-angle end to the telephoto end, the first lens group, the second lens group and the fourth lens group move in such a way that the separation between the first and second lens groups, the separation between the second and third lens groups and the separation between the third and fourth lens groups decreases, increases and decreases respectively. As the concrete loci of motion, the first lens group 11 moves rearward on the wide-angle side, and slightly forward on the telephoto side. The second, third and fourth lens groups move forward. In this example, to simplify the mechanical structure, the second and fourth lens groups are made to move in unison. The first lens group 11 comprises, from front to rear, a negative meniscus lens convex toward the front, a positive lens, a bi-concave lens and a positive lens. The second lens group 12 comprises a cemented doublet and a positive meniscus lens. The third lens group 13 comprises a negative lens and a cemented doublet. In the invention of the present patent application, the first lens group, the second lens group and the third lens group, because their having relatively weak refractive powers, may be constructed in simple form while still enabling the aberrations to be corrected well. If the second lens group is used to correct aberrations to a higher degree or its refractive power is strengthened, an additional positive lens may be added thereto. In the third lens group, there is arranged a cemented lens whose cemented surface is convex toward the front. It is also possible to put the cemented lens in the lens group on the object side. If so, the spherical aberration of the spectral g-line for the telephoto side is more or less worsened. Hence, the arrangement shown in this example is more advantageous in the case of the paraxial arrangement as in the present patent application.

In the present embodiment, focusing to finite distances is performed by moving the third lens G3 and the fourth lens G4 of the first lens group in unison.

In the present embodiment, the diaphragm is arranged in between the second lens group and the third lens group. In particular, during zooming it is made to move in unison with the third lens group.

Figure 32:
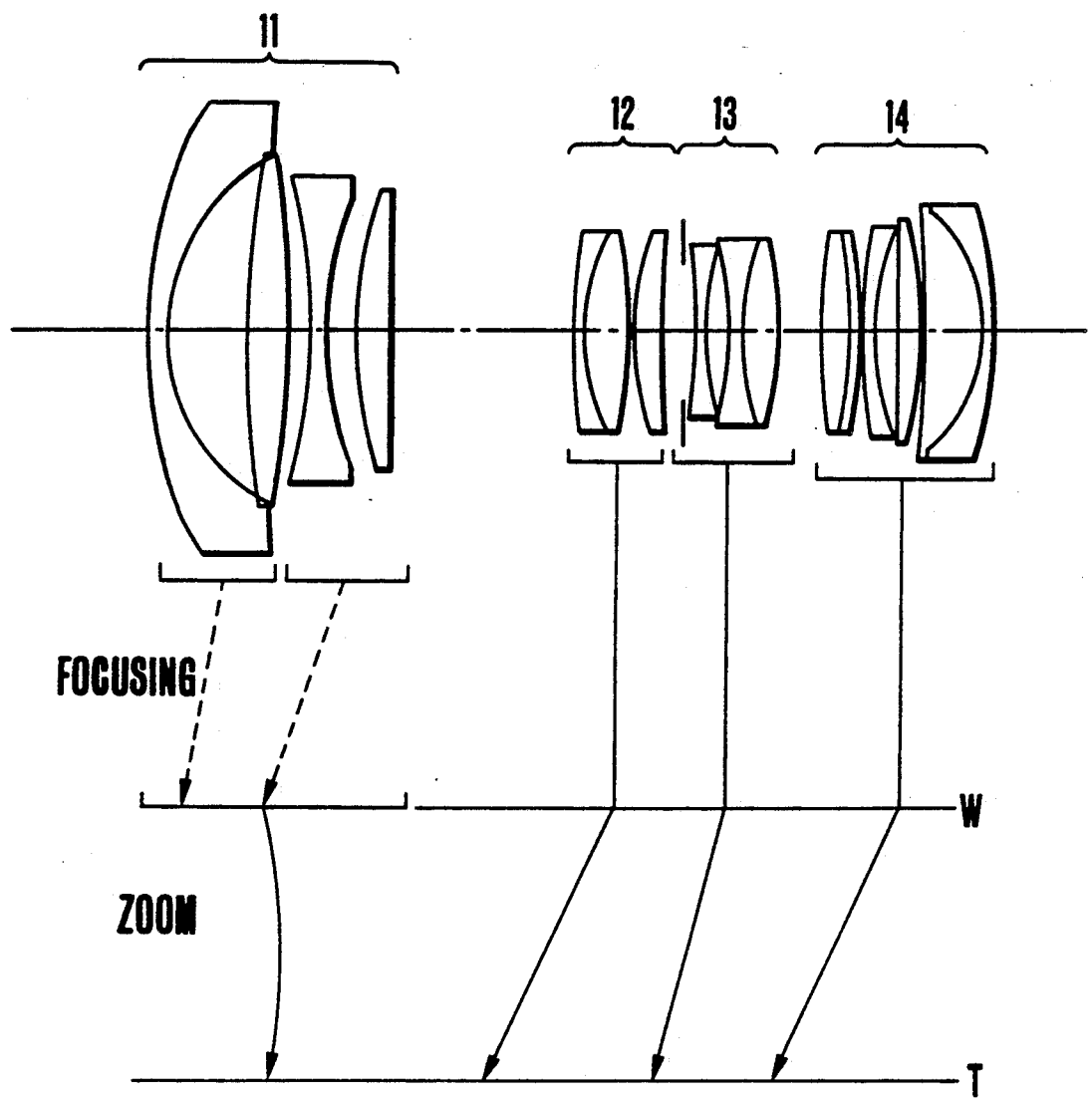
Figure 34A:
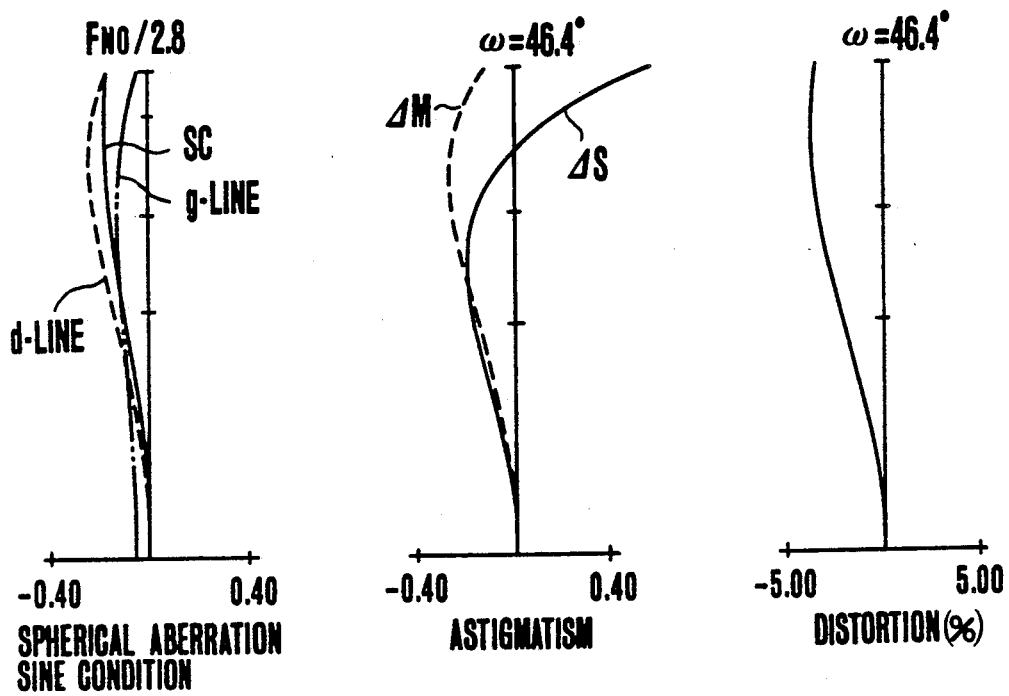
Figure 34B:
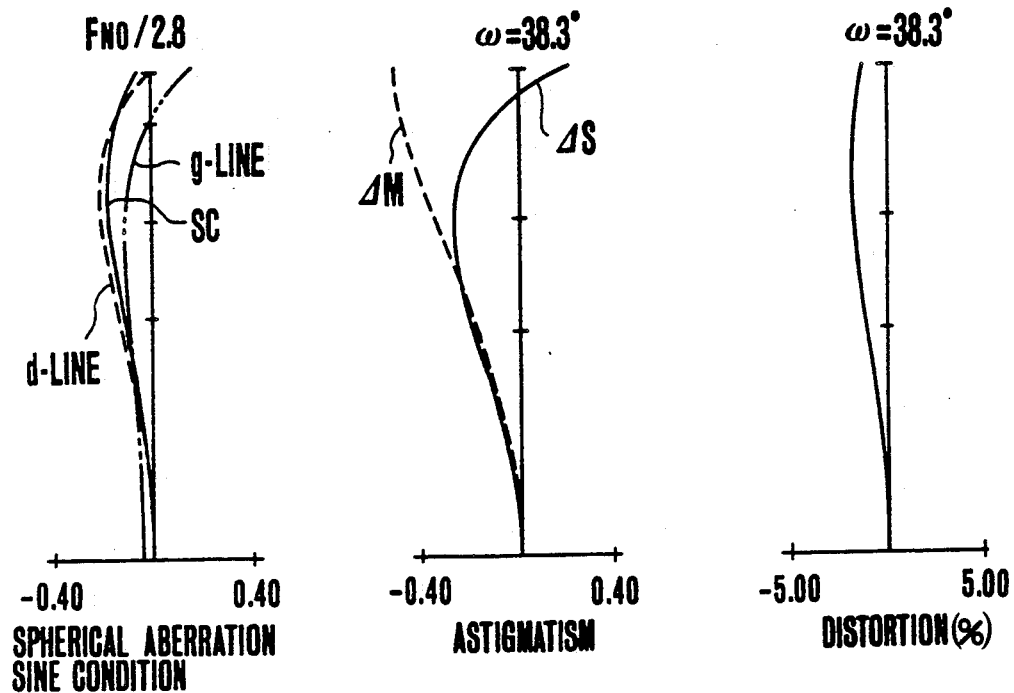
Figure 34C:
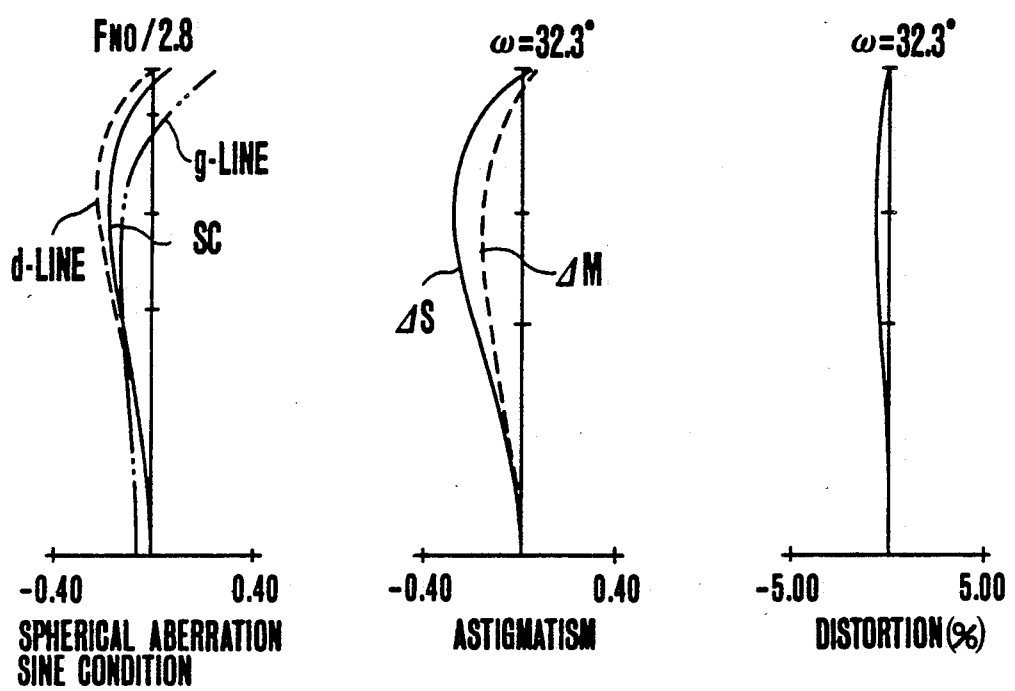

The numerical example 12 is shown below. The longitudinal section of this zoom lens is shown in FIG. 32 along with the loci of zooming movement of all the lens groups. Its aberration in the wide-angle end, an intermediate position and the telephoto end with an object at infinity are shown in FIGS. 34(a), 34(b) and 34(c) respectively.

The zoom lens comprises, from front to rear, a first lens group 11 of negative power, a second lens group 12 of positive power, a third lens group 13 of negative power, and a fourth lens group 14 of positive power. When zooming from the wide-angle end to the telephoto end, the first lens group, the third lens group and the fourth lens group move in such a way that the separation between the first and second lens groups, the separation between the second and third lens groups and the separation between the third and fourth lens groups decreases, increases and decreases respectively. As the concrete loci of motion, the first lens group 11 moves rearward on the wide-angle side, and slightly forward on the telephoto side. The second, third and fourth lens groups move forward.

The first lens group 11 comprises, from front to rear, a negative meniscus lens convex toward the front, a positive lens, a bi-concave lens and a positive lens. The second lens group 12 comprises a cemented lens and a positive meniscus lens. The third lens group 13 comprises a negative lens and a cemented lens. In this example, the first lens group, the second lens group and the third lens group, because of their having relatively weak refractive powers, may be constructed in simple form, while still permitting good correction of aberrations. If the second lens group is used to correct aberrations to a higher degree, or its refractive power is strengthened, an additional positive lens can be added thereto. In the third lens group, there is arranged the cemented lens whose cemented surface is convex toward the front. It is also possible to put this cemented lens to the lens group on the object side. If so, the spherical aberration of the spectral g-line for the telephoto side is more or less worsened. Hence, the arrangement shown in this example is more advantageous in the case of the paraxial arrangement as in the present patent application.

In the present embodiment, focusing to finite distances is performed by moving the third lens G3 and the fourth lens G4 of the first lens group in unison.

Numerical Example 11:
$F = 20.6$  $FNO = 1:2.8$  $2\omega = 92.8° - 64.6°$

| | | | |
|---|---|---|---|
| *R1 = 64.500 | D1 = 2.20 | N1 = 1.77250 | ν1 = 49.6 |
| R2 = 21.539 | D2 = 9.90 | | |
| R3 = 1294.013 | D3 = 3.20 | N2 = 1.60342 | ν2 = 38.0 |
| R4 = −159.024 | D4 = 4.20 | | |
| R5 = −67.500 | D5 = 1.60 | N3 = 1.88300 | ν3 = 40.8 |
| R6 = 42.369 | D6 = 2.38 | | |
| R7 = 51.078 | D7 = 3.40 | N4 = 1.84666 | ν4 = 23.9 |
| R8 = −498.817 | D8 = Variable | | |
| R9 = 75.189 | D9 = 1.20 | N5 = 1.84666 | ν5 = 23.9 |
| R10 = 26.437 | D10 = 4.65 | N6 = 1.65160 | ν6 = 58.5 |
| R11 = −47.049 | D11 = 0.15 | | |
| R12 = 26.461 | D12 = 3.14 | N7 = 1.65160 | ν7 = 58.5 |
| R13 = 118.673 | D13 = Variable | | |
| R14 = Stop | D14 = 1.50 | | |
| R15 = −61.755 | D15 = 1.10 | N8 = 1.81600 | ν8 = 46.6 |
| R16 = 51.081 | D16 = 2.05 | | |
| R17 = −35.628 | D17 = 1.10 | N9 = 1.69680 | ν9 = 55.5 |
| R18 = 28.535 | D18 = 4.10 | N10 = 1.80518 | ν10 = 25.4 |
| R19 = −53.180 | D19 = Variable | | |
| R20 = 65.876 | D20 = 3.00 | N11 = 1.51633 | ν11 = 64.1 |
| R21 = −104.732 | D21 = 0.77 | | |
| R22 = 70.547 | D22 = 2.00 | N12 = 1.76182 | ν12 = 26.5 |
| R23 = 35.224 | D23 = 2.05 | | |
| R24 = −11575.391 | D24 = 3.80 | N13 = 1.69680 | ν13 = 55.5 |
| R25 = −39.033 | D25 = 0.20 | | |
| R26 = 644.139 | D26 = 7.50 | N14 = 1.65160 | ν14 = 58.5 |
| R27 = −17.955 | D27 = 1.40 | N15 = 1.84666 | ν15 = 23.9 |
| R28 = −49.807 | | | |

*Aspheric

| | f | | |
|---|---|---|---|
| | 20.60 | 27.22 | 34.10 |
| D8 | 17.43 | 7.7 | 1.16 |
| D13 | 2.33 | 4.79 | 7.31 |
| D19 | 5.90 | 3.44 | 0.92 |
| D28 | 0.00 | 5.21 | 10.53 |

$B = 5.46544 \times 10^{-6}$
$C = -7.56212 \times 10^{-10}$
$D = 6.88622 \times 10^{-13}$
$E = 2.33118 \times 10^{-15}$
$f_1 = -27.7$
$f_2 = 27.25$
$f_3 = -36$
$f_4 = 39.48$ $\left|\frac{f_1}{F_T}\right| = 0.81$  $\frac{f_2}{F_T} = 0.80$ $\left|\frac{f_3}{F_T}\right| = 1.05$  $\frac{f_4}{F_T} = 1.16$ Numerical Example 12:
$F = 20.6$  $FNO = 1:2.8$  $2\omega = 92.8° -64.6°$

| | | | |
|---|---|---|---|
| *R1 = 70.000 | D1 = 2.10 | N1 = 1.77250 | ν1 = 49.6 |
| R2 = 21.341 | D2 = 8.80 | | |
| R3 = 125.838 | D3 = 4.10 | N2 = 1.63636 | ν2 = 35.4 |

-continued

Numerical Example 12:
F = 20.6  FNO = 1:2.8  2ω = 92.8° —64.6°

| | | | |
|---|---|---|---|
| R4 = −116.274 | D4 = 2.60 | | |
| R5 = −62.430 | D5 = 1.60 | N3 = 1.88300 | ν3 = 40.8 |
| R6 = 42.180 | D6 = 3.48 | | |
| R7 = 48.770 | D7 = 3.50 | N4 = 1.84666 | ν4 = 23.9 |
| R8 = 735.622 | D8 = Variable | | |
| R9 = 68.692 | D9 = 1.20 | N5 = 1.84666 | ν5 = 23.9 |
| R10 = 24.402 | D10 = 4.80 | N6 = 1.65160 | ν6 = 58.5 |
| R11 = −46.504 | D11 = 0.15 | | |
| R12 = 25.828 | D12 = 3.20 | N7 = 1.60311 | ν7 = 60.7 |
| R13 = 139.036 | D13 = Variable | | |
| R14 = Stop | D14 = 1.50 | | |
| R15 = −69.328 | D15 = 1.25 | N8 = 1.69680 | ν8 = 55.5 |
| R16 = 39.129 | D16 = 2.60 | | |
| R17 = −28.629 | D17 = 1.00 | N9 = 1.69680 | ν9 = 55.5 |
| R18 = 28.866 | D18 = 4.00 | N10 = 1.80518 | ν10 = 25.4 |
| R19 = −45.737 | D19 = Variable | | |
| R20 = 64.338 | D20 = 3.20 | N11 = 1.65160 | ν11 = 58.5 |
| R21 = −50.814 | D21 = 1.06 | N12 = 1.84666 | ν12 = 23.9 |
| R22 = −70.713 | D22 = 0.11 | | |
| R23 = 63.309 | D23 = 1.38 | N13 = 1.74000 | ν13 = 31.7 |
| R24 = 29.923 | D24 = 2.33 | | |
| R25 = 367.214 | D25 = 2.80 | N14 = 1.69680 | ν14 = 55.5 |
| R26 = −43.677 | D26 = 0.11 | | |
| R27 = −163.103 | D27 = 6.35 | N15 = 1.65160 | ν15 = 58.5 |
| R28 = −16.479 | D28 = 1.48 | N16 = 1.84666 | ν16 = 23.9 |
| R29 = −43.503 | | | |

*Aspheric

| | f | | |
|---|---|---|---|
| | 20.60 | 27.37 | 34.24 |
| D8 | 20.20 | 8.09 | 1.04 |
| D13 | 2.31 | 4.09 | 5.88 |
| D19 | 4.61 | 2.82 | 1.03 |
| D29 | 0.00 | 5.37 | 10.74 |

$B = 5.49373 \times 10^{-6}$
$C = -1.18567 \times 10^{-9}$
$D = 1.43724 \times 10^{-12}$
$E = 1.33815 \times 10^{-15}$
$f_1 = -30.4$
$f_2 = 27$
$f_3 = -35$
$f_4 = 39.81$ $\left|\dfrac{f_1}{F_T}\right| = 0.89 \qquad \dfrac{f_2}{F_T} = 0.79$ $\left|\dfrac{f_3}{F_T}\right| = 1.03 \qquad \dfrac{f_4}{F_T} = 1.17$

What is claimed is:

1. A zoom lens comprising:
a first lens group having a negative refractive power and having an object-side sub-group stationary during focusing and an image-side sub-group arranged to move for focusing; and
a second lens group having a positive refractive power and arranged on the image side of said first lens group,
wherein said first lens group and said second lens group move axially at the same time and in differential relation for zooming.

2. A zoom lens according to claim 1, satisfying the following condition:

$0.3 < |f_A/f_B| < 11$ where $f_A$ is a focal length of said object-side sub-group and $f_B$ is a focal length of said image-side sub-group.

3. A zoom lens according to claim 1, satisfying the following condition:

$1 < f_B/F_1 < 4$ where $F_1$ is a focal length of said first lens group and $f_B$ is a focal length of said image-side sub-group.

4. A zoom lens according to claim 1, wherein said image-side sub-group has an arrangement of a negative lens component and a positive lens component in the order from the object side, and satisfies the following conditions:

$r > 0,$ $r' > 0$ where r is a radius of curvature of the rear surface of said negative lens component, and r' is a radius of curvature of the front surface of said positive lens component.

5. A zoom lens according to claim 4, satisfying the following condition:

$0.7 < r/r' < 1.2$

6. A zoom lens according to claim 1, wherein said object-side sub-group includes a negative meniscus lens convex toward the object side.

7. A zoom lens according to claim 1, further comprising:
a third lens group having a negative refractive power and a fourth lens group having a positive refractive power in this order from the object side, wherein said third lens group and said fourth lens group move for zooming purposes at the same time when said first lens group and said second lens group move.

8. A zoom lens according to claim 7, satisfying the following conditions:

$0.6 < |f1/Ft| < 1.2$ $0.6 < f2/Ft < 1.1$ $0.8 < |f3/Ft| < 1.4$ $0.95 < f4/Ft < 1.6$ where f1 is a focal length of said first lens group, f2 is a focal length of said second lens group, f3 is a focal length of said third lens group, f4 is a focal length of said fourth lens group, and Ft is the longest focal length of the entire lens system.

9. A zoom lens comprising, from front to rear, a first lens group having a negative refractive power, a second lens group having a positive refractive power, a third lens group having a negative refractive power and a fourth lens group having a positive refractive power, said first lens group, said second lens group and said fourth lens group moving in such a way that, as zooming from the wide-angle end to the telephoto end, the separation between said first lens group and said second lens group, the separation between said second lens group and said third lens group and the separation between said third lens group and said fourth lens group decreases, increases and decreases respectively, and said zoom lens satisfying the following conditions:

$0.6 < |f1/Ft| < 1.2$ $0.6 < f2/Ft < 1.1$ $0.8 < |f3/Ft| < 1.4$ $0.95 < f4/Ft < 1.6$ where f1 is a focal length of said first lens group, f2 is a focal length of said second lens group, f3 is a focal length of said third lens group, f4 is a focal length of said fourth lens group and Ft is the longest focal length of the entire lens system.

* * * * *

UNITED STATES PATENT AND TRADEMARK OFFICE
CERTIFICATE OF CORRECTION

PATENT NO. : 5,000,550

DATED : March 19, 1991

INVENTOR(S) : Takahishi et al.

Page 1 of 3

It is certified that error appears in the above-identified patent and that said Letters Patent is hereby corrected as shown below:

COLUMN 1

Line 20, "the type of" should be deleted.
    Line 23, "increased" should read --is increased--.
    Line 47, "gets" should read --causes--.
    Line 50, "in" should be deleted.

COLUMN 2

Line 1, "Another needs, say" should read --The need for a--.

COLUMN 5

Line 53, "wit" should read --with--.

COLUMN 7

Line 1, "From" should read --For--.

COLUMN 8

Line 52, "a" should read --an--.

COLUMN 11

Line 42, "biconcave lens" should read --bi-concave lens--.

UNITED STATES PATENT AND TRADEMARK OFFICE
CERTIFICATE OF CORRECTION

PATENT NO. : 5,000,550

DATED : March 19, 1991

INVENTOR(S) : Takahishi et al.

Page 2 of 3

It is certified that error appears in the above-identified patent and that said Letters Patent is hereby corrected as shown below:

COLUMN 12

Line 68, "_f_" should be deleted.

COLUMN 13

At the first line under the heading "Numerical Example 6:" "68.00  52.15  36.00" should read --68.00  52.16  36.00--.

COLUMN 14

Line 47, "respectivelys." should read --respectively.--.

COLUMN 16

Line 4, "and" should be deleted.

UNITED STATES PATENT AND TRADEMARK OFFICE
CERTIFICATE OF CORRECTION

PATENT NO. : 5,000,550

DATED : March 19, 1991

INVENTOR(S) : Takahishi et al.

It is certified that error appears in the above-identified patent and that said Letters Patent is hereby corrected as shown below:

COLUMN 17

Line 6, "concern" should read --are concerned--.
    Line 21, "distance" should read --distance.--.
    Line 67, "short" should read --shortness--.

COLUMN 18

Line 15, "concern" should read --are concerned--.
    Line 21, "largely" should read --largely.--.

Signed and Sealed this

Fifth Day of January, 1993

Attest:

DOUGLAS B. COMER

*Attesting Officer*  *Acting Commissioner of Patents and Trademarks*